(12) United States Patent
Luo et al.

(10) Patent No.: US 12,528,892 B2
(45) Date of Patent: Jan. 20, 2026

(54) ALKYLATION OF TRANSITION METAL COORDINATION CATALYST COMPLEXES

(71) Applicant: ExxonMobil Chemical Patents Inc., Baytown, TX (US)

(72) Inventors: Lubin Luo, Houston, TX (US); Nikola S. Lambic, Houston, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 677 days.

(21) Appl. No.: 17/906,394

(22) PCT Filed: Mar. 18, 2021

(86) PCT No.: PCT/US2021/022888
§ 371 (c)(1),
(2) Date: Sep. 15, 2022

(87) PCT Pub. No.: WO2021/194831
PCT Pub. Date: Sep. 30, 2021

(65) Prior Publication Data
US 2023/0141606 A1 May 11, 2023

Related U.S. Application Data

(60) Provisional application No. 62/994,538, filed on Mar. 25, 2020.

(51) Int. Cl.
*C08F 4/6592* (2006.01)
*C07F 17/00* (2006.01)
*C08F 4/62* (2006.01)

(52) U.S. Cl.
CPC .......... *C08F 4/65927* (2013.01); *C07F 17/00* (2013.01); *C08F 4/62093* (2013.01);
(Continued)

(58) Field of Classification Search
CPC .............. C08F 4/65927; C08F 4/62093; C08F 2420/08; C08F 2410/01; C08F 2420/01; C07F 17/00
(Continued)

(56) References Cited

U.S. PATENT DOCUMENTS

| | | | |
|---|---|---|---|
| 5,447,895 A | 9/1995 | Marks et al. | 502/117 |
| 5,523,435 A | 6/1996 | Lisowsky | 556/11 |

(Continued)

FOREIGN PATENT DOCUMENTS

| | | | |
|---|---|---|---|
| EP | 0 874 005 | 7/2003 | C08F 10/00 |
| WO | WO1997/022635 | 6/1997 | C08F 10/00 |

(Continued)

OTHER PUBLICATIONS

Brinzinger et al. (1998) "Alkyl Exchange Between Aluminum Trialkyls and Zirconocene Dichloride Complexes—a Measure of Electron Densities at the Zr Center[1]," *Inorganica Chimica Acta*, v.270, pp. 376-381.

(Continued)

*Primary Examiner* — Patricia L. Hailey

(57) ABSTRACT

The alkylation of transition metal coordination catalyst complexes (such as metallocenes and/or post-metallocenes) in non-polar solvents with high conversion to the dialkylated transition metal coordination catalyst complex may be accomplished by reacting (a) a transition metal coordination catalyst complex comprising a transition metal linked to at least one an anionic donor ligand and at least one leaving group having a non-carbon atom directly linked to the transition metal, (b) an aluminum alkyl, and (c) a fluoride salt at 0° C. to 85° C. in a non-polar solvent to yield an alkylated transition metal coordination catalyst complex.

20 Claims, 1 Drawing Sheet

(52) U.S. Cl.
CPC ...... *C08F 2410/01* (2013.01); *C08F 2420/01* (2013.01); *C08F 2420/08* (2021.01)

(58) Field of Classification Search
USPC .................. 502/102, 108, 150, 152, 153
See application file for complete search history.

(56) References Cited

U.S. PATENT DOCUMENTS

| | | | |
|---|---|---|---|
| 6,211,105 B1 | 4/2001 | Holtcamp | 502/103 |
| 6,265,338 B1 | 7/2001 | Canich | 502/103 |
| 6,309,997 B1 | 10/2001 | Fujita et al. | 502/167 |
| 6,689,847 B2 | 2/2004 | Mawson et al. | 526/116 |
| 6,841,502 B2 | 1/2005 | Boussie et al. | 502/125 |
| 6,884,748 B2 | 4/2005 | McCullough | 502/117 |
| 6,900,321 B2 | 5/2005 | Boussie et al. | 546/4 |
| 6,958,306 B2 | 10/2005 | Holtcamp | 502/128 |
| 6,995,109 B2 | 2/2006 | Mink et al. | 502/103 |
| 7,087,686 B2 | 8/2006 | Britovsek et al. | 526/113 |
| 7,087,690 B2 | 8/2006 | Boussie et al. | 526/161 |
| 7,129,302 B2 | 10/2006 | Mink et al. | 526/116 |
| 7,157,531 B2 | 1/2007 | Szul et al. | 526/79 |
| 7,169,864 B2 | 1/2007 | Paczkowski et al. | 526/129 |
| 7,179,876 B2 | 2/2007 | Szul et al. | 526/348.2 |
| 7,973,116 B2 | 7/2011 | Hagadorn et al. | 526/172 |
| 8,188,200 B2 | 5/2012 | Sita et al. | 526/161 |
| 8,592,615 B2 | 11/2013 | Kuhlman et al. | 556/51 |
| 8,658,556 B2 | 2/2014 | Stewart | 502/202 |
| 11,041,031 B2 | 6/2021 | Faler et al. | C08F 10/02 |
| 11,117,908 B2 | 9/2021 | Faler et al. | C07F 5/027 |
| 11,414,436 B2 | 8/2022 | Faler et al. | C07F 5/027 |
| 2004/0092387 A1* | 5/2004 | Matsunaga | C08F 10/00 526/170 |
| 2006/0019925 A1 | 1/2006 | Kiribayashi et al. | 514/47 |
| 2007/0055028 A1 | 3/2007 | Casty et al. | 526/127 |
| 2011/0224391 A1 | 9/2011 | Hagadorn et al. | 526/161 |
| 2011/0301310 A1 | 12/2011 | Hagadorn et al. | 526/172 |
| 2012/0071616 A1 | 3/2012 | Hagadorn et al. | 526/170 |
| 2015/0141601 A1 | 5/2015 | Hagadorn et al. | |
| 2018/0002352 A1 | 1/2018 | Hagadorn et al. | |
| 2022/0388946 A1* | 12/2022 | Faler | C08F 10/00 |

FOREIGN PATENT DOCUMENTS

| | | | |
|---|---|---|---|
| WO | WO2000/069922 | 11/2000 | ............. C08F 10/00 |
| WO | WO2001/030860 | 5/2001 | ............. C08F 10/00 |
| WO | WO2001/030861 | 5/2001 | ............. C08F 10/00 |
| WO | WO2002/046246 | 6/2002 | ............. C08F 10/00 |
| WO | WO2002/050088 | 6/2002 | ............. C07F 19/00 |
| WO | WO2004/026921 | 4/2004 | ............. C08F 10/06 |
| WO | WO2004/046214 | 6/2004 | ........... C08F 210/06 |
| WO | WO2006/019494 | 2/2006 | ............. C08F 10/02 |
| WO | WO2006/020624 | 2/2006 | ............... C08F 4/02 |
| WO | WO2017/004462 | 1/2017 | ........... C08F 210/16 |

OTHER PUBLICATIONS

Gibson, V. C. et al. (2003) "Advances in Non-Metallocene Olefin Polymerization Catalysis," *Chem. Rev.*, v.103(1), pp. 283-316.

Girolami, G. S. (1994) "A Simple "Back of the Envelope" Method for Estimating the Densities and Molecular Volumes of Liquids and Solids," *Jrnl. of Chem. Education*, v.71(11), pp. 962-964.

Makio, H. et al. (2009) "Development and Application of FI Catalysts for Olefin Polymerization: Unique Catalysis and Distinctive Polymer Formation," *Accounts of Chem. Res.*, v.42(10), pp. 1532-1544.

Matsui, S. et al. (2001) "A Family of Zirconium Complexes Having Two Phenoxy-Imine Chelate Ligands for Olefin Polymerization," *J. Am. Chem. Soc.*, v.123(28), pp. 6847-6856.

Nakayama, Y et al. (2004), "Olefin Polymerization Behavior of bis(phenoxy-imine) Zr, Ti, and V complexes with MgCl2-based Cocatalysts," *J. Mol. Catalysis A: Chemical*, v.213, pp. 141-150.

Nakayama, Y. et al. (2005) "Propylene Polymerization Behavior of Fluorinated Bis(phenoxy-imine) Ti Complexes with an $MgCl_2$-Based Compound (MgC12-Supported Ti-Based Catalysts)," *Macromol. Chem. Phys.*, v.206(18), pp. 1847-1852.

Nakayama, Y. et al. (2006) "$MgCl_2/R'_nAl(OR)_{3-n}$: An Excellent Activator/Support for Transition-Metal Complexes for Olefin Polymerization," *Chem Eur. J.*, v.12, p. 7546-7556.

Resconi, L. et al. (2000) "Selectivity in Propene Polymerization with Metallocene Catalysts," *Chem. Rev.*, v.100(4), pp. 1253-1346.

* cited by examiner

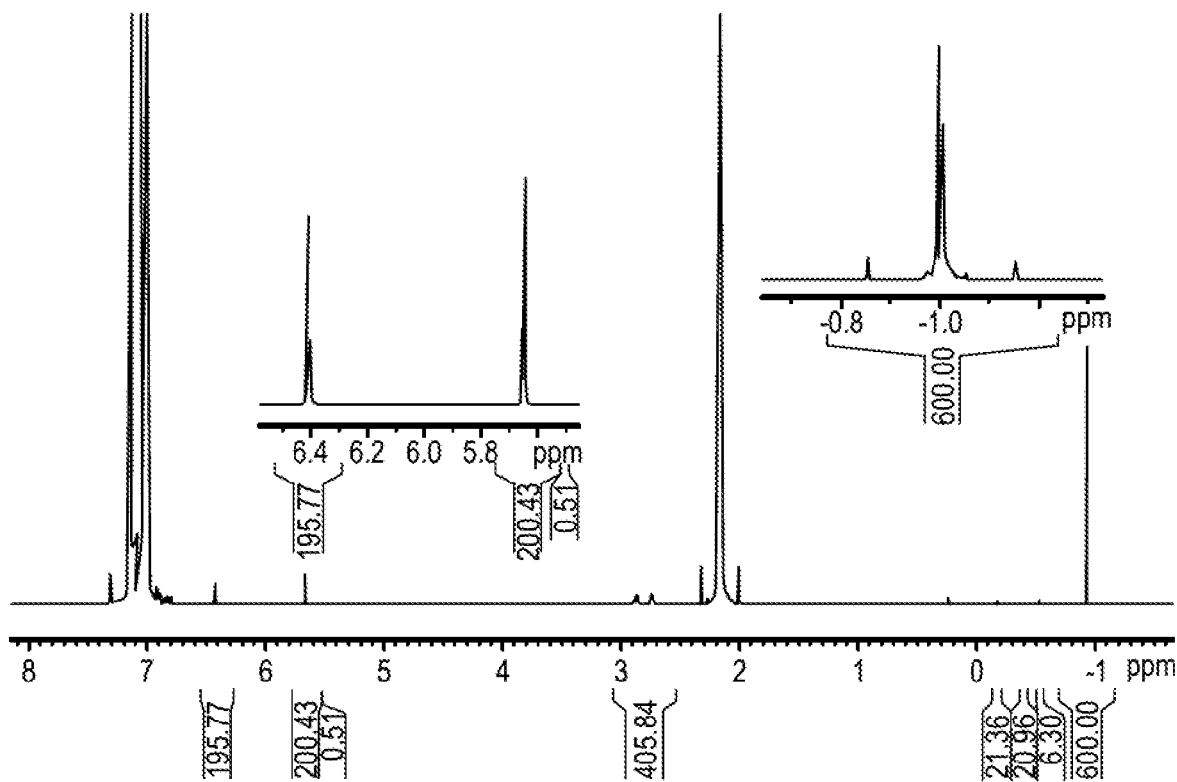

ALKYLATION OF TRANSITION METAL COORDINATION CATALYST COMPLEXES

CROSS REFERENCE TO RELATED APPLICATIONS

This application is a national stage filing of Patent Cooperation Treaty Application No. PCT/US2021/022888 filed Mar. 18, 2021, which claims the benefit of and priority to U.S. Provisional Application No. 62/994,538, filed Mar. 25, 2020, the disclosure of which is incorporated herein by reference.

FIELD OF INVENTION

This application relates to the alkylation of transition metal coordination catalyst complexes.

BACKGROUND

Polyolefins are widely used commercially because of their robust physical properties. Polyolefins are typically prepared with a catalyst that polymerizes olefin monomers. Catalysts for olefin polymerization are often based on transition metal coordination catalyst complexes, such as metallocenes and post-metallocenes, as catalyst precursors, which are activated either with an alumoxane (such as methylalumoxane (MAO)) activation system or a non-alumoxane activation system.

Alkylated transition metal coordination catalyst complexes, such as metallocene and/or alkylated post-metallocenes, are required for non-alumoxane activation systems. Alkylated transition metal coordination catalyst complexes, such as metallocenes, are also used with alumoxane, such as MAO based, supported activators to increase catalyst activation efficiency to improve the catalyst performance. Examples include alumoxane supported on silica supports, such as methylalumoxane supported on silica.

Main group I and II metal alkyls such as MeLi and MeMgCl (Grignard reagents) are two well-known common alkylation agents used for metallocene and post-metallocene alkylation. However, such alkylating agents are often highly reactive. So, metallocene and transition metal complexes that include ligands with N and/or O donors react with the alkylating agent, which lead to a low yield of the desired catalyst.

Further, main group I and II alkylating agents are primarily soluble in polar solvents like diethyl ether and tetrahydrofuran. Because polar solvents often negatively impact the final activated form of the catalysts and/or the activator that activates the catalysts, expensive steps are often taken to remove most, preferably all, of the polar solvent before proceeding to the next step in the catalyst synthesis.

Main group III metal alkyls, such as aluminum alkyls (e.g., $AlMe_3$), are poor alkylation agents. Typically, metallocenes and post-metallocenes have two sites for alkylation. While Main group III metal alkyls are advantageously milder relative to the ligands containing N and/or O donors, main group III metal alkyls typically can only alkylate one of the two sites. For example, Brinzinger et al. (1998) "Alkyl Exchange Between Aluminum Trialkyls and Zirconocene Dichloride Complexes—a Measure of Electron Densities at the Zr Center[1]," *Inorganica Chimica Acta*, v.270, pp. 376-381, reported that about a 20 fold excess of $AlMe_3$ is required to achieve only a complete alkylation of one of the two dichlorides on the metallocene and more excess $AlMe_3$ does not yield any full alkylation species.

Further, in each of these instances, the isomerization of the original metallocene is often lost. That is, rac-metallocene isomer displays different polymerization behaviors from the meso-isomer. For example, the rac- and meso-isomers have different stereo and/or comonomer insertion regulation and sometimes different activity, especially for isotactic polypropylene (iPP) that requires rac-isomer to produce the polymer product with high isotacticity to obtain highly crystalline polymer materials. Non-alkylated rac-metallocenes (commonly dichloro-versions) are usually less soluble and are easier to recrystallize from the solution to separate from the meso-isomers. The non-alkylated rac-metallocenes also have a longer shelf life vs. the alkylated versions for storage. However, the foregoing alkylation reactions may yield a product having a mixture of rac- and meso-isomers, which requires expensive and timely separation, partly due to the higher solubility of the alkylated versions. Ultimately, this makes the usable yield (that is, the rac-isomers) of the foregoing alkylation reactions low.

Therefore, a need exists for alkylation systems able to more efficiently alkylate a metallocenes and post-metallocenes with limited yield loss during alkylation and limited increase of undesired isomers. Further, polar solvent-free and aromatic solvent-free processes are also desired.

References of interest include: U.S. Pat. No. 5,523,435.

SUMMARY OF INVENTION

This invention relates to a method comprising contacting: a) a transition metal coordination catalyst complex comprising a transition metal linked to at least one an anionic donor ligand and at least one leaving group having a non-carbon atom directly linked to the transition metal; b) an aluminum alkyl; and c) a fluoride salt, at 0° C. to 85° C. in a non-polar solvent to yield a transition metal coordination catalyst complex having one or more alkyl leaving groups.

The present disclosure relates to the alkylation of transition metal coordination catalyst complexes (such as metallocenes and post-metallocenes) in non-polar solvents with high conversion to the alkylated transition metal coordination catalyst complexes (such as dialkylated metallocenes and dialkylated post-metallocenes).

A non-limiting example method of the present disclosure comprises: reacting (a) a transition metal coordination catalyst complex (such as metallocene and/or a post-metallocene), (b) an aluminum alkyl, and (c) a fluoride salt at 0° C. to 85° C. (or 0° C. to 25° C., or 15° C. to 50° C., or 15° C. to 25° C., or 20° C. to 30° C., 25° C. to 40° C., or 35° C. to 50° C., or 40° C. to 85° C.) in a non-polar solvent to yield an alkylated transition metal coordination catalyst complex (such as alkylated metallocene and/or an alkylated post-metallocene).

Another non-limiting example method of the present disclosure comprises: contacting the foregoing alkylated metallocene and/or the alkylated post-metallocene with an activator to produce a catalyst system.

Yet another non-limiting example method of the present disclosure comprises: contacting at least one olefin with the foregoing catalyst system to produce a polyolefin.

BRIEF DESCRIPTION OF THE DRAWINGS

The FIGURE is an $^1$H-NMR spectrum for Sample 3 in the Examples Section.

DETAILED DESCRIPTION

The present disclosure relates to the alkylation of transition metal coordination catalyst complexes (such as metallocenes and post-metallocenes) in non-polar solvents with high conversion to the alkylated transition metal coordination catalyst complexes (such as dialkylated metallocenes and dialkylated post-metallocenes). More specifically, the alkylation reactions described herein include a fluoride source (e.g., NaF, KF, MgF$_2$, and the like) and are performed under mild conditions, preferably under 50° C. Under the mild conditions, the reaction surprisingly proceeds to completion with over 90% recovered yield, in some instances. Further, the lower temperature, milder conditions advantageously maintain the rac:meso ratio of metallocenes.

Additionally, because the methods described herein use non-polar solvents, the alkylation can be performed just before use in a polymerization reaction without significant workup of the product, e.g., simple filtration may only be needed. Further, the transition metal coordination catalyst complexes (such as metallocenes and post-metallocenes) in a dihalogenated form (primarily dichloro) have lower cost and a longer shelf-life than the alkylated version, which further lends incentivizes the methods of the present disclosure.

Definitions and Test Methods

All numerical values within the detailed description and the claims herein are modified by "about" or "approximately" with respect to the indicated value, and take into account experimental error and variations that would be expected by a person having ordinary skill in the art.

Unless otherwise indicated, room temperature is about 23° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides). Under this scheme, the term "transition metal" refers to any atom from Groups 3-12 of the Periodic Table, inclusive of the lanthanides and actinide elements. Ti, Zr, and Hf are Group 4 transition metals, for example.

The specification describes catalysts that are transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

The following abbreviations are used through this specification: o-biphenyl is an ortho-biphenyl moiety represented by the structure

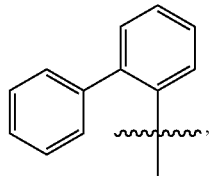 [SMILES: *c1ccccc1-c1ccccc1]

dme is 1,2-dimethoxyethane, Me is methyl, Ph is phenyl, Et is ethyl, Pr is propyl, iPr is isopropyl, n-Pr is normal propyl, cPr is cyclopropyl, Bu is butyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., CH$_2$Ph), THF (also referred to as thf) is tetrahydrofuran, RT is room temperature (and is 23° C. unless otherwise indicated), tol is toluene, EtOAc is ethyl acetate, MeCy is methylcyclohexane, and Cy is cyclohexyl.

Unless otherwise indicated (e.g., the definition of "substituted hydrocarbyl," "substituted aromatic," etc.), the term "substituted" means that at least one hydrogen atom has been replaced with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a ring structure.

The terms "hydrocarbyl radical," "hydrocarbyl," and "hydrocarbyl group," are used interchangeably throughout this application. Likewise, the terms "group", "radical", and "substituent" may be used interchangeably and are defined to mean a group consisting of hydrogen and carbon atoms only. Preferred hydrocarbyls are C$_1$-C$_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

Substituted hydrocarbyl radicals are radicals in which at least one hydrogen atom of the hydrocarbyl radical has been replaced with a heteroatom, or a heteroatom containing group, such as halogen (such as Br, Cl, F or I) or at least one functional group such as —NR*2, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

Substituted cyclopentadienyl, indenyl, tetrahydroindenyl indacenyl, or fluorenyl groups are cyclopentadienyl, indenyl, tetrahydroindenyl, indacenyl, or fluorenyl groups where at least one hydrogen atom has been replaced with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a ring structure.

Halocarbyl radicals (also referred to as halocarbyls, halocarbyl groups or halocarbyl substituents) are radicals in which one or more hydrocarbyl hydrogen atoms have been substituted with at least one halogen (e.g., F, Cl, Br, I) or halogen-containing group (e.g., CCAT-2). Substituted halocarbyl radicals are radicals in which at least one halocarbyl hydrogen or halogen atom has been substituted with at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Hydrocarbylsilyl groups, also referred to as silylcarbyl groups, are radicals in which one or more hydrocarbyl hydrogen atoms have been substituted with at least one SiR*$_3$ containing group or where at least one —Si(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Silylcarbyl radicals can be bonded via a silicon atom or a carbon atom.

Substituted silylcarbyl radicals are silylcarbyl radicals in which at least one hydrogen atom has been substituted with at least one functional group such as NR*$_2$, OR*, SeR*, TeR*, PR*$_2$, AsR*$_2$, SbR*$_2$, SR*, BR*$_2$, GeR*$_3$, SnR*$_3$, PbR*$_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Germylcarbyl radicals (also referred to as germylcarbyls, germylcarbyl groups or germylcarbyl substituents) are radicals in which one or more hydrocarbyl hydrogen atoms have been substituted with at least one GeR*$_3$ containing group or where at least one —Ge(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Germylcarbyl radicals can be bonded via a germanium atom or a carbon atom.

Substituted germylcarbyl radicals are germylcarbyl radicals in which at least one hydrogen atom has been substituted with at least one functional group such as NR*2, OR*, SeR*, TeR*, PR*$_2$, AsR*$_2$, SbR*$_2$, SR*, BR*$_2$, SiR*$_3$, SnR*$_3$, PbR$_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

The terms "alkyl radical," and "alkyl" are used interchangeably throughout this application. For purposes of this application, "alkyl radicals" are defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

The term "branched alkyl" means that the alkyl group contains a tertiary or quaternary carbon (a tertiary carbon is a carbon atom bound to three other carbon atoms. A quaternary carbon is a carbon atom bound to four other carbon atoms). For example, 3,5,5 trimethylhexylphenyl is an alkyl group (hexyl) having three methyl branches (hence, one tertiary and one quaternary carbon) and thus is a branched alkyl bound to a phenyl group.

The term "alkenyl" means a straight-chain, branched-chain, or cyclic hydrocarbon radical having one or more carbon-carbon double bonds. These alkenyl radicals may be substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl and the like.

The term "arylalkenyl" means an aryl group where a hydrogen has been replaced with an alkenyl or substituted alkenyl group. For example, styryl indenyl is an indene substituted with an arylalkenyl group (a styrene group).

The term "alkoxy", "alkoxyl", or "alkoxide" mean an alkyl group bound to an oxygen atom, such as an alkyl ether or aryl ether group/radical and can include those where the alkyl group is a $C_1$ to $C_{10}$ hydrocarbyl. The alkyl group may be straight chain, branched, or cyclic. The alkyl group may be saturated or unsaturated. Examples of suitable alkoxy and radicals can include methoxy, ethoxy, n-propoxy, iso-propoxy, n-butoxy, iso-butoxy, sec-butoxy, tert-butoxy, and the like.

The term "aryloxy" or "aryloxide" means an aryl group bound to an oxygen atom, such as an aryl ether group/radical wherein the term aryl is as defined herein. Examples of suitable aryloxy radicals can include phenoxyl, and the like.

The term "aryl" or "aryl group" means a carbon-containing aromatic ring such as phenyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

Heterocyclic means a cyclic group where a ring carbon atom (or two or three ring carbon atoms) has been replaced with a heteroatom, such as N, O, or S. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylaminophenyl is a heteroatom substituted ring.

Substituted heterocyclic means a heterocyclic group where at least one hydrogen atom of the heterocyclic radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*3, and the like, where each R* is independently a hydrocarbyl or halocarbyl radical.

A substituted aryl is an aryl group where at least one hydrogen atom of the aryl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring, for example 3,5-dimethylphenyl is a substituted aryl group.

The term "substituted phenyl" or "substituted phenyl group" means a phenyl group having one or more hydrogen groups replaced by a hydrocarbyl, substituted hydrocarbyl, heteroatom or heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl, halogen, or halocarbyl radical. Preferably the "substituted phenyl" group is represented by the formula:

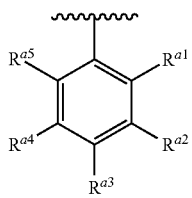

where each of $R^{a1}$, $R^{a2}$, $R^{a3}$, $R^{a4}$, and $R^{a5}$ is independently selected from hydrogen, $C_1$-$C_{40}$ hydrocarbyl or $C_1$-$C_{40}$ substituted hydrocarbyl a heteroatom, such as halogen, or a heteroatom-containing group (provided that at least one of $R^{a1}$, $R^{a2}$, $R^{a3}$, $R^{a4}$, and $R^{a5}$ is not H), or two or more of $R^{a1}$, $R^{a2}$, $R^{a3}$, $R^{a4}$, and $R^{a5}$ are joined together to form a $C_4$-$C_{62}$ cyclic or polycyclic ring structure, or a combination thereof.

The term "substituted naphthyl," means a naphthyl group having 1 or more hydrogen groups replaced by a hydrocarbyl, substituted hydrocarbyl, heteroatom or heteroatom containing group.

A "fluorophenyl" or "fluorophenyl group" is a phenyl group substituted with one, two, three, four or five fluorine atoms.

The term "substituted fluorenyl" means a fluorenyl group having 1 or more hydrogen groups replaced by a hydrocarbyl, substituted hydrocarbyl, heteroatom or heteroatom containing group.

The term "arylalkyl" means an aryl group where a hydrogen has been replaced with an alkyl or substituted alkyl group. For example, 3,5'-di-tert-butyl-phenyl indenyl is an indene substituted with an arylalkyl group. When an arylalkyl group is a substituent on another group, it is bound to that group via the aryl. For example, the aryl portion may be bound to E.

The term "alkylaryl" means an alkyl group where a hydrogen has been replaced with an aryl or substituted aryl group. For example, phenethyl indenyl is an indene substituted with an ethyl group bound to a benzene group. When an alkylaryl group is a substituent on another group, it is bound to that group via the alkyl. For example, the alkyl portion may be bound to E.

Reference to an alkyl, alkenyl, alkoxide, or aryl group without specifying a particular isomer (e.g., butyl) expressly discloses all isomers (e.g., n-butyl, iso-butyl, sec-butyl, and tert-butyl), unless otherwise indicated.

The term "ring atom" means an atom that is part of a cyclic ring structure. Accordingly, a benzyl group has six ring atoms and tetrahydrofuran has 5 ring atoms.

As used herein, and unless otherwise specified, the term "$C_n$" means hydrocarbon(s) having n carbon atom(s) per molecule, wherein n is a positive integer.

The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "Cm-Cy" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For purposes of the present disclosure, a "catalyst system" is a combination of at least one catalyst compound, an activator, and an optional support material. The catalyst systems may further comprise one or more additional catalyst compounds.

"Complex" as used herein, is also often referred to as catalyst precursor, precatalyst, catalyst, catalyst compound, transition metal compound, or transition metal complex. These words are used interchangeably.

In the description herein, a catalyst may be described as a catalyst precursor, a pre-catalyst compound, a catalyst compound or a transition metal compound, and these terms are used interchangeably. A polymerization catalyst system is a catalyst system that can polymerize monomers into polymer. An "anionic ligand" or "anionic donor ligand" is a negatively charged ligand which donates one or more pairs of electrons to a metal ion. A "neutral donor ligand" is a neutrally charged ligand which donates one or more pairs of electrons to a metal ion.

A "transition metal coordination catalyst complex" also referred to as a "transition metal coordination catalyst compound" is a transition metal complex that contains a transition metal, at least one anionic donor ligand, and at least one leaving group with a non-carbon atom directly linking to the metal (such as halogen leaving group(s)), where the complexes are useful for the polymerization of olefins, typically when combined with activator(s). An alkylated "transition metal coordination catalyst complex" also referred to as an "alkylated transition metal coordination catalyst compound" is a transition metal complex that contains a transition metal, at least one anionic donor ligand, and at least one alkyl leaving group, where the complexes are useful for the polymerization of olefins typically when combined with activator(s).

The term "metallocene" also referred to as "metallocene catalyst" or "metallocene compound" describes an organometallic compound having at least one π-bound cyclopentadienyl moiety or substituted cyclopentadienyl moiety (such as substituted or unsubstituted Cp, Ind, or Flu) and more frequently two (or three) π-bound cyclopentadienyl moieties or substituted cyclopentadienyl moieties (such as substituted or unsubstituted Cp, Ind, or Flu) (Cp=cyclopentadienyl, Ind=indenyl, Flu=fluorenyl) bound to a transition metal, said transition metal having at least one leaving group with a non-carbon atom directly bound to the transition metal (such as halogen leaving group(s)). The metallocene complexes are useful for the polymerization of olefins, typically when combined with activator(s).

The term "post-metallocene" also referred to as "post-metallocene catalyst" or "post-metallocene compound" describes transition metal complexes that contain a transition metal, at least one anionic donor ligand, and at least one leaving group with a non-carbon atom directly linking to the metal (such as halogen leaving group(s)), but do not contain any π-coordinated cyclopentadienyl anion donors (e.g., π-bound cyclopentadienyl moiety or substituted cyclopentadienyl moiety), where the complexes are useful for the polymerization of olefins, typically when combined with activator(s). Post-metallocene catalysts include those first disclosed after 1980, typically after 1990.

For purposes of the present disclosure, in relation to catalyst compounds, including but not limited to metallocenes and post-metallocenes, the term "substituted" means that a hydrogen group has been replaced with a hydrocarbyl group, a heteroatom, or a heteroatom containing group. For example, bis(methyl cyclopentadiene)ZrCl$_2$ is a metallocene having two Cp groups substituted with a methyl group on each Cp group.

Alkylating Methods

The alkylating methods described herein react (a) a transition metal coordination catalyst complex (such as a metallocene and/or a post-metallocene), (b) an aluminum alkyl, and (c) a fluoride salt at 0° C. to 85° C. (or 0° C. to 25° C., or 15° C. to 50° C., or 15° C. to 25° C., or 20° C. to 30° C., 25° C. to 40° C., or 35° C. to 50° C., or 40° C. to 85° C.) in a non-polar solvent to yield an alkylated transition metal coordination catalyst complex (such as an alkylated metallocene and/or an alkylated post-metallocene). The alkylation reactions described are performed under mild conditions, preferably under 50° C. to maintain the rac:meso ratio of metallocenes with surprisingly high yields.

The addition of (a) the transition metal coordination catalyst complex (such as the metallocene and/or post-metallocene), (b) the aluminum alkyl, and (c) the fluoride salt to the non-polar solvent may be in any order.

In some instances, later polymer synthesis reactions may desire a mixed catalyst system. Advantageously, the methods described herein allow for alkylating two or more a transition metal coordination catalyst complexes (such as two or more metallocenes, two or more post-metallocenes, or one or more metallocenes in combination with one or more post-metallocenes) in the same reaction vessel.

Reacting may occur for 15 minutes to 36 hours (or 15 minutes to 2 hours, or 1 hour to 8 hours, or 6 hours to 18 hours, or 12 hours to 36 hours) at 15° C. to 50° C. (or 15° C. to 25° C., or 20° C. to 30° C., 25° C. to 40° C., or 35° C. to 50° C.). Surprisingly, reactions with post-metallocene were observed to be completed within 1 hour with a 99 mol % isolated yield.

After reacting (either to a desired point or full reaction completion), the alkylated transition metal coordination catalyst complex (such as alkylated metallocene and/or the alkylated post-metallocene) may be isolated. Advantageously, the reaction products of the aluminum alkyl and the fluoride salt precipitate from solution and can be removed by filtration, centrifugation, or the like. In some instances, excess fluoride salt can be added to the reaction mixture to facilitate precipitation of the aluminum alkyl from the reaction mixture if excess aluminum alkyl is in use to force a complete alkylation of some catalysts.

In some instances, the soluble alkylated metallocenes and/or alkylated post-metallocenes in the solvent may be low enough such that the catalysts also precipitate. In such instance, additional solvent, the same or different, may be used to extract the catalysts from the precipitated material.

Examples of transition metal coordination catalyst complexes (such as metallocenes and post-metallocenes) are provided further herein.

As described above, dialkylated transition metal coordination catalyst complex (such as di-alkylated metallocene and di-alkylated post-metallocene) are preferred. The alkylated transition metal coordination catalyst complex (such as alkylated metallocene and/or the alkylated post-metallocene) may have a molar ratio of di-alkylated to mono-alkylated of 100:0 to 70:30 (or 100:0 to 90:10, or 95:5 to 75:25, or 85:15 to 70:30).

Generally, either rac- or meso-metallocenes have (a) different stereo-controlled capabilities towards polyolefin synthesis such as rac-metallocenes for isotactic polypropylene (iPP) synthesis and (b) different comonomer incorporation capabilities such as rac- and meso-metallocenes showing different hexene comonomer incorporation ratio for gas-phase polyethylene synthesis under the same conditions. Advantageously, the methods described herein may maintain the molar ratio of rac:meso in the alkylated transition metal coordination catalyst complex (such as alkylated metallocene and/or the alkylated post-metallocene) within about 50% of the molar ratio of rac:meso in the transition metal coordination catalyst complex (such as metallocene and/or the post-metallocene). To calculate this, the molar ratio of rac:meso of the alkylated transition metal coordination catalyst complex (such as alkylated metallocene or the alkylated post-metallocene) is subtracted from the molar ratio of rac:meso in the transition metal coordination catalyst complex (such as metallocene or the post-metallocene), which is then divided by the molar ratio of rac:meso in the transition metal coordination catalyst complex (such as metallocene or the post-metallocene) and multiplied by 100. The resultant percentage is ±50%, or ±40%, or ±30%, or ±20%, or ±10%.

The molar ratio of rac:meso in the alkylated transition metal coordination catalyst complex may be 100:0 to 0:100 (or 100:0 to 50:50, or 75:25 to 25:75, or 25:75 to 75:25, or 50:50 to 0:100). Advantageously, the methods described herein may maintain a high molar ratio of rac:meso in the alkylated transition metal coordination catalyst complex. For example, the molar ratio of rac:meso in the alkylated transition metal coordination catalyst complex may be 100:0 to 90:10 (or 100:0 to 97:3, or 99.5:0.5 to 100:5, or 99:1 to 90:10).

The molar ratio of rac:meso in the alkylated metallocene and/or the alkylated post-metallocene may be 100:0 to 0:100 (or 100:0 to 50:50, or 75:25 to 25:75, or 25:75 to 75:25, or 50:50 to 0:100). Advantageously, the methods described herein may maintain a high molar ratio of rac:meso in the alkylated metallocene and/or the alkylated post-metallocene. For example, the molar ratio of rac:meso in the alkylated metallocene may be 100:0 to 90:10 (or 100:0 to 97:3, or 99.5:0.5 to 100:5, or 99:1 to 90:10).

Further, because isolation of the product (the alkylated transition metal coordination catalyst complex, such as the alkylated metallocene and/or alkylated post-metallocene) is straightforward, the isolated yield for the methods described herein may be high (e.g., 85 mol % or greater, or 85 mol % to 100 mol %, or 90 mol % to greater than 99 mol %, or 95 mol % to 100 mol %).

A molar ratio of the transition metal coordination catalyst complex (such as the metallocene or the post-metallocene) to the aluminum alkyl may be 1:1 to 1:5 (or 1:1 to 1:3, or 1:2 to 1:5).

Aluminum alkyls are generally represented by the formula: $AlR_3$ where each R is independently an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Particularly useful aluminum alkyls are represented by the formula: $AlR_3$, where each R is independently selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl) nonyl, decyl, undecyl, docecyl and isomers thereof.

Particularly useful aluminum alkyls are represented by the formula: $AlR_3$, where each R is independently selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

Examples of aluminum alkyls include, but are not limited to, trimethyl aluminum (TMA), triethylaluminum (TEAL), tri-n-propyl aluminum, tri-isopropyl aluminum, tri-n-butyl aluminum, tri-sec-butyl aluminum, tri-t-butyl aluminum, tri-isobutyl aluminum (TIBAL), tri-n-pentyl aluminum, tri-cyclopentyl aluminum, tri-n-hexyl aluminum (TNHAL), tri-(4-methylpentyl) aluminum, tri-(3-methylpentyl) aluminum, tricyclohexyl aluminum, tri-n-octyl aluminum, dimethylethyl aluminum, methyldiethyl aluminum, ethyldimethyl aluminum, dimethyl-n-propyl aluminum, methyl di-n-propyl aluminum, dimethylisopropyl aluminum, dimethylcyclohexyl aluminum, methylethylpropyl aluminum, tri(cyclohexylmethyl)aluminum (TCHMA), tribenzylaluminum (TBZA), and the like, and any combination thereof. Preferred aluminum alkyls include TMA, TEAL, TIBAL, TNHAL, TCHMA, and TBZA.

A molar ratio of aluminum of the aluminum alkyl to fluoride of the fluoride salt, in a single-step alkylation process, is 1:15 to 1:1 (or 1:15 to 1:8, or 1:10 to 1:3, or 1:8 to 1:1). A molar ratio of aluminum of the aluminum alkyl to fluoride of the fluoride salt, in a multiple-step alkylation process, is (a) 15:1 to 1.1:1 (or 15:1 to 8:1, or 10:1 to 3:1, or 8:1 to 1.1:1) in the first step followed by (b) 1:15 to 1:1 (or 1:15 to 1:8, or 1:10 to 1:3, or 1:8 to 1:1) in the second step. A multi-step alkylation process involves excess aluminum alkyl in the first step for metallocenes and/or post-metallocenes that are difficult to alkylate. In the second step, excess aluminum alkyl is added to assist with precipitating the additional fluoride.

The fluoride salt may be an alkali metal fluoride salt, an alkaline earth metal salt, or any combination thereof. Examples of fluoride salts include, but are not limited to, NaF, KF, $MgF_2$, $CaF_2$, and the like, and any combination thereof.

The amount of solvent used may be determined based on the solubility of the alkylated metallocene and/or alkylated post-metallocene in said solvent.

Examples of non-polar solvents include, but are not limited to, butane, isobutane, pentane, isopentane, hexane, isohexane, heptane, octane, decane, benzene, toluene, xylene, and any combination thereof.

In a preferred, non-limiting example, the alkylation reaction may be carried on at the temperature range of 0° C. to 85° C. (or, e.g., 10° C. to 65° C., or 20° C. to 45° C.; the metallocene or post-metallocene compound can be in a concentration of 0.01% to 80%, e.g., 1% to 50%, or 5% to 20%. The aluminum alkyl, metal fluoride, and the catalyst precursor (i.e., non-alkylated transition metal coordination catalyst complex, such as metallocene or post-metallocene) can be added in any sequence, e.g., first catalyst precursor, then, aluminum alkyl, and then the metal fluoride; or the aluminum alkyl, the metal fluoride, and then the catalyst precursor; or the metal fluoride, the catalyst precursor, and then the aluminum alkyl; or the metal fluoride can be mixed with the aluminum alkyl to form a slurry and the slurry is added to the catalyst precursor neat or in a solution (or reverse addition). The reactor and process can be designed as batched or continuing, including sequential reactions involving multiple reactors; e.g., the first reactor is used for catalyst precursor solution preparation, then the solution is added to the second reactor containing aluminum alkyl/metal fluoride slurry, and then the reaction mixture is transferred to the filtration device for separation, and the like.

Transition Metal Coordination Catalyst Complexes, Metallocenes, Post-Metallocenes, Alkylated Transition Metal Coordination Catalyst Complexes, Alkylated Metallocenes, and Alkylated Post-Metallocenes Transition metal coordination catalyst complexes used herein are preferably homogeneous, i.e., soluble in the reaction media.

Transition metal coordination catalyst complexes used herein are preferably metallocenes or post-metallocenes.

Metallocene as used herein include metallocenes comprising group 3 to group 12 metal complexes, such as, group 4, 5 and 6 metal complexes, for example, group 4 metal complexes. The metallocenes may be unbridged metallocene compounds represented by the formula: $Cp^A CP^B M'X'_n$, wherein each $Cp^A$ and $Cp^B$ is independently selected from cyclopentadienyl ligands (e.g., ligands containing a cyclopentadienyl moiety, for example, cyclopentadienyl, indenyl, tetrahydroindacenyl, and or fluorenyl groups and ligands isolobal to cyclopentadienyl, one or both $Cp^A$ and $Cp^B$ may contain heteroatoms, and one or both $Cp^A$ and $Cp^B$ may be substituted by one or more R" groups (i.e., to form substituted cyclopentadienyl, substituted indenyl, substituted tetrahydroindacenyl, and or substituted fluorenyl groups) and each $Cp^A$ and $Cp^B$ is bound to M'; M' is selected from group 3, 4, 5, 6, 7, 8, 9, 10, 11 or 12 atoms and lanthanide group atoms; X' is a leaving group with a non-carbon atom directly linking to the M' center (e.g., examples of the non-carbon atom include, but are not limited to, halogen, oxygen, nitrogen, sulfur, and the like, preferably —Cl, —F, —I, —OR (—OMe, —OEt, —OPh), —NR$_2$ (—NMe$_2$, NEt$_2$), or —SR (—SMe, —SEt)); n is 1, 2, 3 or 4 (typically 1 for group 3 and lanthanide metals, and 2 for group 4, 5, and 6 metals); each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether, where two or more R" groups may form mono- or multi-nuclear cyclic groups. The alkylation reactions described herein may produce an alkylated transition metal coordination catalyst complex of the foregoing, where each X' is independently replaced by an alkyl(straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each X' is independently replaced by an alkyl selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl) nonyl, decyl, undecyl, docecyl and isomers thereof. Preferably each X' is independently replaced by an alkyl selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

The alkylation reactions described herein may produce an alkylated metallocene of the foregoing, for example, $Cp^A Cp^B M'R'_n$, wherein:

each $Cp^A$ and $Cp^B$ is independently selected from cyclopentadienyl ligands (e.g., ligands containing a cyclopentadienyl moiety, for example, cyclopentadienyl, indenyl, tetrahydroindacenyl, and or fluorenyl groups and ligands isolobal to cyclopentadienyl, one or both $Cp^A$ and $Cp^B$ may contain heteroatoms, and one or both $Cp^A$ and $Cp^B$ may be substituted by one or more R" groups (i.e., to form substituted cyclopentadienyl, substituted indenyl, substituted tetrahydroindacenyl, and or substituted fluorenyl groups) and each $Cp^A$ and $Cp^B$ is bound to M';

M' is selected from groups 3, 4, 5, and 6 atoms and lanthanide group atoms; each R' is independently an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms), preferably R' is independently selected from methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl;

n is 1, 2, 3 or 4, preferably 2;

each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether, where two or more R" groups may form mono- or multi-nuclear cyclic groups. The alkylation reactions described herein may produce an alkylated transition metal coordination catalyst complex of the foregoing, where each R' is independently alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each R' is independently selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl) nonyl, decyl, undecyl, docecyl and isomers thereof. Preferably each R' is independently selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

In at least one embodiment, each $Cp^A$ and $Cp^B$ of $Cp^ACp^BM'X'_n$ and $Cp^ACp^BM'R'_n$ is independently selected from cyclopentadienyl, indenyl, fluorenyl, indacenyl, tetrahydroindenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated and substituted versions thereof. Each $Cp^A$ and $Cp^B$ may independently be indacenyl or tetrahydroindenyl.

The metallocene may be a bridged metallocene compound represented by the formula: $Cp^A(T)Cp^BM'X'''$, wherein each $Cp^A$ and $Cp^B$ is independently selected from cyclopentadienyl ligands (e.g., ligands containing a cyclopentadienyl moiety, for example, cyclopentadienyl, indenyl, tetrahydroindacenyl, and or fluorenyl groups and ligands isolobal to cyclopentadienyl, one or both $Cp^A$ and $Cp^B$ may contain heteroatoms, and one or both $Cp^A$ and $Cp^B$ may be substituted by one or more R" groups (i.e., to form substituted cyclopentadienyl, substituted indenyl, substituted tetrahydroindacenyl, and or substituted fluorenyl groups) and each $Cp^A$ and $Cp^B$ is bound to M'; M' is selected from group 3, 4, 5, 6, 7, 8, 9, 10, 11 or 12 atoms and lanthanide group atoms, preferably group 4; X' is a leaving group with a non-carbon atom directly linking to the M' center (e.g., examples of the non-carbon atom include, but are not limited to, halogen, oxygen, nitrogen, sulfur, and the like, preferably —Cl, —F, —I, —OR (—OMe, —OEt, —OPh), —NR$_2$ (—NMe$_2$, NEt$_2$), or —SR (—SMe, —SEt)); n is 1, 2, 3, or 4, typically 1 for group 3 and lanthanide metals, and 2 for group 4, group 5, and group 6 metals; (T) is a bridging group, bound to $Cp^A$ and $Cp^B$, selected from divalent alkyl, divalent substituted alkyl, divalent heteroalkyl, divalent alkenyl, divalent substituted alkenyl, divalent heteroalkenyl, divalent alkynyl, divalent substituted alkynyl, divalent heteroalkynyl, divalent alkoxy, divalent aryloxy, divalent alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether; R" is selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, germanium, ether, and thioether, where two or more R" groups may form mono- or multi-nuclear cyclic groups. The alkylation reactions described herein may produce an alkylated transition metal coordination catalyst complex of the foregoing, where each X' is independently replaced by an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each X' is independently replaced by an alkyl selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl) nonyl, decyl, undecyl, docecyl and isomers thereof. Preferably each X' is independently replaced by an alkyl selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

The alkylation reactions described herein may produce an alkylated metallocene of the foregoing, for example, $Cp^A(T)Cp^BM'R'_n$, wherein each $Cp^A$ and $Cp^B$ is independently selected from cyclopentadienyl ligands (e.g., ligands containing a cyclopentadienyl moiety, for example, cyclopentadienyl, indenyl, tetrahydroindacenyl, and or fluorenyl groups and ligands isolobal to cyclopentadienyl, one or both $Cp^A$ and $Cp^B$ may contain heteroatoms, and one or both $Cp^A$ and $Cp^B$ may be substituted by one or more R" groups (i.e., to form substituted cyclopentadienyl, substituted indenyl, substituted tetrahydroindacenyl, and or substituted fluorenyl groups) and each $Cp^A$ and $Cp^B$ is bound to M'; M' is selected from groups 3, 4, 5, 6, 7, 8, 9, 10, 11 or 12 atoms and lanthanide group atoms, preferably group 4; each R' is independently an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms), preferably R' is independently selected from methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl; n is 1, 2, 3 or 4, preferably 2; (T) is a bridging group, bound to $Cp^A$ and $Cp^B$, selected from divalent alkyl, divalent substituted alkyl, divalent heteroalkyl, divalent alkenyl, divalent substituted alkenyl, divalent heteroalkenyl, divalent alkynyl, divalent substituted alkynyl, divalent heteroalkynyl, divalent alkoxy, divalent aryloxy, divalent alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether; R" is selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, germanium, ether, and thioether, where two or more R" groups may form mono- or multi-nuclear cyclic groups. The alkylation reactions described herein may produce an alkylated transition metal coordination catalyst complex of the foregoing, where each R' is independently alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each R' is independently selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl) nonyl, decyl, undecyl, docecyl and isomers thereof. Preferably each R' is independently selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

In at least one embodiment, each of $Cp^A$ and $Cp^B$ for $Cp^A(T)Cp^BM'X'_n$ and $Cp^A(T)Cp^BM'R'_n$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated, and substituted versions thereof, preferably cyclopentadienyl, n-propylcyclopentadienyl, indenyl, pentamethylcyclopentadienyl, tetramethylcyclopentadienyl, and n-butylcyclopentadienyl. Each $Cp^A$ and $Cp^B$ may independently be indacenyl or tetrahydroindenyl.

In any embodiment of the invention, (T), also referred to as "T", is a bridging group containing at least one Group 13, 14, 15, or 16 element, in particular boron or a Group 14, 15, or 16 element. Examples of suitable bridging groups include $P(=S)R^*$, $P(=Se)R^*$, $P(=O)R^*$, $R^*_2C$, $R^*_2Si$, $R^*_2Ge$, $R^*_2CCR^*_2$, $R^*_2CCR^*_2CR^*_2$, $R^*_2CCR^*_2CR^*_2CR^*_2$, $R^*C=CR^*$, $R^*C=CR^*CR^*_2$, $R^*_2CCR^*=CR^*CR^*_2$, $R^*C=CR^*CR^*=CR^*$, $R^*C=CR^*CR^*_2CR^*_2$, $R^*_2CSiR^*_2$, $R^*_2SiSiR^*_2$, $R^*_2SiOSiR^*_2$, $R^*_2CSiR^*2CR^*2$, $R^*_2SiCR^*_2SiR^*_2$, $R^*C=CR^*SiR^*_2$, $R^*_2CGeR^*_2$, $R^*_2GeGeR^*_2$, $R^*_2CGeR^*_2CR^*_2$, $R^*_2GeCR^*_2GeR^*_2$, $R^*_2SiGeR^*_2$, $R^*C=CR^*GeR^*_2$, $R^*B$, $R^*_2C\text{---}BR^*$, $R^*_2C\text{---}BR^*\text{---}CR^*_2$, $R^*_2C\text{---}O\text{---}CR^*_2$, $R^*_2CR^*_2C\text{---}O\text{---}CR^*_2CR^*_2$, $R^*_2C\text{---}O\text{---}CR^*_2CR^*_2$, $R^*_2C\text{---}O\text{---}CR^*=CR^*$, $R^*_2C\text{---}S\text{---}CR^*_2$, $R^*_2CR^*_2C\text{---}S\text{---}CR^*_2CR^*_2$, $R^*_2C\text{---}S\text{---}CR^*_2CR^*_2$, $R^*_2C\text{---}S\text{---}CR^*=CR^*$, $R^*_2C\text{---}Se\text{---}CR^*_2$, $R^*_2CR^*_2C\text{---}Se\text{---}CR^*_2CR^*_2$, $R^*_2C\text{---}Se\text{---}CR^*_2CR^*_2$, $R^*_2C\text{---}Se\text{---}CR^*=CR^*$, $R^*_2C\text{---}N=CR^*$, $R^*_2C\text{---}NR^*\text{---}CR^*_2$, $R^*_2C\text{---}NR^*\text{---}CR^*_2CR^*_2$, $R^*_2C\text{---}NR^*\text{---}CR^*=CR^*$, $R^*_2CR^*_2C\text{---}NR^*\text{---}CR^*_2CR^*_2$, $R^*_2C\text{---}P=CR^*$, $R^*_2C\text{---}PR^*\text{---}CR^*_2$, O, S, Se, Te, $NR^*$, $PR^*$, $AsR^*$, $SbR^*$, O—O, S—S, $R^*N\text{---}NR^*$, $R^*P\text{---}PR^*$, O—S, O—NR*, O—PR*, S—NR*, S—PR*, and $R^*N\text{---}PR^*$ where R* is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated or aromatic, cyclic or polycyclic substituent. Preferred examples for the bridging group (T) include $CH_2$, $CH_2CH_2$, $SiMe_2$, $SiPh_2$, $SiMePh$, $Si(CH_2)_3$, $Si(CH_2)_4$, O, S, NPh, PPh, NMe, PMe, NEt, NPr, NBu, PEt, PPr, $Me_2SiOSiMe_2$, and PBu. In a preferred embodiment of the invention in any embodiment of any formula described herein, (T) is represented by the formula $ER^d_2$ or $(ER^d_2)_2$, where E is C, Si, or Ge, and each $R^d$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^d$ can form a cyclic structure including aromatic, partially saturated, or saturated cyclic or fused ring system. Preferably, (T) is a bridging group comprising carbon or silica, such as dialkylsilyl, preferably (T) is selected from $CH_2$, $CH_2CH_2$, $C(CH_3)_2$, $SiMe_2$, $Me_2Si\text{---}SiMe_2$, cyclotrimethylenesilylene ($Si(CH_2)_3$), cyclopentamethylenesilylene ($Si(CH_2)_5$) and cyclotetramethylenesilylene ($Si(CH_2)_4$).

Preferably (T) for $Cp^A(T)Cp^BM'X'_n$ and $Cp^A(T)Cp^BM'R'_n$ is a bridging group containing at least one Group 13, 14, 15, or 16 element, in particular boron or a Group 14, 15 or 16 element, preferably (T) is O, S, NR', or $SiR'_2$, where each R' is independently hydrogen or $C_1$-$C_{20}$ hydrocarbyl.

In another embodiment, the metallocene is represented by the formula: $(T)_yCp^A_mM'G_nX'_q$ wherein each $Cp^A$ is bound to M' and is independently selected from cyclopentadienyl ligands (e.g., ligands containing a cyclopentadienyl moiety, for example, cyclopentadienyl, indenyl, tetrahydroindacenyl, and or fluorenyl groups and ligands isolobal to cyclopentadienyl, each $Cp^A$ may contain heteroatoms, and each $Cp^A$ may be substituted by one or more R" groups (i.e., to form substituted cyclopentadienyl, substituted indenyl, substituted tetrahydroindacenyl, and or substituted fluorenyl groups); M' is a group 3, lanthanide, or group 4 transition metal; each G is a heteroatom group, bound to M', represented by the formula $JR^*_z$ where J is N, P, O or S, and R* is a linear, branched, or aliphatic or aromatic cyclic $C_1$-$C_{20}$ hydrocarbyl; z is 1 or 2; (T) is a bridging group as described above, bound to $Cp^A$ and G, and y is 0 or 1, indicating the presence or absence of T; X' is a leaving group with a non-carbon atom directly linking to the M' center (e.g., examples of the non-carbon atom include, but is not limited to, halogen, oxygen, nitrogen, sulfur, and the like, preferably —Cl, —F, —I, —OR (—OMe, —OEt, —OPh), —NR$_2$ (—NMe$_2$, NEt$_2$), or —SR (—SMe, —SEt)); m=1, n=1, 2 or 3, q=1 or 2 (typically 1 for group 3 and lanthanide metals and 2 for group 4 metals), and the sum of m+n+q is equal to the coordination number of the transition metal (such as 3, 4 or 5); each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether, where two or more R" groups may form mono- or multi-nuclear cyclic groups.

The alkylation reactions described herein may produce an alkylated transition metal coordination catalyst complex of the foregoing, where each X' is independently replaced by an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each X' is independently replaced by an alkyl selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl), nonyl, decyl, undecyl, docecyl and isomers thereof. Preferably each X' is independently replaced by an alkyl selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

In at least one embodiment, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof, such as t-butyl, cyclododecyl and adamantyl.

The alkylation reactions described herein may produce an alkylated metallocene of the foregoing, for example, $(T)_y C$-$p^A{}_m M' G_n R'_q$ wherein each $Cp^A$ is independently selected from cyclopentadienyl ligands (e.g., ligands containing a cyclopentadienyl moiety, for example, cyclopentadienyl, indenyl, tetrahydroindacenyl, and or fluorenyl groups and ligands isolobal to cyclopentadienyl, each $Cp^A$ may contain heteroatoms, and each $Cp^A$ may be substituted by one or more R" groups (i.e., to form substituted cyclopentadienyl, substituted indenyl, substituted tetrahydroindacenyl, and or substituted fluorenyl groups); M' is a group 3, lanthanide, or group 4 transition metal; G is a heteroatom group represented by the formula $JR^*{}_z$ where J is N, P, O or S, and R* is a linear, branched, or cyclic $C_1$-$C_{20}$ hydrocarbyl; z is 1 or 2; (T) is a bridging group as described above, and y is 0 or 1, indicating the presence or absence of T; each R' is independently alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms), preferably R' is independently selected from methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl, preferably each R' is independently selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl), nonyl, decyl, undecyl, docecyl and isomers thereof; m=1, n=1, 2 or 3, q=1 or 2 (typically 1 for group 3 and lanthanide metals and 2 for group 4 metals), and the sum of m+n+q is equal to the coordination number of the transition metal (typically 3, 4 or 5); and each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether, where two or more R" groups may form mono- or multi-nuclear cyclic groups.

In at least one aspect, the metallocene and the alkylated metallocene have a symmetry that is C2 symmetrical. In at least one aspect, the metallocene and the alkylated metallocene have a symmetry that is C1 symmetrical. In at least one aspect, the metallocene and the alkylated metallocene have a symmetry that is Cs symmetrical.

Suitable metallocenes useful herein include, but are not limited to, the metallocenes disclosed and referenced in the US patents cited above, as well as those disclosed and referenced in U.S. Pat. Nos. 7,179,876; 7,169,864; 7,157,531; 7,129,302; 6,995,109; 6,958,306; 6,884,748; 6,689,847; US Patent publication 2007/0055028, and published PCT Applications WO 1997/022635; WO 2000/069922; WO 2001/030860; WO 2001/030861; WO 2002/046246; WO 2002/050088; WO 2004/026921; and WO 2006/019494, all fully incorporated herein by reference. Additional metallocenes and post-metallocene-suitable for use herein include those referenced in U.S. Pat. Nos. 6,309,997; 6,265,338; US Patent publication 2006/019925, and the following articles: Resconi, L. et al. (2000) "Selectivity in Propene Polymerization with Metallocene Catalysts," *Chem. Rev.*, v.100(4), pp. 1253-1346; Gibson, V. C. et al. (2003) "Advances in Non-Metallocene Olefin Polymerization Catalysis," *Chem. Rev.*, v.103(1), pp. 283-316; *Chem Eur. J.* 2006, v.12, p. 7546; Nakayama, Y et al. (2004), "Olefin Polymerization Behavior of bis(phenoxy-imine) Zr, Ti, and V complexes with $MgCl_2$-based Cocatalysts," *J. Mol. Catalysis A: Chemical*, v.213, pp. 141-150; Nakayama, Y. et al. (2005), Propylene Polymerization Behavior of Fluorinated Bis(phenoxy-imine) Ti Complexes with an $MgCl_2$—Based Compound ($MgCl_2$—Supported Ti-Based Catalysts)," *Macromol. Chem. Phys.*, v.206(18), pp. 1847-1852; and Matsui, S. et al. (2001) "A Family of Zirconium Complexes Having Two Phenoxy-Imine Chelate Ligands for Olefin Polymerization," *J. Am. Chem. Soc.*, v.123(28), pp. 6847-6856.

Exemplary metallocene compounds useful herein include:
bis(cyclopentadienyl)zirconium dichloride,
bis(n-butylcyclopentadienyl)zirconium dichloride,
bis(pentamethylcyclopentadienyl)zirconium dichloride,
bis(pentamethylcyclopentadienyl)hafnium dichloride,
bis(1-methyl-3-n-butylcyclopentadienyl)zirconium dichloride,
bis(1-methyl-3-n-butylcyclopentadienyl)hafnium dichloride,
bis(tetrahydro-1-indenyl)zirconium dichloride, and
(n-propyl cyclopentadienyl, pentamethyl cyclopentadienyl) zirconium dichloride.

The alkylation reactions described herein may produce an alkylated metallocene precursor of the foregoing, for example,
bis(cyclopentadienyl)zirconium dimethyl,
bis(n-butylcyclopentadienyl)zirconium dimethyl,
bis(pentamethylcyclopentadienyl)zirconium dimethyl,
bis(pentamethylcyclopentadienyl)hafnium dimethyl,
bis(1-methyl-3-n-butylcyclopentadienyl)zirconium dimethyl,
bis(1-methyl-3-n-butylcyclopentadienyl)hafnium dimethyl,
bis(tetrahydro-1-indenyl)zirconium dimethyl, and
(n-propyl cyclopentadienyl, pentamethyl cyclopentadienyl) zirconium dimethyl.

In at least one aspect, the transition metal coordination catalyst complex compound may be selected from:
dimethylsilylbis(tetrahydroindenyl)$M^c X_n$,
dimethylsilyl bis(2-methylindenyl)$M^c X_n$,
dimethylsilyl bis(2-methylfluorenyl)$M^c X_n$,
dimethylsilyl bis(2-methyl-5,7-propylindenyl)$M^c X_n$,
dimethylsilyl bis(2-methyl-4-phenylindenyl)$M^c X_n$,
dimethylsilyl bis(2-ethyl-5-phenylindenyl)$M^c X_n$,
dimethylsilyl bis(2-methyl-4-biphenylindenyl)$M^c X_n$,
dimethylsilylene bis(2-methyl-4-carbazolylindenyl)$M^c X_n$,
rac-dimethylsilyl-bis-(5,6,7,8-tetrahydro-5,5,8,8-tetramethyl-2-methyl-1H-benz(f)indene)$M^c X_n$,
diphenylmethylene (cyclopentadienyl)(fluoreneyl)$M^c X_n$,
bis(methylcyclopentadienyl)$M^c X_n$,
rac-dimethylsilylbis(2-methyl,3-propyl indenyl)$M^c X_n$, dimethylsilylbis(indenyl)M$^c$X$_n$,
rac-meso-diphenylsilyl-bis(n-propylcyclopentadienyl) M$^c$X$_n$,
1,1'-bis(4-triethylsilylphenyl)methylene-(cyclopentadienyl) (3,8-di-tertiary-butyl-1-fluorenyl)M$^c$X$_n$ (bridge is considered the 1 position),
bis-trimethylsilylphenyl-methylene(cyclopentadienyl)(di-t-butylfluorenyl)M$^c$X$_n$,
bis-trimethylsilylphenyl-methylene(cyclopentadienyl)(fluorenyl)M$^c$X$_n$,
bisphenylmethylene(cyclopentadienyl)(dimethylfluorenyl) M$^c$X$_n$,
bis(n-propylcyclopentadienyl)M$^c$X$_n$,
bis(n-butylcyclopentadienyl)M$^c$X$_n$,
bis(n-pentylcyclopentadienyl)M$^c$X$_n$,
(n-propyl cyclopentadienyl)(n-butylcyclopentadienyl) M$^c$X$_n$,
bis[(2-trimethylsilylethyl)cyclopentadienyl]M$^c$X$_n$,
bis(trimethylsilyl cyclopentadienyl)M$^c$X$_n$,
dimethylsilylbis(n-propylcyclopentadienyl)M$^c$X$_n$,
dimethylsilylbis(n-butylcyclopentadienyl)M$^c$X$_n$,
bis(1-n-propyl-2-methylcyclopentadienyl)M$^c$X$_n$,
(n-propylcyclopentadienyl)(1-n-propyl-3-n-butylcyclopentadienyl)M$^c$X$_n$,
bis(1-methyl, 3-n-butyl cyclopentadienyl)M$^c$X$_n$,
bis(indenyl)M$^c$X$_n$,
dimethylsilyl (tetramethylcyclopentadienyl)(cyclododecylamido)M$^c$X$_n$,
dimethylsilyl (tetramethylcyclopentadienyl)(t-butylamido) M$^c$X$_n$,
1,1'-bis(4-triethylsilylphenyl)(methylene)(cyclopentadienyl)(fluorenyl)M$^c$X$_n$;
μ-(CH$_3$)$_2$Si(cyclopentadienyl)(1-adamantylamido)M$^c$X$_n$,
μ-(CH$_3$)$_2$Si(3-tertbutylcyclopentadienyl)(1-adamantylamido)M$^c$X$_n$,
μ-(CH$_3$)$_2$(tetramethylcyclopentadienyl)(1-adamantylamido) M$^c$X$_n$,
μ-(CH$_3$)$_2$Si(tetramethylcyclopentadienyl)(1-adamantylamido)M$^c$X$_n$,
μ-(CH$_3$)$_2$C(tetramethylcyclopentadienyl)(1-adamantylamido)M$^c$X$_n$,
μ-(CH$_3$)$_2$Si(tetramethylcyclopentadienyl)(1-tertbutylamido) M$^c$X$_n$,
μ-(CH$_3$)$_2$Si(fluorenyl)(1-tertbutylamido)M$^c$X$_n$,
μ-(CH$_3$)$_2$Si(tetramethylcyclopentadienyl)(1-cyclododecylamido)M$^c$X$_n$,
μ-(C$_6$H$_5$)$_2$C(tetramethylcyclopentadienyl)(1-cyclododecylamido)M$^c$X$_n$,
μ-(CH$_3$)$_2$Si(η$^5$-2,6,6-trimethyl-1,5,6,7-tetrahydro-s-indacen-1-yl)(tertbutylamido)M$^c$X$_n$,
where n is 2, Me is selected from Ti, Zr, and Hf; each X is independently is a leaving group with a non-carbon atom directly linking to M$^c$ (such as Cl, F, Br or I) and after alkylation, each X is independently replaced by an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each X is independently replaced by an alkyl selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl), nonyl, decyl, undecyl, docecyl and isomers thereof. Preferably each X is independently replaced by an alkyl selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

In at least one aspect, the alkylated transition metal compound is selected from:
dimethylsilylbis(tetrahydroindenyl)M$^c$R$_n$,
dimethylsilyl bis(2-methylindenyl)M$^c$R$_n$,
dimethylsilyl bis(2-methylfluorenyl)M$^c$R$_n$,
dimethylsilyl bis(2-methyl-5,7-propylindenyl)M$^c$R$_n$,
dimethylsilyl bis(2-methyl-4-phenylindenyl)M$^c$R$_n$,
dimethylsilyl bis(2-ethyl-5-phenylindenyl)M$^c$R$_n$,
dimethylsilyl bis(2-methyl-4-biphenylindenyl)M$^c$R$_n$,
dimethylsilylene bis(2-methyl-4-carbazolylindenyl)M$^c$R$_n$,
rac-dimethylsilyl-bis-(5,6,7,8-tetrahydro-5,5,8,8-tetramethyl-2-methyl-1H-benz(f)indene)M$^c$R$_n$,
diphenylmethylene (cyclopentadienyl)(fluoreneyl)M$^c$R$_n$,
bis(methylcyclopentadienyl)M$^c$R$_n$,
rac-dimethylsilylbis(2-methyl,3-propyl indenyl)M$^c$R$_n$,
dimethylsilylbis(indenyl)M$^c$R$_n$,
rac-meso-diphenylsilyl-bis(n-propylcyclopentadienyl) M$^c$R$_n$,
1,1'-bis(4-triethylsilylphenyl)methylene-(cyclopentadienyl) (3,8-di-tertiary-butyl-1-fluorenyl)M$^c$R$_n$ (bridge is considered the 1 position),
bis-trimethylsilylphenyl-methylene(cyclopentadienyl)(di-t-butylfluorenyl)M$^c$R$_n$,
bis-trimethylsilylphenyl-methylene(cyclopentadienyl)(fluorenyl)M$^c$R$_n$,
bisphenylmethylene(cyclopentadienyl)(dimethylfluorenyl) M$^c$R$_n$,
bis(n-propylcyclopentadienyl)M$^c$R$_n$,
bis(n-butylcyclopentadienyl)M$^c$R$_n$,
bis(n-pentylcyclopentadienyl)M$^c$R$_n$,
(n-propyl cyclopentadienyl)(n-butylcyclopentadienyl) M$^c$R$_n$,
bis[(2-trimethylsilylethyl)cyclopentadienyl]M$^c$R$_n$,
bis(trimethylsilyl cyclopentadienyl)M$^c$R$_n$,
dimethylsilylbis(n-propylcyclopentadienyl)M$^c$R$_n$,
dimethylsilylbis(n-butylcyclopentadienyl)M$^c$R$_n$,
bis(1-n-propyl-2-methylcyclopentadienyl)M$^c$R$_n$,
(n-propylcyclopentadienyl)(1-n-propyl-3-n-butylcyclopentadienyl)M$^c$R$_n$,
bis(1-methyl, 3-n-butyl cyclopentadienyl)M$^c$R$_n$,
bis(indenyl)M$^c$R$_n$,
dimethylsilyl (tetramethylcyclopentadienyl)(cyclododecylamido)M$^c$R$_n$,
dimethylsilyl (tetramethylcyclopentadienyl)(t-butylamido) M$^c$R$_n$,
1,1'-bis(4-triethylsilylphenyl)(methylene)(cyclopentadienyl)(fluorenyl)M$^c$R$_n$;
μ-(CH$_3$)$_2$Si(cyclopentadienyl)(1-adamantylamido)M$^c$R$_n$,
μ-(CH$_3$)$_2$Si(3-tertbutylcyclopentadienyl)(1-adamantylamido)M$^c$R$_n$,
μ-(CH$_3$)$_2$(tetramethylcyclopentadienyl)(1-adamantylamido) M$^c$R$_n$,
μ-(CH$_3$)$_2$Si(tetramethylcyclopentadienyl)(1-adamantylamido)M$^c$R$_n$,
μ-(CH$_3$)$_2$C(tetramethylcyclopentadienyl)(1-adamantylamido)M$^c$R$_n$,
μ-(CH$_3$)$_2$Si(tetramethylcyclopentadienyl)(1-tertbutylamido) M$^c$R$_n$,
μ-(CH$_3$)$_2$Si(fluorenyl)(1-tertbutylamido)M$^c$R$_n$,
μ-(CH$_3$)$_2$Si(tetramethylcyclopentadienyl)(1-cyclododecylamido)M$^c$R$_n$, μ-(C₆H₅)₂C(tetramethylcyclopentadienyl)(1-cyclododecylamido)M$^c$R$_n$, μ-(CH₃)Si(η$^5$-2,6,6-trimethyl-1,5,6,7-tetrahydro-s-indacen-1-yl)(tertbutylamido)M$^c$R$_n$, where n is 2, M' is selected from Ti, Zr, and Hf; and each R is independently selected from methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

In some embodiments of the invention, the metallocene is one or more of:

bis(1-methyl, 3-n-butyl cyclopentadienyl)M$^c$(X)₂;
dimethylsilyl bis(indenyl)M$^c$(X)₂;
bis(indenyl)M$^c$(X)₂;
dimethylsilyl bis(tetrahydroindenyl)M$^c$(X)₂;
bis(n-propylcyclopentadienyl)M$^c$(X)₂;
dimethylsilyl (tetramethylcyclopentadienyl)(cyclododecylamido)M$^c$(X)₂;
dimethylsilyl (tetramethylcyclopentadienyl)(cyclododecylamido)M$^c$(X)₂;
dimethylsilyl (tetramethylcyclopentadienyl)(t-butylamido)M$^c$(X)₂;
dimethylsilyl (tetramethylcyclopentadienyl)(t-butylamido)M$^c$(X)₂;
1,1'-bis(4-triethylsilylphenyl)(methylene)(cyclopentadienyl)(fluorenyl)M$^c$(X)₂;
μ-(CH₃)₂Si(cyclopentadienyl)(1-adamantylamido)M$^c$(X)₂;
μ-(CH₃)₂Si(3-tertbutylcyclopentadienyl)(1-adamantylamido)M$^c$(X)₂;
μ-(CH₃)₂(tetramethylcyclopentadienyl)(1-adamantylamido)M$^c$(X)₂;
μ-(CH₃)₂Si(tetramethylcyclopentadienyl)(1-adamantylamido)M$^c$(X)₂;
μ-(CH₃)₂C(tetramethylcyclopentadienyl)(1-adamantylamido)M$^c$(X)₂;
μ-(CH₃)₂Si(tetramethylcyclopentadienyl)(1-tertbutylamido)M$^c$(X)₂;
μ-(CH₃)₂Si(fluorenyl)(1-tertbutylamido)M$^c$(X)₂;
μ-(CH₃)₂Si(tetramethylcyclopentadienyl)(1-cyclododecylamido)M$^c$(X)₂;
μ-(C₆H₅)₂C(tetramethylcyclopentadienyl)(1-cyclododecylamido)M$^c$(X)₂;
μ-(CH₃)₂Si(η$^5$-2,6,6-trimethyl-1,5,6,7-tetrahydro-s-indacen-1-yl)(tertbutylamido)M$^c$(X)₂;

where Me is selected from Ti, Zr, and Hf; and each X is independently a leaving group with a non-carbon atom directly linking to M$^c$ (such as Cl, F, Br or I).

In some embodiments of the invention, the alkylated metallocene is one or more of:

bis(1-methyl, 3-n-butyl cyclopentadienyl)M$^c$(R)₂;
dimethylsilyl bis(indenyl)M$^c$(R)₂;
bis(indenyl)M$^c$(R)₂;
dimethylsilyl bis(tetrahydroindenyl)M$^c$(R)₂;
bis(n-propylcyclopentadienyl)M$^c$(R)₂;
dimethylsilyl (tetramethylcyclopentadienyl)(cyclododecylamido)M$^c$(R)₂;
dimethylsilyl (tetramethylcyclopentadienyl)(cyclododecylamido)M$^c$(R)₂;
dimethylsilyl (tetramethylcyclopentadienyl)(t-butylamido)M$^c$(R)₂;
dimethylsilyl (tetramethylcyclopentadienyl)(t-butylamido)M$^c$(R)₂;
1,1'-bis(4-triethylsilylphenyl)(methylene)(cyclopentadienyl)(fluorenyl)M$^c$(R)₂;
μ-(CH₃)₂Si(cyclopentadienyl)(1-adamantylamido)M$^c$(R)₂;
μ-(CH₃)₂Si(3-tertbutylcyclopentadienyl)(1-adamantylamido)M$^c$(R)₂;
μ-(CH₃)₂(tetramethylcyclopentadienyl)(1-adamantylamido)M$^c$(R)₂;
μ-(CH₃)₂Si(tetramethylcyclopentadienyl)(1-adamantylamido)M$^c$(R)₂;
μ-(CH₃)₂C(tetramethylcyclopentadienyl)(1-adamantylamido)M$^c$(R)₂;
μ-(CH₃)₂Si(tetramethylcyclopentadienyl)(1-tertbutylamido)M$^c$(R)₂;
μ-(CH₃)₂Si(fluorenyl)(1-tertbutylamido)M$^c$(R)₂;
μ-(CH₃)₂Si(tetramethylcyclopentadienyl)(1-cyclododecylamido)M$^c$(R)₂;
μ-(C₆H₅)₂C(tetramethylcyclopentadienyl)(1-cyclododecylamido)M$^c$(R)₂;
μ-(CH₃)₂Si(η$^5$-2,6,6-trimethyl-1,5,6,7-tetrahydro-s-indacen-1-yl)(tertbutylamido)M$^c$(R)₂;

where M' is selected from Ti, Zr, and Hf; and each R is independently selected from methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

In preferred aspects of the application, the alkylated metallocene is one or more of:

dimethylsilyl (tetramethylcyclopentadienyl)(cyclododecylamido)titanium dimethyl;
dimethylsilyl (tetramethylcyclopentadienyl)(cyclododecylamido)titanium dimethyl;
dimethylsilyl (tetramethylcyclopentadienyl)(t-butylamido) titanium dimethyl;
dimethylsilyl (tetramethylcyclopentadienyl)(t-butylamido) titanium dimethyl;
μ-(CH₃)₂Si(cyclopentadienyl)(1-adamantylamido)titanium dimethyl;
μ-(CH₃)₂Si(3-tertbutylcyclopentadienyl)(1-adamantylamido)titanium dimethyl;
μ-(CH₃)₂(tetramethylcyclopentadienyl)(1-adamantylamido) titanium dimethyl;
μ-(CH₃)₂Si(tetramethylcyclopentadienyl)(1-adamantylamido)titanium dimethyl;
μ-(CH₃)₂C(tetramethylcyclopentadienyl)(1-adamantylamido)titanium dimethyl;
μ-(CH₃)₂Si(tetramethylcyclopentadienyl)(1-tertbutylamido) titanium dimethyl;
μ-(CH₃)₂Si(fluorenyl)(1-tertbutylamido)titanium dimethyl;
μ-(CH₃)₂Si(tetramethylcyclopentadienyl)(1-cyclododecylamido)titanium dimethyl;
μ-(C₆H₅)₂C(tetramethylcyclopentadienyl)(1-cyclododecylamido)titanium dimethyl; and/or
μ-(CH₃)₂Si(η$^5$-2,6,6-trimethyl-1,5,6,7-tetrahydro-s-indacen-1-yl)(tertbutylamido)titanium dimethyl.

In at least one aspect, the metallocene is rac-dimethylsilyl-bis(indenyl)hafnium dichloride and/or 1,1'-bis(4-triethylsilylphenyl)methylene-(cyclopentadienyl)(3,8-di-tertiary-butyl-1-fluorenyl)hafnium dichloride and/or dimethylsilyl bis(tetrahydroindenyl)zirconium dichloride. Accordingly, the alkylated metallocene is rac-dimethylsilyl-bis(indenyl) hafnium dimethyl and/or 1,1'-bis(4-triethylsilylphenyl) methylene-(cyclopentadienyl)(3,8-di-tertiary-butyl-1-fluorenyl)hafnium dimethyl and/or dimethylsilyl bis (tetrahydroindenyl)zirconium dimethyl.

In at least one embodiment, the metallocene is one or more of:

bis(1-methyl, 3-n-butyl cyclopentadienyl)hafnium dichloride,
bis(1-methyl, 3-n-butyl cyclopentadienyl)zirconium dichloride,
dimethylsilyl bis(indenyl)zirconium dichloride,
dimethylsilyl bis(indenyl)hafnium dichloride, bis(indenyl)zirconium dichloride,
bis(indenyl)hafnium dichloride,
dimethylsilyl bis(tetrahydroindenyl)zirconium dichloride,
bis(n-propylcyclopentadienyl)zirconium dichloride,
dimethylsilylbis(tetrahydroindenyl)hafnium dichloride,
dimethylsilyl bis(2-methylindenyl)zirconium dichloride,
dimethylsilyl bis(2-methylfluorenyl)zirconium dichloride,
dimethylsilyl bis(2-methylindenyl)hafnium dichloride,
dimethylsilyl bis(2-methylfluorenyl)hafnium dichloride,
dimethylsilyl bis(2-methyl-5,7-propylindenyl) zirconium dichloride,
dimethylsilyl bis(2-methyl-4-phenylindenyl) zirconium dichloride,
dimethylsilyl bis(2-ethyl-5-phenylindenyl) zirconium dichloride,
dimethylsilyl bis(2-methyl-4-biphenylindenyl) zirconium dichloride,
dimethylsilylene bis(2-methyl-4-carbazolylindenyl) zirconium dichloride,
rac-dimethylsilyl-bis-(5,6,7,8-tetrahydro-5,5,8,8-tetramethyl-2-methyl-1H-benz(f)indene)hafnium dichloride,
diphenylmethylene (cyclopentadienyl)(fluorenyl)hafnium dichloride,
bis(methylcyclopentadienyl)zirconium dichloride,
rac-dimethylsiylbis(2-methyl,3-propyl indenyl)hafnium dichloride,
dimethylsilylbis(indenyl)hafnium dichloride,
dimethylsilylbis(indenyl)zirconium dichloride,
dimethyl rac-dimethylsilyl-bis-(5,6,7,8-tetrahydro-5,5,8,8-tetramethyl-2-methyl-1H-benz(f)indene)hafnium dichloride,
rac-meso-diphenylsilyl-bis(n-propylcyclopentadienyl)hafnium dichloride,
1,1'-bis(4-triethylsilylphenyl)methylene-(cyclopentadienyl) (3,8-di-tertiary-butyl-1-fluorenyl)hafnium dichloride,
1,1'-bis(4-triethylsilylphenyl)methylene-(cyclopentadienyl) (3,8-di-tertiary-butyl-1-fluorenyl)hafnium dichloride (bridge is considered the 1 position),
bis-trimethylsilylphenyl-methylene(cyclopentadienyl)(di-t-butylfluorenyl)hafnium dichloride,
bis-trimethylsilylphenyl-methylene(cyclopentadienyl)(fluorenyl)hafnium dichloride,
bisphenylmethylene(cyclopentadienyl)(dimethylfluorenyl) hafnium dichloride,
bis(n-propylcyclopentadienyl)hafnium dichloride,
bis(n-butylcyclopentadienyl)hafnium dichloride,
bis(n-pentylcyclopentadienyl)hafnium dichloride,
(n-propyl cyclopentadienyl)(n-butylcyclopentadienyl)hafnium dichloride,
bis[(2-trimethylsilylethyl)cyclopentadienyl]hafnium dichloride,
bis(trimethylsilyl cyclopentadienyl)hafnium dichloride,
dimethylsilylbis(n-propylcyclopentadienyl)hafnium dichloride,
dimethylsilylbis(n-butylcyclopentadienyl)hafnium dichloride,
bis(1-n-propyl-2-methylcyclopentadienyl)hafnium dichloride,
(n-propylcyclopentadienyl)(1-n-propyl-3-n-butylcyclopentadienyl)hafnium dichloride, and
dimethylsilyl(3-n-propylcyclopentadienyl)(tetramethylcyclopentadienyl)zirconium dichloride.

In at least one embodiment, the alkylated metallocene is one or more of:
bis(1-methyl, 3-n-butyl cyclopentadienyl)hafnium dimethyl,
bis(1-methyl, 3-n-butyl cyclopentadienyl)zirconium dimethyl,
dimethylsilyl bis(indenyl)zirconium dimethyl,
dimethylsilyl bis(indenyl)hafnium dimethyl,
bis(indenyl)zirconium dimethyl,
bis(indenyl)hafnium dimethyl,
dimethylsilyl bis(tetrahydroindenyl)zirconium dimethyl,
bis(n-propylcyclopentadienyl)zirconium dimethyl,
dimethylsilylbis(tetrahydroindenyl)hafnium dimethyl,
dimethylsilyl bis(2-methylindenyl)zirconium dimethyl,
dimethylsilyl bis(2-methylfluorenyl)zirconium dimethyl,
dimethylsilyl bis(2-methylindenyl)hafnium dimethyl,
dimethylsilyl bis(2-methylfluorenyl)hafnium dimethyl,
dimethylsilyl bis(2-methyl-5,7-propylindenyl) zirconium dimethyl,
dimethylsilyl bis(2-methyl-4-phenylindenyl) zirconium dimethyl,
dimethylsilyl bis(2-ethyl-5-phenylindenyl) zirconium dimethyl,
dimethylsilyl bis(2-methyl-4-biphenylindenyl) zirconium dimethyl,
dimethylsilylene bis(2-methyl-4-carbazolylindenyl) zirconium dimethyl,
rac-dimethylsilyl-bis-(5,6,7,8-tetrahydro-5,5,8,8-tetramethyl-2-methyl-1H-benz(f)indene)hafnium dimethyl,
diphenylmethylene (cyclopentadienyl)(fluorenyl)hafnium dimethyl,
bis(methylcyclopentadienyl)zirconium dimethyl,
rac-dimethylsiylbis(2-methyl,3-propyl indenyl)hafnium dimethyl,
dimethylsilylbis(indenyl)hafnium dimethyl,
dimethylsilylbis(indenyl)zirconium dimethyl,
dimethyl rac-dimethylsilyl-bis-(5,6,7,8-tetrahydro-5,5,8,8-tetramethyl-2-methyl-1H-benz(f)indene)hafnium dimethyl,
rac-meso-diphenylsilyl-bis(n-propylcyclopentadienyl)hafnium dimethyl,
1,1'-bis(4-triethylsilylphenyl)methylene-(cyclopentadienyl) (3,8-di-tertiary-butyl-1-fluorenyl)hafnium dimethyl,
1,1'-bis(4-triethylsilylphenyl)methylene-(cyclopentadienyl) (3,8-di-tertiary-butyl-1-fluorenyl)hafnium dimethyl (bridge is considered the 1 position),
bis-trimethylsilylphenyl-methylene(cyclopentadienyl)(di-t-butylfluorenyl)hafnium dimethyl,
bis-trimethylsilylphenyl-methylene(cyclopentadienyl)(fluorenyl)hafnium dimethyl,
bisphenylmethylene(cyclopentadienyl)(dimethylfluorenyl) hafnium dimethyl,
bis(n-propylcyclopentadienyl)hafnium dimethyl,
bis(n-butylcyclopentadienyl)hafnium dimethyl,
bis(n-pentylcyclopentadienyl)hafnium dimethyl,
(n-propyl cyclopentadienyl)(n-butylcyclopentadienyl)hafnium dimethyl, bis[(2-trimethylsilylethyl)cyclopentadienyl]hafnium dimethyl,
bis(trimethylsilyl cyclopentadienyl)hafnium dimethyl,
dimethylsilylbis(n-propylcyclopentadienyl)hafnium dimethyl,
dimethylsilylbis(n-butylcyclopentadienyl)hafnium dimethyl,
bis(1-n-propyl-2-methylcyclopentadienyl)hafnium dimethyl,
(n-propylcyclopentadienyl)(1-n-propyl-3-n-butylcyclopentadienyl)hafnium dimethyl,
bis(n-propylcyclopentadienyl)hafnium dimethyl,
bis(n-butylcyclopentadienyl)hafnium dimethyl,
bis(n-pentylcyclopentadienyl)hafnium dimethyl,
(n-propyl cyclopentadienyl)(n-butylcyclopentadienyl)hafnium dimethyl,
bis[(2-trimethylsilylethyl)cyclopentadienyl]hafnium dimethyl,
bis(trimethylsilyl cyclopentadienyl)hafnium dimethyl,
dimethylsilylbis(n-propylcyclopentadienyl)hafnium dimethyl,
dimethylsilylbis(n-butylcyclopentadienyl)hafnium dimethyl,
bis(1-n-propyl-2-methylcyclopentadienyl)hafnium dimethyl,
(n-propylcyclopentadienyl)(1-n-propyl-3-n-butylcyclopentadienyl)hafnium dimethyl, and
dimethylsilyl(3-n-propylcyclopentadienyl)(tetramethylcyclopentadienyl)zirconium dimethyl.

Exemplary alkylated metallocenes used for polymerizations of the present disclosure may be represented by the Formulas (III), (IV), (V), and (VI):

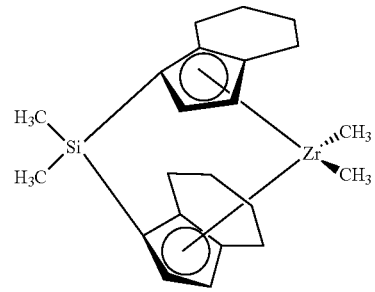

(III)

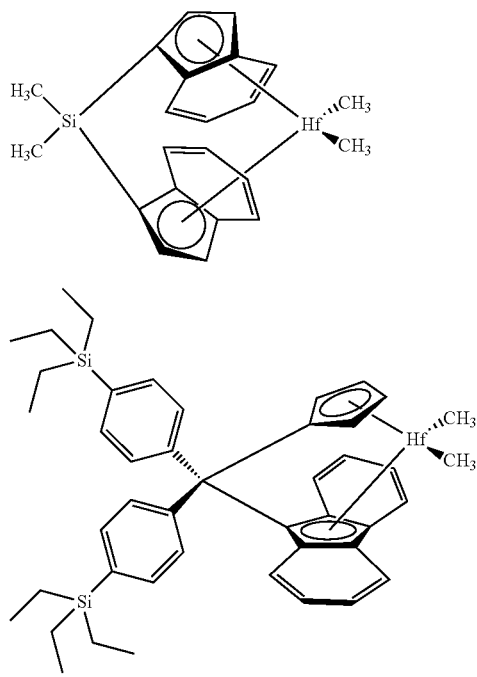

(IV)

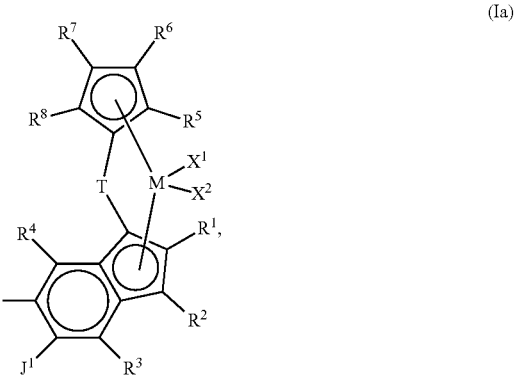

(V)

(VI)

Exemplary $C_1$ metallocenes useful herein may be represented by Formula (Ia):

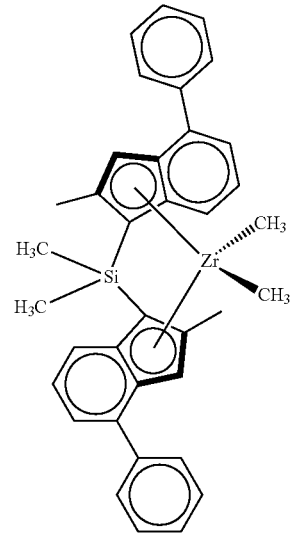

(Ia)

wherein:
M is as group 4 metal, such as Zr Hf or Ti;
T is a bridging group as defined herein for (T) above;
each of $X^1$ and $X^2$ is a leaving group with a non-carbon atom directly linking to the M' center (e.g., examples of the non-carbon atom include, but are not limited to, halogen, oxygen, nitrogen, sulfur, and the like, preferably —Cl, —F, —I, —OR (—OMe, —OEt, —OPh), —NR$_2$ (—NMe$_2$, NEt$_2$) or —SR (—SMe, —SEt));
$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl;

$R^3$ is an unsubstituted $C_4$-$C_{62}$ cycloalkyl, a substituted $C_4$-$C_{62}$ cycloalkyl, an unsubstituted $C_4$-$C_{62}$ aryl, a substituted $C_4$-$C_{62}$ aryl, an unsubstituted $C_4$-$C_{62}$ heteroaryl, or a substituted $C_4$-$C_{62}$ heteroaryl;

each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$, and $R^8$ is independently hydrogen, a halogen, an unsubstituted $C_1$-$C_{40}$ hydrocarbyl a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$ or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or one or more of $R^5$ and $R^6$, $R^6$ and $R^7$, or $R^7$ and $R^8$ can be joined to form a substituted or unsubstituted $C_4$-$C_{62}$ saturated or unsaturated cyclic or polycyclic ring structure, or a combination thereof; and $J^1$ and $J^2$ are joined to form a substituted or unsubstituted $C_4$-$C_{62}$ saturated or unsaturated cyclic or polycyclic ring structure, or a combination thereof. The alkylation reactions described herein may produce an alkylated metallocene of the foregoing, where each $X^1$ and $X^2$ is independently replaced by an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each $X^1$ and $X^2$ is independently replaced by an alkyl selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl), nonyl, decyl, undecyl, docecyl and isomers thereof. Preferably each $X^1$ and $X^2$ is independently replaced by an alkyl selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

Non-limited examples of dihalide metallocenes per Formula (Ia) that can be alkylated herein are shown in the table below.

TABLE 1

Examples of $C_1$ Metallocene Compounds Represented by the Formula (Ia)

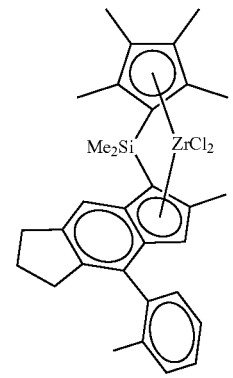

1

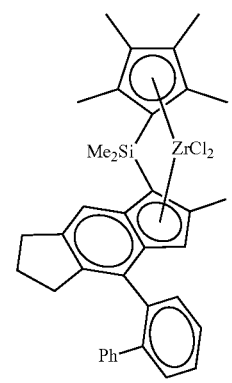

2

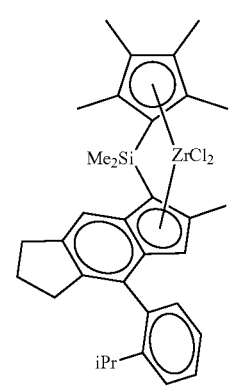

3

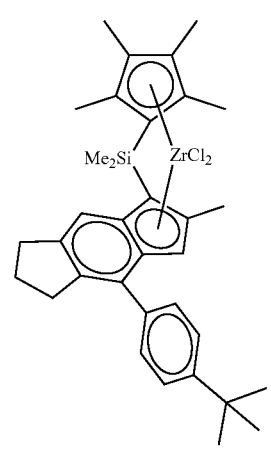

4

TABLE 1-continued
Examples of C₁ Metallocene Compounds Represented by the Formula (Ia)
5
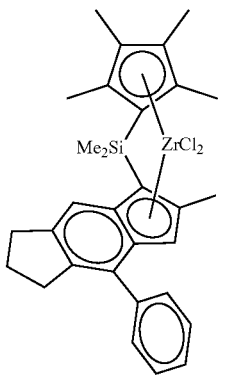
6
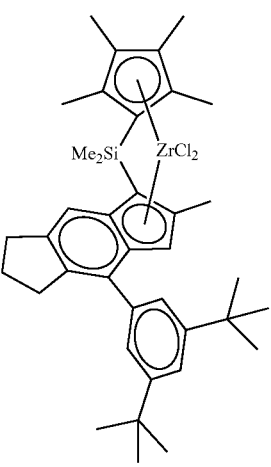
7
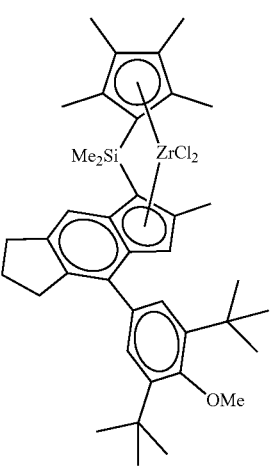
8
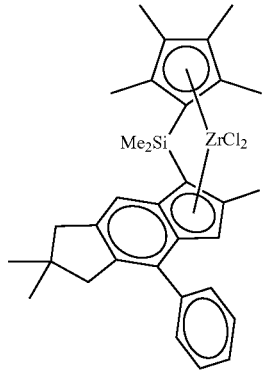
9
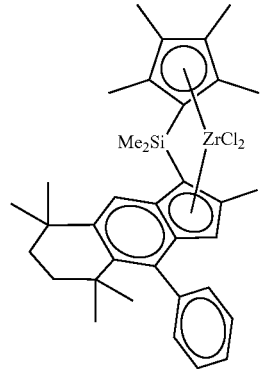
10
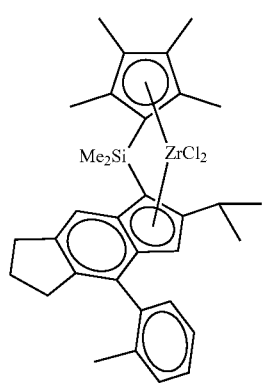
11
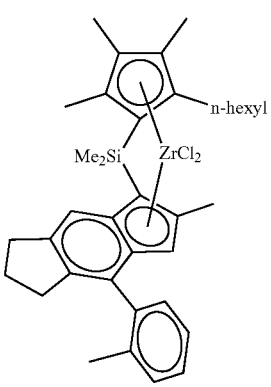

TABLE 1-continued
Examples of $C_1$ Metallocene Compounds Represented by the Formula (Ia)
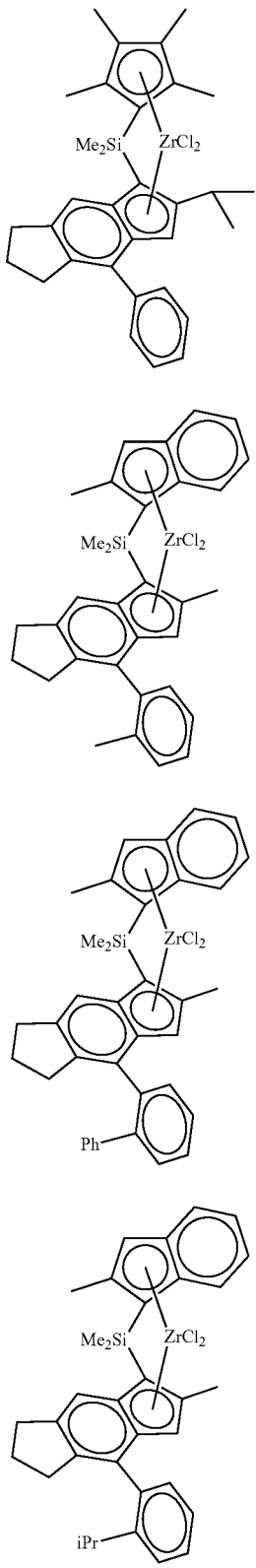
12
13
14
15
TABLE 1-continued
Examples of $C_1$ Metallocene Compounds Represented by the Formula (Ia)
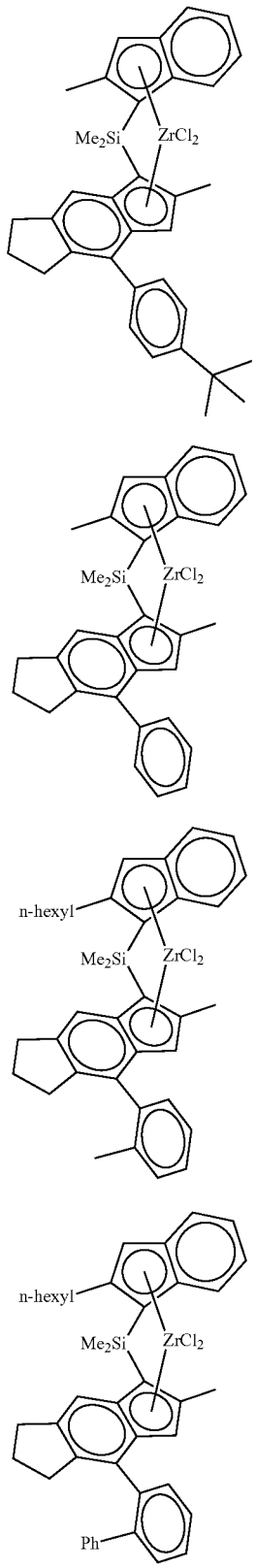
16
17
18
19

TABLE 1-continued
Examples of $C_1$ Metallocene Compounds Represented by the Formula (Ia)
20
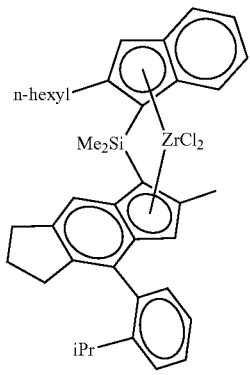
21
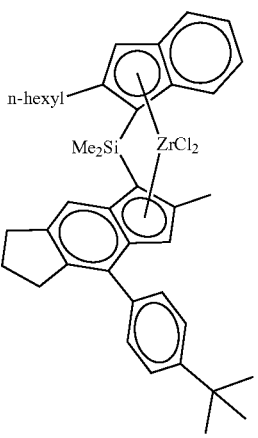
22
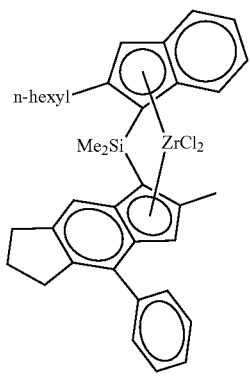
23
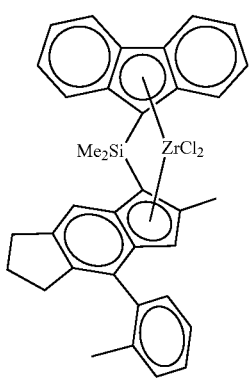
TABLE 1-continued
Examples of $C_1$ Metallocene Compounds Represented by the Formula (Ia)
24
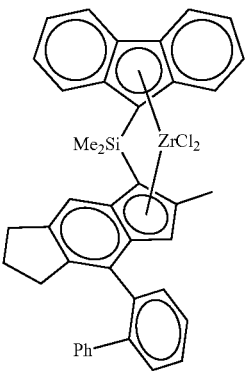
25
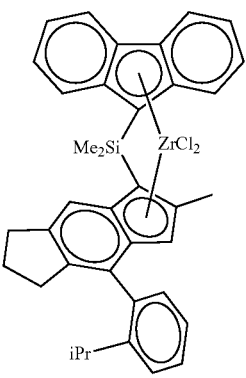
26
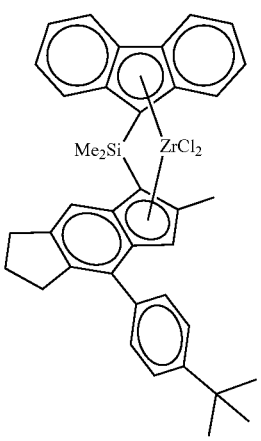
27
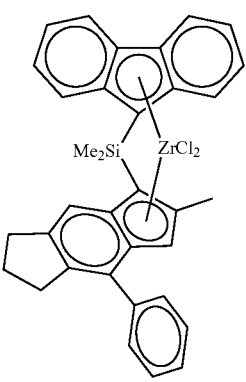

The alkylation reactions described herein may produce an alkylated metallocene of the foregoing di-halide compounds, where each Cl is independently replaced by an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each Cl is independently replaced by an alkyl selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl, hexyl (such as n-hexyl, 4-methylpentyl, 3-methylpentyl, cyclohexyl), heptyl (such as n-heptyl, benzyl), octyl (such as n-octyl, cyclooctyl), nonyl, decyl, undecyl, docecyl and isomers thereof. Preferably each Cl is independently replaced by an alkyl selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

Preferred post-metallocene complexes are transition metal complexes that do not feature a cyclopentadienyl anion or substituted cyclopentadienyl anion donors (e.g., cyclopentadienyl, fluorenyl, indenyl, methylcyclopentadienyl), Examples of families of post-metallocene complexes that may be suitable herein can include late transition metal pyridylbisimines (e.g., U.S. Pat. No. 7,087,686), group 4 pyridyldiamidos (e.g., U.S. Pat. No. 7,973,116), quinolinyldiamidos (e.g., US Pub. No. 2018/0002352 A1), pyridylamidos (e.g., U.S. Pat. No. 7,087,690), phenoxyimines (e.g., Makio, H. et al. (2009) "Development and Application of FI Catalysts for Olefin Polymerization: Unique Catalysis and Distinctive Polymer Formation," *Accounts of Chemical Research*, v.42(10), pp. 1532-1544), bridged bi-aromatic complexes (e.g., U.S. Pat. No. 7,091,292), the disclosures of which are incorporated herein by reference.

Post-metallocenes that are suitable for use herein also include: bisphenolate complexes; diphenolate complexes; oxadiazolylphenolate complexes; diethylenetriamine complexes; oxybis(ethylamine) complexes; pyridyldiamido complexes; quinolinyldiamido complexes; cyclopentadienyl-amidinate complexes; and iron pyridyl bis(imine) complexes; or any combination thereof, including any combination with metallocene complexes.

The term "bisphenolate complex" or "bisphenolate catalyst" refers to a class of coordination complexes described in U.S. Pat. No. 6,841,502, WO 2017/004462, and WO 2006/020624 that feature a dianionic tetradentate ligand that is coordinated to a metal center through two neutral Lewis basic donor atoms (e.g., oxygen bridge moieties) and two anionic aryloxy (i.e., deprotonated phenoxy) donors.

The term "phenoxyimine complex" or "phenoxyimine catalyst" refers to a class of coordination complexes described in EP 0 874 005 that feature a monoanionic bidentate ligand that is coordinated to a metal center through one neutral Lewis basic donor atom (e.g., an imine moiety) and an anionic aryloxy (i.e., deprotonated phenoxy) donor. Typically two of these bidentate phenoxyimine ligands are coordinated to a group 4 metal to form a complex that is useful as a catalyst component.

The term "oxadiazolylphenolate complex" or "oxadiazolylphenolate catalyst" refers to a class of coordination complexes that feature a metal center coordinated to a bidentate oxadiazolylphenolate anion via the phenolate oxygen and the oxadiazolyl nitrogen atom and two other anionic ligands.

The term "diethylenetriamine complex" or "diethylenetriamine complex" refers to a class of coordination complexes that feature a metal center coordinated to a tridentate diethylenetriamine ligand and two other anionic ligands.

The term "oxybis(ethylamine) complex" or "oxybis(ethylamine) complex" refers to a class of coordination complexes that feature a metal center coordinated to a tridentate oxybis(ethylamine) ligand via the nitrogen of two amino groups and the oxygen of the ether group and two other anionic ligands.

The term "pyridyldiamido complex" or "pyridyldiamide complex" or "pyridyldiamido catalyst" or "pyridyldiamide catalyst" refers to a class of coordination complexes described in U.S. Pat. No. 7,973,116B2, US 2012/0071616A1, US 2011/0224391A1, US 2011/0301310A1, US 2015/0141601A1, U.S. Pat. Nos. 6,900,321 and 8,592,615 that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes the pyridyldiamido ligand is coordinated to the metal with the formation of one five membered chelate ring and one seven membered chelate ring. It is possible for additional atoms of the pyridyldiamido ligand to be coordinated to the metal without affecting the catalyst function upon activation; an example of this could be a cyclometalated substituted aryl group that forms an additional bond to the metal center.

The term "quinolinyldiamido complex" or "quinolinyldiamido catalyst" or "quinolinyldiamide complex" or "quinolinyldiamide catalyst" refers to a related class of pyridyldiamido complex/catalyst described in US 2018/0002352 where a quinolinyl moiety is present instead of a pyridyl moiety.

The term "cyclopentadienyl-amidinate complex" or "cyclopentadienyl-amidinate catalyst" refers to a class of coordination complexes described in U.S. Pat. No. 8,188,200 that typically feature a group 4 metal bound to a cyclopentadienyl anion, a bidentate amidinate anion, and a couple of other anionic groups.

The term "iron pyridyl bis(imine) complex" refers to a class of iron coordination complexes described in U.S. Pat. No. 7,087,686 that typically feature an iron metal center coordinated to a neutral, tridentate pyridyl bis(imine) ligand and two other anionic ligands.

Suitable post-metallocene complexes can include zirconium and hafnium post-metallocene complexes. In at least one embodiment, post-metallocene complexes for the present disclosure include group 4 post-metallocene complexes including four anionic donor atoms and one or two neutral donor atoms. Suitable post-metallocene complexes for the present disclosure include group 4 post-metallocene complexes including an anionic phenolate donor. Suitable post-metallocene complexes for the present disclosure include group 4 post-metallocene complexes including an anionic amino donor atom. Suitable post-metallocene complexes for the present disclosure include group 4 post-metallocene complexes including two anionic aryloxide donor atoms and two additional neutral donor atoms.

A post-metallocenecan be diphenolate transition metal complex represented by Formula (VIIa or VIIb):

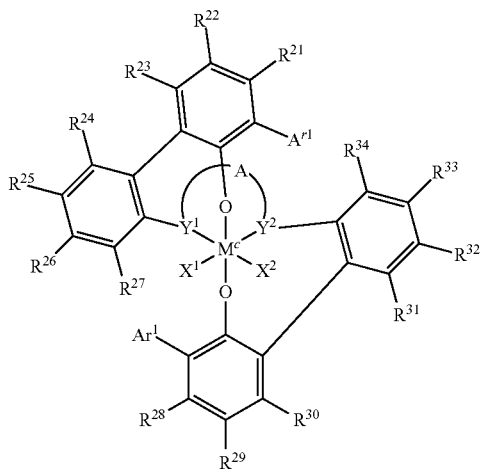

(VIIa)

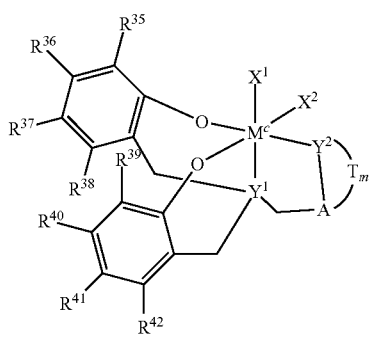

(VIIb)

wherein:
M' is a group 3, 4, 5, 6, 7, 8, 9, 10, 11, or 12 metal, such as a group 4 metal;
$R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, $R^{38}$, $R^{39}$, $R^{40}$, $R^{41}$, and $R^{42}$ are independently hydride, halide, optionally substituted hydrocarbyl, heteroatom-containing optionally substituted hydrocarbyl, alkoxy, aryloxy, silyl, boryl, dialkyl amino, alkylthio, arylthio and seleno; optionally two or more R groups can combine together into ring structures with such ring structures having from 3 to 100 non-hydrogen atoms in the ring;
A is a $C_1$-$C_{50}$ alkyl group; and optional T of Formula (VIIb) is a bridging group to form an aliphatic or aromatic cyclic structure with A and $Y_2$ with T having 4-8 carbon atoms; m is 0 (non-bridging) or 1.
$Y^1$ and $Y^2$ of (VIIa) are independently selected from O, S, $NR^a$ and $PR^a$ wherein $R^a$ is optionally substituted hydrocarbyl; and $Y^1$ and $Y^2$ of (VIIb) are independently selected from N and P.
$Ar^1$ is phenyl, naphthyl, biphenyl, anthracenyl, or phenanthrenyl; and each of $X^1$ and $X^2$ is a leaving group with a non-carbon atom directly linking to the M' center (e.g., examples of the non-carbon atom include, but are not limited to, halogen, oxygen, nitrogen, sulfur, and the like, preferably —Cl, —F, —I, —OR (—OMe, —OEt, —OPh), —$NR_2$ (—$NMe_2$, $NEt_2$), or —SR (—SMe, —SEt)). The alkylation reactions described herein may produce an alkylated complex of the foregoing, where each $X^1$ and $X^2$ is independently replaced by an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each $X^1$ and $X^2$ is independently replaced by an alkyl selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl), nonyl, decyl, undecyl, docecyl and isomers thereof. Preferably each $X^1$ and $X^2$ is independently replaced by an alkyl selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

Accordingly, an alkylated post-metallocene can be diphenolate transition metal complex represented by Formula (VIIa and VIIb) where $X^1$ and $X^2$ are replaced with $R^1$ and $R^2$ that are independently selected from methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

In at least one aspect of Formula (VIIa and VIIb) as the post-metallocene or the alkylated post-metallocene, $M^c$ is a group 4 metal, such as zirconium or hafnium, such as $M^c$ is zirconium.

In at least one aspect of Formula (VIIa) as the post-metallocene or the alkylated post-metallocene, $Y^1$ and $Y^2$ are O and of Formula (VIIb) as the post-metallocene or the alkylated post-metallocene, $Y^1$ and $Y^2$ are N.

In at least one aspect of Formula (VIIa and VIIb) as the post-metallocene or the alkylated post-metallocene, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, $R^{38}$, $R^{39}$, $R^{40}$, $R^{41}$, and $R^{42}$ are independently hydride or alkyl.

$R^{22}$ may be an alkyl group, such as methyl, ethyl, propyl, butyl, pentyl, hexyl, heptyl, octyl, nonyl, decyl, and isomers thereof.

$Ar^1$ may be a biphenyl group.

A of Formula (VIIa) may be an alkyl group such as propyl or butyl and A of Formula (VIIb) may be a —$CH_2$— fragment when m=0 or a ≡CH fragment when m=1 and A-Y2-T cyclic structure is an aliphatic ring or a —C≡ fragment when m=1 and A-Y2-T cyclic structure is an aromatic ring.

In another aspect, a post-metallocene may be the oxadiazolylphenolate compound represented by Formulas (VIIa) or (VIIIb):

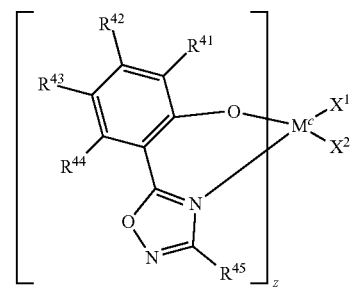

(VIIIa)

-continued

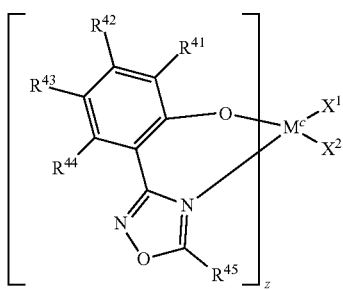

(VIIIb)

wherein in Formulas (VIIIa) or (VIIIb):
  $M^c$ is an element selected from group 4 of the Periodic Table of the Elements;
  $R^{41}$, $R^{42}$, $R^{43}$, $R^{44}$, $R^{45}$ are independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, halo, silyl, boryl, phosphino, amino, thioalkyl, thioaryl, nitro, and combinations thereof;
  $X^1$ and $X^2$ are, independently, a leaving group with a non-carbon atom directly linking to the M' center (e.g., examples of the non-carbon atom include, but are not limited to, halogen); and
  z is 1, 2, 3, or 4.

The alkylation reactions described herein may produce an alkylated complex of the foregoing, where each $X^1$ and $X^2$ is independently replaced by an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each $X^1$ and $X^2$ is independently replaced by an alkyl selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl), nonyl, decyl, undecyl, docecyl and isomers thereof. Preferably each $X^1$ and $X^2$ is independently replaced by an alkyl selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

Accordingly, an alkylated post-metallocene can be oxadiazolylphenolate compound represented by Formulas (VIIIa) or (VIIIb) where $X^1$ and $X^2$ are replaced with $R^1$ and $R^2$ that are independently selected from methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

In at least one aspect of Formulas (VIIIa) or (VIIIb) as the post-metallocene or the alkylated post-metallocene, $M^c$ is a group 4 metal, such as zirconium or hafnium, such as $M^c$ is zirconium.

In at least one aspect of Formulas (VIIIa) or (VIIIb) as the post-metallocene or the alkylated post-metallocene, $R^{41}$, $R^{42}$, $R^{43}$, $R^{44}$, $R^{45}$ are independently hydride, alkyl, substituted alkyl, aryl, or substituted aryl.

$R^{41}$ and $R^{45}$ may be independently substituted aryl groups, such as halogen substituted phenyl or haloalkyl substituted phenyl; $R^{42}$ and $R^{43}$ may be hydrogens; $R^{43}$ may be an alkyl group, such as methyl, ethyl, n-propyl, isopropyl, butyl, butyl, pentyl, hexyl, heptyl, octyl, nonyl, decyl, and isomers thereof.

In at least one aspect, $R^{41}$ may be a fluoroaryl group, such as a meta-trifluorophenyl group; $R^{42}$ and $R^{43}$ may be hydrogens; $R^{43}$ may be a butyl group, such as a tert-butyl group butyl; and $R^{45}$ may be a chloroaryl group, such as a dichlorophenyl group.

In another aspect, a post-metallocene may be the diethylenetriamine and oxybis(ethylamine) compounds represented by Formula (IX):

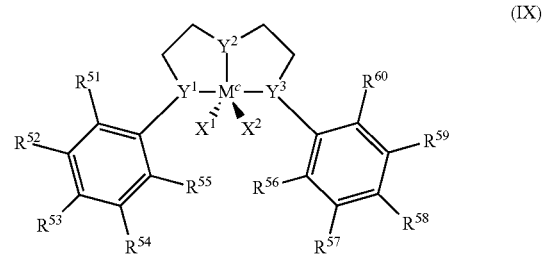

(IX)

wherein in Formula (IX):
  $M^c$ is an element selected from group 4 of the Periodic Table of the Elements;
  $R^{51}$, $R^{52}$, $R^{53}$, $R^{54}$, $R^{55}$, $R^{56}$, $R^{57}$, $R^{58}$, $R^{59}$, $R^{60}$ are independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, halo, silyl, boryl, phosphino, amino, thioalkyl, thioaryl, nitro, and combinations thereof;
  $Y^1$ and $Y^2$ are independently O, N, NH, or S; and
  $X^1$ and $X^2$ are, independently, a leaving group with a non-carbon atom directly linking to the M' center (e.g., examples of the non-carbon atom include, but are not limited to, halogen).

The alkylation reactions described herein may produce an alkylated complex of the foregoing, where each $X^1$ and $X^2$ is independently replaced by an alkyl (straight or branched chain having from 1 to 20 carbon atoms, preferably 1 to 10 carbon atoms) that may contain (a) a cycloalkyl (substituted or not substituted and having from 5 to 20 carbon atoms, preferably 6 to 10 carbon atoms) and/or (b) an aryl (substituted or not substituted and having from 5 to 20 carbon atoms, preferably 6 to 10 carbon atoms). Preferably each $X^1$ and $X^2$ is independently replaced by an alkyl selected from the group consisting of methyl, ethyl, propyl (such as n-propyl, isopropyl, cyclopropyl), butyl (such as n-butyl, sec-butyl, t-butyl, isobutyl, cyclobutyl), pentyl (such as n-pentyl, cyclopentyl), hexyl (such as n-hexyl, 4-methylpentyl, 3-methylpentyl, cyclohexyl), heptyl (such as n-heptyl, benzyl), octyl (such as n-octyl, cyclooctyl), nonyl, decyl, undecyl, docecyl and isomers thereof. Preferably each $X^1$ and $X^2$ is independently replaced by an alkyl selected from the group consisting of methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

Accordingly, an alkylated post-metallocene can be oxadiazolylphenolate compound represented by Formula (X)

where $X^1$ and $X^2$ are replaced with $R^1$ and $R^2$ that are independently selected from methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

In at least one aspect of Formula (IX) as the post-metallocene or the alkylated post-metallocene, $M^c$ is a group 4 metal, such as zirconium or hafnium, such as $M^c$ is zirconium.

In at least one aspect of Formula (IX) as the post-metallocene or the alkylated post-metallocene, $Y^1$ and $Y^2$ are independently O or N.

In at least one aspect of Formula (IX) as the post-metallocene or the alkylated post-metallocene, $R^{51}$, $R^{52}$, $R^{53}$, $R^{54}$, $R^{55}$, $R^{56}$, $R^{57}$, $R^{58}$, $R^{59}$, and $R^{60}$ are independently hydride, alkyl, substituted alkyl, aryl, or substituted aryl groups.

In at least one aspect of Formula (IX) as the post-metallocene or the alkylated post-metallocene, $R^{51}$, $R^{52}$, $R^{53}$, $R^{54}$, $R^{55}$, $R^{56}$, $R^{57}$, $R^{58}$, $R^{59}$, and $R^{60}$ are alkyl groups, such as methyl groups.

As described above, two or more different catalyst compounds may present in the catalyst system used herein. In some embodiments, two or more different catalyst compounds are present in the reaction zone where the process (es) described herein occur. When two transition metal compound based catalysts are used in one reactor as a mixed catalyst system, the two transition metal compounds are preferably chosen such that the two are compatible. It is typical to use the same activator for the transition metal compounds, however, two different activators can be used in combination.

When two transition metal compounds are used, either in the alkylation reaction or in later polymer syntheses using the alkylated metallocene/post-metallocenes, the two transition metal compounds may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact transition metal compounds chosen, the method of activation, and the end product desired. In a particular embodiment, when using the two transition metal compounds, where both are activated with the same activator, useful mole percents, based upon the molecular weight of the transition metal compounds, are 10% to 99.9% A to 0.1% to 90% B, alternatively 25 to 99% A to 0.5% to 50% B, alternatively 50% to 99% A to 1% to 25% B, and alternatively 75% to 99% A to 1% to 10% B.

Activators

The terms "cocatalyst" and "activator" are used herein interchangeably.

The catalyst systems described herein typically comprises a catalyst complex, such as the alkylated transition metal coordination catalyst complexes described above, and an activator (such as an alumoxane and or a non-coordinating anion). These catalyst systems may be formed by combining the catalyst components described herein with activators in any manner known from the literature. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes and ionizing activators, which may be neutral or ionic, and conventional-type cocatalysts. Preferred activators typically include ionizing anion precursor compounds that abstract a reactive metal ligand making the metal compound cationic and providing a charge-balancing non-coordinating or weakly coordinating anion, e.g. a non-coordinating anion.

Alumoxanes

Alumoxanes are generally oligomeric compounds containing —Al($R^1$)—O— sub-units, where $R^1$ is an alkyl group, such as methyl, ethyl, propyl butyl, and the like. Examples of alumoxanes include methylalumoxane (MAO), modified methylalumoxane (MMAO), ethylalumoxane and isobutylalumoxane. Typically, when an alumoxane is used as the activator, an alkylated transition metal coordination catalyst complex is usually not required (as the alumoxane is thought to perform alkylation of the leaving groups). However, alkylated transition metal catalyst complexes can be used in combination with alumoxane activators. One might choose to do such in order to increase the activity of the catalyst system or to increase the catalyst precursor's solubility for better activation efficiency and/or better catalyst distribution in a supported alumoxane system. Preferably, the alumoxane used in such a polymerization process is a methylalumoxane (MAO). Preferably, alumoxane to catalyst compound transition metal ratio Al:M is present in the range of 30-10000:1; for example, the alumoxane is present at a molar ratio of aluminum to catalyst compound transition metal less than 500:1, preferably less than 300:1, preferably about 100:1, preferably more than 30:1. Alumoxanes can also be used as co-activators with other non-alumoxane activators such as those described herein. The alumoxanes used for this purpose usually contain higher carbon number aluminumalkyl compound derived alumoxanes, such as MMAO (e.g., MAO modified with Al-Et, Al-Bu, AliBu, Al-Hex, or Al-Oct units), EAO (ethylalumoxane), IBAO (isobutylalumoxane), BAO (butylalumoxane), HAO (hexylalumoxane), OAO (Octylalumoxane), or the mixture thereof, etc.

Alternately, little or no alumoxane is used in the polymerization processes when using a non-alumoxane activator as the main activator. Preferably, alumoxane is present at zero mole %, alternately the alumoxane is present at a molar ratio of aluminum to catalyst compound transition metal less than 500:1, preferably less than 300:1, preferably less than 100:1, and preferably less than 10:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl) boron, that can react with a catalyst to form an activated species by abstraction of an anionic group. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

It is within the scope of this invention to use an ionizing activator, neutral or ionic. It is also within the scope of this invention to use neutral or ionic activators alone or in combination with alumoxane or modified alumoxane activators.

In embodiments of the invention, the activator is represented by the Formula (Z):

$$(Z)_d^+ (A^{d-}) \qquad (Z)$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3 (such as 1, 2 or 3), preferably Z is (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl. The anion component A$^{d-}$ includes those having the formula [M$^{k+}$Q$_n$]$^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 40 carbon atoms (optionally with the proviso that in not more than 1 occurrence is Q a halide). Preferably, each Q is a fluorinated hydrocarbyl group having 1 to 40 (such as 1 to 20) carbon atoms, more preferably each Q is a fluorinated aryl group, such as a perfluorinated aryl group and most preferably each Q is a pentafluoryl aryl group or perfluoronaphthalenyl group. Examples of suitable A$^{d-}$ also include diboron compounds as disclosed in U.S. Pat. No. 5,447,895, which is fully incorporated herein by reference.

When Z is the activating cation (L-H), it can be a Bronsted acid, capable of donating a proton to the transition metal catalytic precursor resulting in a transition metal cation, including ammoniums, oxoniums, phosphoniums, sulfoniums, and mixtures thereof, such as ammoniums of methylamine, aniline, dimethylamine, diethylamine, N-methylaniline, N-methyl-4-nonadecyl-N-octadecylaniline, N-methyl-4-octadecyl-N-octadecylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers, tetrahydrothiophene, and mixtures thereof.

In particularly useful embodiments of the invention, the activator is soluble in non-aromatic-hydrocarbon solvents, such as aliphatic solvents.

In one or more embodiments, a 20 wt % mixture of the activator compound in n-hexane, isohexane, cyclohexane, methylcyclohexane, or a combination thereof, forms a clear homogeneous solution at 25° C., preferably a 30 wt % mixture of the activator compound in n-hexane, isohexane, cyclohexane, methylcyclohexane, or a combination thereof, forms a clear homogeneous solution at 25° C.

In embodiments of the invention, the activators described herein have a solubility of more than 10 mM (or more than 20 mM, or more than 50 mM) at 25° C. (stirred 2 hours) in methylcyclohexane.

In embodiments of the invention, the activators described herein have a solubility of more than 1 mM (or more than 10 mM, or more than 20 mM) at 25° C. (stirred 2 hours) in isohexane.

In embodiments of the invention, the activators described herein have a solubility of more than 10 mM (or more than 20 mM, or more than 50 mM) at 25° C. (stirred 2 hours) in methylcyclohexane and a solubility of more than 1 mM (or more than 10 mM, or more than 20 mM) at 25° C. (stirred 2 hours) in isohexane.

In a preferred embodiment, the activator is a non-aromatic-hydrocarbon soluble activator compound.

Non-aromatic-hydrocarbon soluble activator compounds useful herein include those represented by the Formula (V):

$$[R^{1'}R^{2'}R^{3'}EH]_{d+}[Mt^{k+}Q_n]^{d-} \qquad (V)$$

wherein:
  E is nitrogen or phosphorous;
  d is 1, 2 or 3; k is 1, 2, or 3; n is 1, 2, 3, 4, 5, or 6; n−k=d (preferably d is 1, 2 or 3; k is 3; n is 4, 5, or 6);
  R$^{1'}$, R$^{2'}$, and R$^{3'}$ are independently a C$_1$ to C$_{50}$ hydrocarbyl group optionally substituted with one or more alkoxy groups, silyl groups, a halogen atoms, or halogen containing groups,
  wherein R$^{1'}$, R$^{2'}$, and R$^{3'}$ together comprise 15 or more carbon atoms;
  Mt is an element selected from group 13 of the Periodic Table of the Elements, such as B or Al; and
  each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VI):

$$[R^{1'}R^{2'}R^{3'}EH]^+[BR^{4'}R^{5'}R^{6'}R^{7'}]^- \qquad (VI)$$

wherein: E is nitrogen or phosphorous; R$^{1'}$ is a methyl group; R$^{2'}$ and R$^{3'}$ are independently is C$_4$-C$_{50}$ hydrocarbyl group optionally substituted with one or more alkoxy groups, silyl groups, a halogen atoms, or halogen Containing groups wherein R$^{2'}$ and R$^{3'}$ together comprise 14 or more carbon atoms; B is boron; and R$^{4'}$, R$^{5'}$, R$^{6'}$, and R$^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VII) or Formula (VIII):

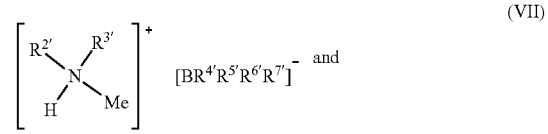

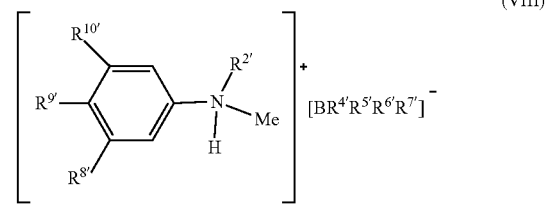

wherein:

N is nitrogen;

$R^{2'}$ and $R^{3'}$ are independently is $C_6$-$C_{40}$ hydrocarbyl group optionally substituted with one or more alkoxy groups, silyl groups, a halogen atoms, or halogen containing groups wherein $R^{2'}$ and $R^{3'}$ (if present) together comprise 14 or more carbon atoms;

$R^{8'}$, $R^{9'}$, and $R^{10'}$ are independently a $C_4$-$C_{30}$ hydrocarbyl or substituted $C_4$-$C_{30}$ hydrocarbyl group;

B is boron;

and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Optionally, in any of Formulas (V), (VI), (VII), or (VIII) herein, $R^{4'}$, $R^{5'}$, $R^{6'}$, and $R^{7'}$ are pentafluorophenyl.

Optionally, in any of Formulas (V), (VI), (VII), or (VIII) herein, $R^{4'}$, $R^{5'}$, $R^{6'}$, and $R^{7'}$ are pentafluoronaphthalenyl.

Optionally, in any embodiment of Formula (VIII) herein, $R^{8'}$ and $R^{10'}$ are hydrogen atoms and $R^{9'}$ is a $C_4$-$C_{30}$ hydrocarbyl group which is optionally substituted with one or more alkoxy groups, silyl groups, a halogen atoms, or halogen containing groups.

Optionally, in any embodiment of Formula (VIII) herein, $R^{9'}$ is a $C_8$-$C_{22}$ hydrocarbyl group which is optionally substituted with one or more alkoxy groups, silyl groups, a halogen atoms, or halogen containing groups.

Optionally, in any embodiment of Formula (VII) or (VIII) herein, $R^{2'}$ and $R^{3'}$ are independently a $C_{12}$-$C_{22}$ hydrocarbyl group.

Optionally, $R^{1'}$, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{8'}$, $R^{9'}$, and $R^{10'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, when Q is a fluorophenyl group, then $R^{2'}$ is not a $C_1$-$C_{40}$ linear alkyl group (alternately $R^{2'}$ is not an optionally substituted $C_1$-$C_{40}$ linear alkyl group).

Optionally, each of $R^{4'}$, $R^{5'}$, $R^{6'}$, and $R^{7'}$ is an aryl group (such as phenyl or naphthalenyl), wherein at least one of $R^{4'}$, $R^{5'}$, $R^{6'}$, and $R^{7'}$ is substituted with at least one fluorine atom, preferably each of $R^{4'}$, $R^{5'}$, $R^{6'}$, and $R^{7'}$ is a perfluoroaryl group (such as perfluorophenyl or perfluoronaphthalenyl).

Optionally, each Q is an aryl group (such as phenyl or naphthalenyl), wherein at least one Q is substituted with at least one fluorine atom, preferably each Q is a perfluoroaryl group (such as perfluorophenyl or perfluoronaphthalenyl).

Optionally, $R^{1'}$ is a methyl group; $R^{2'}$ is $C_6$-$C_{50}$ aryl group; and $R^{3'}$ is independently $C_1$-$C_{40}$ linear alkyl or $C_5$-$C_{50}$-aryl group.

Optionally, each of $R^{2'}$ and $R^{7'}$ is independently unsubstituted or substituted with at least one of halide, $C_1$-$C_{35}$ alkyl, $C_5$-$C_{15}$ aryl, $C_6$-$C_{35}$ arylalkyl, $C_6$-$C_{35}$ alkylaryl, wherein $R^2$, and $R^3$ together comprise 20 or more carbon atoms.

Optionally, each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, provided that when Q is a fluorophenyl group, then $R^{2'}$ is not a $C_1$-$C_{40}$ linear alkyl group, preferably $R^{2'}$ is not an optionally substituted $C_1$-$C_{40}$ linear alkyl group (alternately when Q is a substituted phenyl group, then $R^{2'}$ is not a $C_1$-$C_{40}$ linear alkyl group, preferably $R^{2'}$ is not an optionally substituted $C_1$-$C_{40}$ linear alkyl group). Optionally, when Q is a fluorophenyl group (alternately when Q is a substituted phenyl group), then $R^{2'}$ is a meta- and/or para-substituted phenyl group, where the meta and para substituents are, independently, an optionally substituted $C_1$ to $C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_{20}$ aryl group or linear alkyl group), an optionally substituted alkoxy group, or an optionally substituted silyl group. Optionally, each Q is a fluorinated hydrocarbyl group having 1 to 30 carbon atoms, more preferably each Q is a fluorinated aryl (such as phenyl or naphthalenyl) group, and most preferably each Q is a perflourinated aryl (such as phenyl or naphthalenyl) group. Examples of suitable $[Mt^{k+}Q_n]^{d-}$ also include diboron compounds as disclosed in U.S. Pat. No. 5,447,895, which is fully incorporated herein by reference. Optionally, at least one Q is not substituted phenyl. Optionally all Q are not substituted phenyl. Optionally at least one Q is not perfluorophenyl. Optionally all Q are not perfluorophenyl.

In some embodiments of the invention, $R^{1'}$ is not methyl, $R^{2'}$ is not $C_{18}$ alkyl and $R^{3'}$ is not $C_{18}$ alkyl, alternately $R^{1'}$ is not methyl, $R^{2'}$ is not $C_{18}$ alkyl and $R^{3'}$ is not $C_{18}$ alkyl and at least one Q is not substituted phenyl, optionally all Q are not substituted phenyl.

Useful cation components in Formulas (III) and (V) to (VIII) include those represented by the formula:

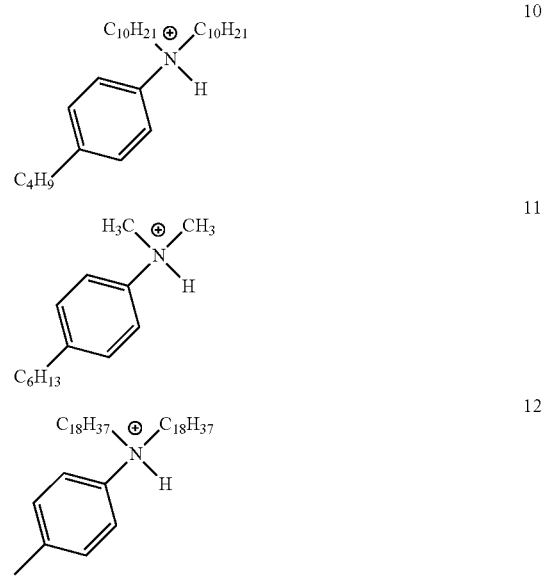

-continued
13 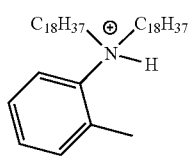
14 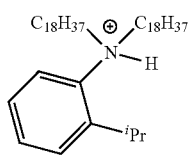
15 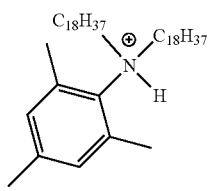
16 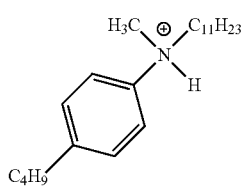
17 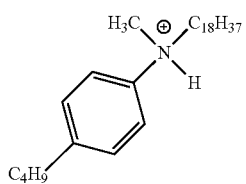
18 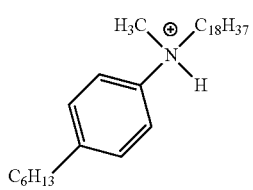
19 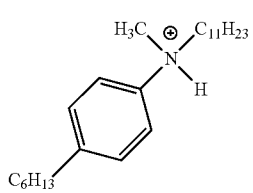
20 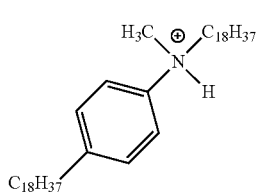
-continued
21 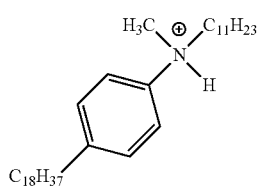
22 
23 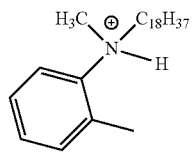
24 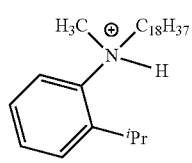
25 
26 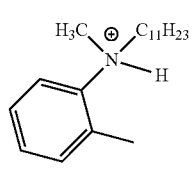
27 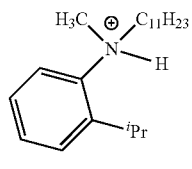
29 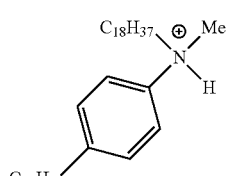
28 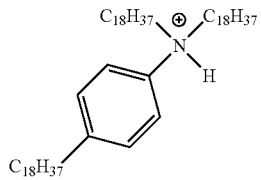

-continued

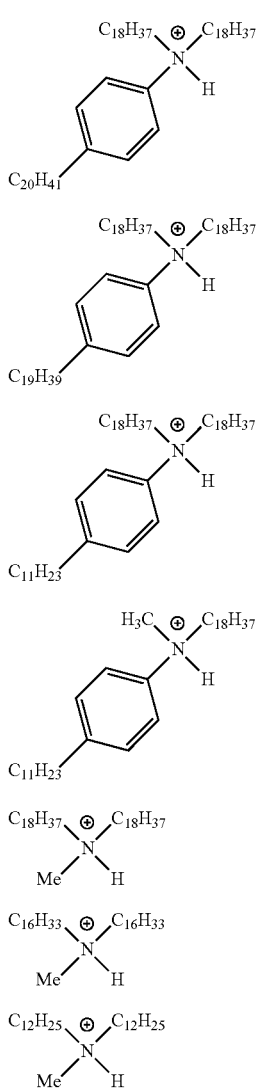

Useful cation components in Formulas (III) and (V) to (VIII) include those represented by the formulas:

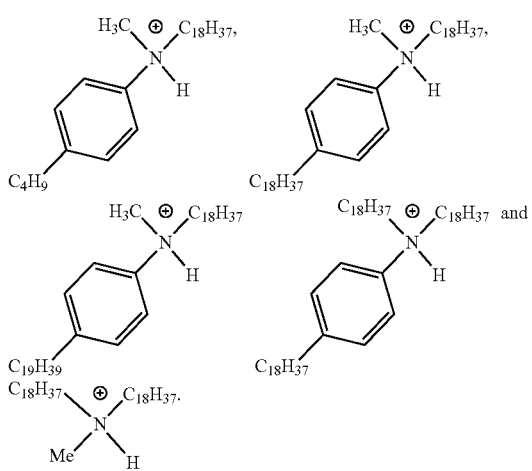

The anion component of the activators described herein includes those represented by the formula $[Mt^{k+}Q_n]^-$, wherein k is 1, 2, or 3; n is 1, 2, 3, 4, 5, or 6 (preferably 1, 2, 3, or 4), (preferably k is 3; n is 4, 5, or 6, preferably when M is B, n is 4); Mt is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the provision that in not more than 1 occurrence is Q a halide. Preferably, each Q is a fluorinated hydrocarbyl group, optionally having 1 to 20 carbon atoms, more preferably each Q is a fluorinated aryl group, and most preferably each Q is a perfluorinated aryl group. Preferably at least one Q is not substituted phenyl, such as perfluorophenyl, preferably all Q are not substituted phenyl, such as perfluorophenyl.

In one embodiment, the borate activator comprises tetrakis(heptafluoronaphth-2-yl)borate.

In one embodiment, the borate activator comprises tetrakis(pentafluorophenyl)borate.

Anions for use in the non-coordinating anion activators described herein also include those represented by formula 7, below:

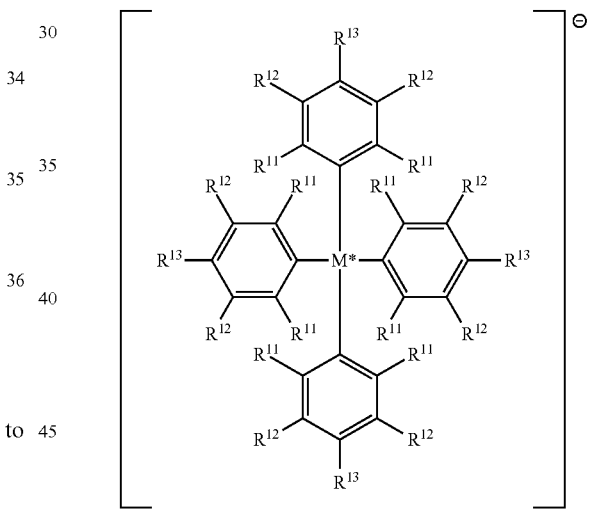

Formula 7 wherein:
M* is a group 13 atom, preferably B or Al, preferably B;
each $R^{11}$ is, independently, a halide, preferably a fluoride;
each $R^{12}$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group, preferably $R^{12}$ is a fluoride or a perfluorinated phenyl group;
each $R^{13}$ is a halide, a $C_6$ to $C_{20}$ substituted aromatic hydrocarbyl group or a siloxy group of the formula —O—Si—$R_a$, where $R^a$ is a $C_1$ to $C_{20}$ hydrocarbyl or hydrocarbylsilyl group, preferably $R^{13}$ is a fluoride or a $C_6$ perfluorinated aromatic hydrocarbyl group;
wherein $R^{12}$ and $R^{13}$ can form one or more saturated or unsaturated, substituted or unsubstituted rings, preferably $R^{12}$ and $R^{13}$ form a perfluorinated phenyl ring. Preferably the anion has a molecular weight of greater than 700 g/mol, and, preferably, at least three of the substituents on the M* atom each have a molecular volume of greater than 180 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v.71(11), November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using Table A below of relative volumes. For fused rings, the $V_S$ is decreased by 7.5% per fused ring. The Calculated Total MV of the anion is the sum of the MV per substituent, for example, the MV of perfluorophenyl is 183 Å$^3$, and the Calculated Total MV for tetrakis(perfluorophenyl)borate is four times 183 Å$^3$, or 732 Å$^3$.

TABLE A

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary anions useful herein and their respective scaled volumes and molecular volumes are shown in Table B below. The dashed bonds indicate bonding to boron.

TABLE B

| Ion | Structure of Boron Substituents | Molecular Formula of Each Substituent | $V_s$ | MV Per subst. (Å$^3$) | Calculated Total MV (Å$^3$) |
|---|---|---|---|---|---|
| tetrakis (perfluorophenyl) borate | | C$_6$F$_5$ | 22 | 183 | 732 |
| tris(perfluorophenyl)- (perfluoronaphthalenyl) borate | | C$_6$F$_5$<br>C$_{10}$F$_7$ | 22<br>34 | 183<br>261 | 810 |
| (perfluorophenyl)tris- (perfluoronaphthalenyl) borate | | C$_6$F$_5$<br>C$_{10}$F$_7$ | 22<br>34 | 183<br>261 | 966 |
| tetrakis (perfluoronaphthalenyl) borate | | C$_{10}$F$_7$ | 34 | 261 | 1044 |

TABLE B-continued

| Ion | Structure of Boron Substituents | Molecular Formula of Each Substituent | $V_s$ | MV Per subst. (Å$^3$) | Calculated Total MV (Å$^3$) |
| --- | --- | --- | --- | --- | --- |
| tetrakis (perfluorobiphenyl) borate | (structure shown) | $C_{12}F_9$ | 42 | 349 | 1396 |
| [$(C_6F_3(C_6F_5)_2)_4B$] | (structure shown) | $C_{18}F_{13}$ | 62 | 515 | 2060 |

The activators may be added to a polymerization in the form of an Ion pair using for example, [M2HTH]+ [NCA]− in which the di(hydrogenated tallow)methylamine ("M2HTH") cation reacts with a basic leaving group on the transition metal complex to form a transition metal complex cation and [NCA]−. Alternatively, the transition metal complex may be reacted with a neutral NCA precursor, such as $B(C_6F_5)_3$, which abstracts an anionic group from the complex to form an activated species. Useful activators include di(hydrogenated tallow)methylammonium[tetrakis(pentafluorophenyl)borate] (i.e., [M2HTH]B($C_6F_5$)$_4$) and di(octadecyl)tolylammonium [tetrakis(pentafluorophenyl)borate] (i.e., [DOdTH]B($C_6F_5$)$_4$).

Activator compounds that are particularly useful in this invention include one or more of:
N,N-dimethylanilinium [tetrakis(perfluorophenyl)borate],
N,N-dimethylanilinium [tetrakis(perfluoronaphthyl)borate],
N,N-di(hydrogenated tallow)methylammonium [tetrakis(perfluorophenyl) borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl)borate],
N-octadecyl-N-hexadecyl-tolylammonium [tetrakis(perfluorophenyl)borate],
N-octadecyl-N-hexadecyl-tolylammonium [tetrakis(perfluorophenyl)borate], N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate],
N-dodecyl-N-decyl-tolylammonium [tetrakis(perfluorophenyl)borate],
N-methyl-N-octadecylanilinium [tetrakis(perfluorophenyl)borate],
N-methyl-N-hexadecylanilinium [tetrakis(perfluorophenyl)borate],
N-methyl-N-tetradecylanilinium [tetrakis(perfluorophenyl)borate],
N-methyl-N-dodecylanilinium [tetrakis(perfluorophenyl)borate],
N-methyl-N-decylanilinium [tetrakis(perfluorophenyl)borate], and
N-methyl-N-octylanilinium [tetrakis(perfluorophenyl)borate].

Additional useful activators and the synthesis non-aromatic-hydrocarbon soluble activators, are described in U.S. Ser. No. 16/394,166 filed Apr. 25, 2019, U.S. Ser. No. 16/394,186, filed Apr. 25, 2019, and U.S. Ser. No. 16/394,197, filed Apr. 25, 2019, which are incorporated by reference herein.

Likewise, particularly useful activators also include dimethylaniliniumtetrakis (pentafluorophenyl) borate and dimethyl anilinium tetrakis(heptafluoro-2-naphthalenyl) borate. For a more detailed description of useful activators please see WO 2004/026921 page 72, paragraph [00119] to page 81 paragraph [00151]. A list of additionally particularly useful activators that can be used in the practice of this invention may be found at page 72, paragraph [00177] to page 74, paragraph [00178] of WO 2004/046214.

For descriptions of useful activators please see U.S. Pat. Nos. 8,658,556 and 6,211,105.

Preferred activators for use herein also include N-methyl-4-nonadecyl-N-octadecylbenzenaminium tetrakis(pentafluorophenyl)borate, N-methyl-4-nonadecyl-N-octadecyl-benzenaminium tetrakis(perfluoronaphthalenyl)borate, N,N-dimethylanilinium tetrakis(perfluoronaphthalenyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthalenyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4$$^-$]; 1-(4-(tris(pentafluorophenyl)borate)-2,3,5,6-tetrafluorophenyl) pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthalenyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis(perfluoronaphthalenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthalenyl)borate, N,N-dialkylanilinium tetrakis(perfluoronaphthalenyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

Examples of activators include, but are not limited to, a neutral strong Lewis acid (e.g., B(C6F5)3, Al(C6F5)3), a molecular cation-anion ion-pair with the cation comprising dialkylaluminum cation (e.g., dimethylaluminum cation), a proton optionally stabilized by a Lewis base (e.g., an amine), a carbocation (e.g., trityl cation Ph3C+), a supported ion-pair with the anion chemically binding to the support, a supported anion with a cation comprising dialkylaluminum cation (e.g., dimethylaluminum cation), a supported anion with a proton optionally stabilized by a Lewis base (e.g, an amine), a supported anion with a carbocation (e.g., trityl cation Ph3C+), a supported strong Lewis acid, and the like, and any combination thereof. A preferred activator is a non-coordinating anion activator.

Catalyst Systems

The present disclosure also relates to a catalyst system comprising a transition metal compound and an activator compound as described herein, to the use of such activator compounds for activating a transition metal compound in a catalyst system for polymerizing olefins, and to processes for polymerizing olefins, the process comprising contacting under polymerization conditions one or more olefins with a catalyst system comprising a transition metal compound and activator compounds. Preferably the catalyst systems are homogeneous, i.e., where the catalyst compounds and or the activators compounds are soluble in a solvent, preferably soluble in the polymerization reaction media.

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

The present disclosure also relates to a catalyst system comprising a transition metal compound and an activator compound as described herein, to the use of such activator compounds for activating a transition metal compound in a catalyst system for polymerizing olefins, and to processes for polymerizing olefins, the process comprising contacting under polymerization conditions one or more olefins with a catalyst system comprising a transition metal compound and activator compounds, where aromatic solvents, such as toluene, are absent (e.g. present at zero mol % relative to the moles of activator, alternately present at less than 1 mol %, preferably the catalyst system, the polymerization reaction and/or the polymer produced are free of aromatic hydrocarbon solvent, such as toluene).

The polyalpha-olefins produced herein preferably contain 0 ppm (alternately less than 1 ppm, alternately less than 2 ppm, alternately less than 5 ppm) of residual aromatic hydrocarbon. Preferably, the polyalpha-olefins produced herein contain 0 ppm (alternately less than 1 ppm) of residual toluene.

The catalyst systems used herein preferably contain 0 ppm (alternately less than 1 ppm) of residual aromatic hydrocarbon. Preferably, the catalyst systems used herein contain 0 ppm (alternately less than 1 ppm) of residual toluene.

The polyalpha-olefins produced herein preferably contain 5 wt % or less of aromatic hydrocarbon, such as toluene, (alternately 4 wt % or less, alternately 3 wt % or less, alternately 2 wt % or less, alternately 1 wt5 or less, alternately 0.5 wt % or less, alternately less than 50 ppm, alternately less than 5 ppm) of residual aromatic hydrocarbon, such as toluene.

Polyolefin Polymerization and Products

In embodiments herein, the present disclosure provides polymerization processes where monomer (such as propylene or ethylene), and optionally comonomer, are contacted with a catalyst system comprising an activator and an alkylated transition metal coordination catalyst complex, such as metallocene or post-metallocene, as described above. Herein, the term alkylated transition metal coordination catalyst complex, such as metallocene or post-metallocene is an abbreviation that encompasses one or more alkylated transition metal coordination catalyst complexes, such as one or more alkylated metallocene, one or more alkylated post-metallocene, and a combination of one or more alkylated metallocene with one or more alkylated post-metallocene. The catalyst compound and activator, optionally with a support or carrier, may be combined in any order, and are combined typically prior to contacting with the monomer.

In at least one embodiment, a polymerization process includes a) contacting one or more olefin monomers with a catalyst system comprising: i) an activator, ii) an transition metal coordination catalyst complex, such as metallocene or post-metallocene of the present disclosure. In at least one embodiment, a catalyst system of the present disclosure is capable of producing a polyolefin. In at least one embodiment, a polyolefin is (a) a homopolymer of ethylene or propylene or (b) an ethylene-based or propylene-based copolymer such as a copolymer having from 0.1 to 97 wt % (such as from 0.5 to 95 wt %, such as from 1 to 75 wt %, such as from 5 to 50 wt %) of ethylene with the remainder balance being one or more $C_3$ to $C_{20}$ olefin comonomers (such as $C_3$ to $C_{12}$ alpha-olefin, such as propylene, butene, hexene, octene, decene, dodecene, such as propylene, butene, hexene, octene). A polyolefin can be a copolymer of propylene such as a copolymer of propylene having from 0.1 to 99 wt % (such as from 0.5 to 80 wt %, such as from 1 to 45 wt %, such as from 3 to 10 wt %) of propylene and from 1 to 75 wt % of one or more of $C_2$ or $C_4$ to $C_{20}$ olefin comonomer (such as ethylene or $C_4$ to $C_{12}$ alpha-olefin, such as butene, hexene, octene, decene, dodecene, such as ethylene, butene, hexene, octene). In at least one embodiment, a polyolefin is a heterophasic copolymer, such as those obtained from a sequential polymerization process (e.g., an impact copolymer (ICP) containing a homo-isotactic polypropylene phase and an ethylene-propylene rubber phase).

In at least one embodiment, a polyolefin is either a single-phasic polymer or a heterophasic copolymer further comprising a diene to form a vulcanizable copolymer.

In at least one embodiment, a polyolefin is a propylene homopolymer, an ethylene homopolymer or an ethylene copolymer, such as propylene-ethylene and/or ethylene-alphaolefin (such as $C_4$ to $C_{20}$) copolymer (such as an ethylene-hexene copolymer or an ethylene-octene copolymer), in a single phase or multiple phases. A polyolefin can have an Mw/Mn of greater than 1.

More generally, monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer comprises propylene and an optional comonomers comprising one or more propylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer comprises propylene and an optional comonomers comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. Monomers useful herein also include non-conjugated dienes.

Exemplary $C_2$ to $C_{40}$ olefin monomers and optional comonomers include propylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

Diene monomers include any hydrocarbon structure but non-conjugated dienes are preferred, such as $C_4$ to $C_{30}$, having at least two unsaturated bonds, wherein at least one of the unsaturated bonds are readily incorporated into a polymer by either a stereospecific or a non-stereospecific alkylated metallocene/post-metallocene(s). The diene monomers can be selected from alpha, omega-diene monomers (i.e. di-vinyl monomers). The diolefin monomers are linear di-vinyl monomers, such as those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable homogeneous, bulk, solution phase polymerization process can be used. Such processes can be run in a batch, semi-batch, or continuous mode. Homogeneous polymerization processes are preferred. (A homogeneous polymerization process is one where at least 90 wt % of the product is soluble in the reaction media. A heterogeneous polymerization process is one where at the product is not soluble in the reaction media.) A bulk homogeneous process can be used. (An example bulk process is one where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In at least one embodiment, the process is a solution phase polymerization process. Alternately, the polymerization process is not a heterogeneous polymerization process.

Suitable diluents/solvents for polymerization include non-coordinating, inert liquids. Examples include straight and branched-chain hydrocarbons, such as ethylene, propylene, butene, pentene, hexene, heptene, octene, nonene, decene, undecene, dodecane, 1,4-pentadiene, 1,5-hexadiene, 1,6-heptadiene, 1,7-octadiene, ethylidene norbornene, and isomers thereof, and any combination thereof; cyclic and alicyclic hydrocarbons, such as cyclohexane, cycloheptane, methylcyclohexane, methylcycloheptane, and mixtures thereof, such as can be found commercially (ISOPAR™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, the solvent is not aromatic, such that aromatics are present in the solvent at less than 1 wt %, such as less than 0.5 wt %, such as less than 0 wt % based upon the weight of the solvents.

Optional Scavengers, Co-Activators, Chain Transfer Agents

In addition to activator compounds, scavengers or co-activators may be used. A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Co-activators can include alumoxanes such as methylalumoxane, modified alumoxanes such as modified methylalumoxane, and aluminum alkyls such trimethylaluminum, tri-isobutylaluminum, triethylaluminum, and tri-isopropylaluminum, tri-n-hexylaluminum, tri-n-octylaluminum, tri-n-decylaluminum or tri-n-dodecylaluminum. Co-activators are typically used in combination with Lewis acid activators and ionic activators when the pre-catalyst is not a dihydrocarbyl or dihydride complex. Sometimes co-activators are also used as scavengers to deactivate impurities in feed or reactors.

Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and dialkyl zinc, such as diethyl zinc.

Chain transfer agents may be used in the compositions and or processes described herein. Useful chain transfer agents are typically hydrogen, alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl octyl or an isomer thereof) or a combination thereof, such as diethyl zinc, trimethylaluminum, triisobutylaluminum, trioctylaluminum, or a combination thereof.

EXAMPLE EMBODIMENTS AND CLAUSES

A first non-limiting example embodiment is a method comprising: reacting (a) a transition metal coordination catalyst complex (such as a metallocene and/or a post-metallocene), (b) an aluminum alkyl, and (c) a fluoride salt at 0° C. to 85° C. (or 0° C. to 25° C., or 15° C. to 50° C., or 15° C. to 25° C., or 20° C. to 30° C., 25° C. to 40° C., or 35° C. to 50° C., or 40° C. to 85° C.) in a non-polar solvent to yield an alkylated transition metal coordination catalyst complex (such as an alkylated metallocene and/or an alkylated post-metallocene). The first non-limiting example embodiment may include one or more of Elements 1-18.

Element 1: wherein the non-polar solvent is selected from the group consisting of: butane, isobutene, pentane, isopentane, hexane, isohexane, heptane, octane, decane, benzene, toluene, xylene, and any combination thereof.

Element 2: wherein a molar ratio of the transition metal of the transition metal coordination catalyst complex to the aluminum alkyl is 1:1 to 1:3 (or 1:1 to 1:3, or 1:2 to 1:5).

Element 3: wherein a molar ratio of aluminum of the aluminum alkyl to fluoride of the fluoride salt is 1:15 to 1:1 (or 1:15 to 1:8, or 1:10 to 1:3, or 1:8 to 1:1).

Element 4: wherein reacting occurs for (or 15 minutes to 2 hours, or 1 hour to 8 hours, or 6 hours to 18 hours, or 12 hours to 36 hours) and/or at 15° C. to 50° C. (or 15° C. to 25° C., or 20° C. to 30° C., 25° C. to 40° C., or 35° C. to 50° C.).

Element 5: wherein the fluoride salt is selected from the group consisting of NaF, KF, $MgF_2$, $CaF_2$, and any combination thereof.

Element 6: further comprising, after reacting, adding additional fluoride salt to precipitate unreacted aluminum alkyl.

Element 7: wherein the alkylated transition metal coordination catalyst complex has a molar ratio of di-alkylated to mono-alkylated of 100:0 to 70:30 (or 100:0 to 90:10, or 95:5 to 75:25, or 85:15 to 70:30).

Element 8: wherein the molar ratio of rac:meso in the alkylated metallocene is 100:0 to 0:100 (or 100:0 to 50:50, or 75:25 to 25:75, or 25:75 to 75:25, or 50:50 to 0:100, or 100:0 to 90:10, or 100:0 to 97:3, or 99.5:0.5 to 100:5, or 99:1 to 90:10).

Element 9: wherein the transition metal coordination catalyst complex comprises (a.i) one or more metallocenes, (a.ii) one or more post-metallocenes, or (a.iii) one or more metallocenes in combination with one or more post-metallocenes.

Element 10: wherein the transition metal coordination catalyst complex is an unbridged metallocene compound represented by the formula: $Cp^A Cp^B M'X'_n$, wherein each $Cp^A$ and $Cp^B$ is independently selected from cyclopentadienyl ligands (e.g., ligands containing a cyclopentadienyl moiety, for example, cyclopentadienyl, indenyl, tetrahydroindacenyl, and or fluorenyl groups and ligands isolobal to cyclopentadienyl, one or both Cp$^A$ and Cp$^B$ may contain heteroatoms, and one or both Cp$^A$ and Cp$^B$ may be substituted by one or more R" groups (i.e., to form substituted cyclopentadienyl, substituted indenyl, substituted tetrahydroindacenyl, and or substituted fluorenyl groups) and each Cp$^A$ and Cp$^B$ is bound to M'; M' is selected from group 3, 4, 5, 6, 7, 8, 9, 10, 11 or 12 atoms and lanthanide group atoms; X' is a leaving group with a non-carbon atom directly linking to the M' center (e.g., examples of the non-carbon atom include, but are not limited to, halogen, oxygen, nitrogen, sulfur, and the like, preferably —Cl, —F, —I, —OR (—OMe, —OEt, —OPh), —NR$_2$ (—NMe$_2$, NEt$_2$), or —SR (—SMe, —SEt)); n is 1, 2, 3 or 4 (typically 1 for group 3 and lanthanide metals, and 2 for group 4, 5, and 6 metals); each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether, where two or more R" groups may form mono- or multi-nuclear cyclic groups.

Element 11: wherein the transition metal coordination catalyst complex is a bridged metallocene compound represented by the formula: Cp$^A$(T)Cp$^B$M'X'$_n$, wherein each Cp$^A$ and Cp$^B$ is independently selected from cyclopentadienyl ligands (e.g., ligands containing a cyclopentadienyl moiety, for example, cyclopentadienyl, indenyl, tetrahydroindacenyl, and or fluorenyl groups and ligands isolobal to cyclopentadienyl, one or both Cp$^A$ and Cp$^B$ may contain heteroatoms, and one or both Cp$^A$ and Cp$^B$ may be substituted by one or more R" groups (i.e., to form substituted cyclopentadienyl, substituted indenyl, substituted tetrahydroindacenyl, and or substituted fluorenyl groups) and each Cp$^A$ and Cp$^B$ is bound to M'; M' is selected from group 3, 4, 5, 6, 7, 8, 9, 10, 11 or 12 atoms and lanthanide group atoms, preferably group 4; X' is a leaving group with a non-carbon atom directly linking to the M' center (e.g., examples of the non-carbon atom include, but are not limited to, halogen, oxygen, nitrogen, sulfur, and the like, preferably —Cl, —F, —I, —OR (—OMe, —OEt, —OPh), —NR$_2$ (—NMe$_2$, NEt$_2$), or —SR (—SMe, —SEt)); n is 1, 2, 3, or 4, typically 1 for group 3 and lanthanide metals, and 2 for group 4, group 5, and group 6 metals; (T) is a bridging group, bound to Cp$^A$ and Cp$^B$, selected from divalent alkyl, divalent substituted alkyl, divalent heteroalkyl, divalent alkenyl, divalent substituted alkenyl, divalent heteroalkenyl, divalent alkynyl, divalent substituted alkynyl, divalent heteroalkynyl, divalent alkoxy, divalent aryloxy, divalent alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether; R" is selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted, hydrocarbyl, heterohydrocarbyl, silyl, boryl, phosphino, phosphine, amino, amine, germanium, ether, and thioether, where two or more R" groups may form mono- or multi-nuclear cyclic groups.

Element 12: wherein M' is Hf, Zr or Ti.

Element 13: wherein the transition metal coordination catalyst complex is represented by Formula (Ja):

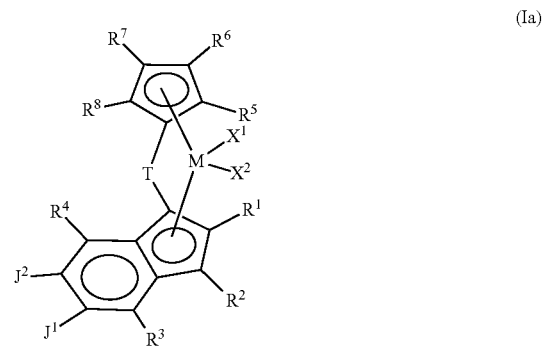

(Ia)

wherein:

M is a group 4 metal, such as Zr, Hf or Ti;

T is a bridging group as defined herein for (T) above;

each of $X^1$ and $X^2$ is a leaving group with a non-carbon atom directly linking to the M' center (e.g., examples of the non-carbon atom include, but are not limited to, halogen, oxygen, nitrogen, sulfur, and the like, preferably —Cl, —F, —I, —OR (—OMe, —OEt, —OPh), —NR$_2$(—NMe$_2$, NEt$_2$), or —SR (—SMe, —SEt));

$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl;

$R^3$ is an unsubstituted $C_4$-$C_{62}$ cycloalkyl, a substituted $C_4$-$C_{62}$ cycloalkyl, an unsubstituted $C_4$-$C_{62}$ aryl, a substituted $C_4$-$C_{62}$ aryl, an unsubstituted $C_4$-$C_{62}$ heteroaryl, or a substituted $C_4$-$C_{62}$ heteroaryl;

each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR', —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$ and $R^8$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'2, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or one or more of $R^5$ and $R^6$, $R^6$ and $R^7$, or $R^7$ and $R^8$ can be joined to form a substituted or unsubstituted $C_4$-$C_{62}$ saturated or unsaturated cyclic or polycyclic ring structure, or a combination thereof; and J¹ and J² are joined to form a substituted or unsubstituted $C_4$-$C_{62}$ saturated or unsaturated cyclic or polycyclic ring structure, or a combination thereof.

Element 14: wherein the transition metal coordination catalyst complex is selected from the group consisting of: bisphenolate complexes; diphenolate complexes; oxadiazolylphenolate complexes; diethylenetriamine complexes; oxybis(ethylamine) complexes; pyridyldiamido complexes; quinolinyldiamido complexes; cyclopentadienyl-amidinate complexes; and iron pyridyl bis(imine) complexes; or any combination thereof, including any combination with metallocene complexes.

Element 15: further comprising contacting the alkylated transition metal coordination catalyst complex with an activator to produce a catalyst system.

Element 16: Element 15 and the method further comprising contacting at least one olefin with the catalyst system to produce a polyolefin.

Element 17: Element 16 and wherein the at least one olefin comprises a monomer selected from the group consisting of: ethylene, propylene, butene, pentene, hexene, heptene, octene, nonene, decene, undecene, dodecane, 1,4-pentadiene, 1,5-hexadiene, 1,6-heptadiene, 1,7-octadiene, ethylidene norbonene, and isomers thereof, and any combination thereof.

Element 18: Element 15 and wherein the activator comprises alumoxane and or a non-coordinating anion.

Examples of combinations include, but are not limited to, Element 1 in combination with one or more of Elements 2-18; Element 2 in combination with one or more of Elements 3-18; Element 3 in combination with one or more of Elements 4-18; Element 4 in combination with one or more of Elements 5-18; Element 5 in combination with one or more of Elements 6-18; Element 6 in combination with one or more of Elements 7-18; Element 7 in combination with one or more of Elements 8-18; Element 8 in combination with one or more of Elements 9-18; Element 9 in combination with one or more of Elements 10-18; Element 10 in combination with one or more of Elements 11-18; Element 11 in combination with one or more of Elements 12-18; Element 12 in combination with one or more of Elements 13-18; Element 13 in combination with one or more of Elements 14-18; and Element 14 (optionally with one or more of Elements 15-18) in combination with one or more of Elements 1-13.

This invention further relates to:

Clause 1. A method comprising: reacting (a) a transition metal coordination catalyst complex, (b) an aluminum alkyl, and (c) a fluoride salt at 0° C. to 85° C. (or 0° C. to 25° C., or 15° C. to 50° C., or 15° C. to 25° C., or 20° C. to 30° C., 25° C. to 40° C., or 35° C. to 50° C., or 40° C. to 85° C.) in a non-polar solvent to yield an alkylated metallocene and/or an alkylated post-metallocene.

Clause 2. The method of Clause 1, wherein the non-polar solvent is selected from the group consisting of: butane, isobutene, pentane, isopentane, hexane, isohexane, heptane, octane, decane, benzene, toluene, xylene, and any combination thereof.

Clause 3. The method of Clause 1 or Clause 2, wherein a molar ratio of the transition metal coordination catalyst complex to the aluminum alkyl is 1:1 to 1:3 (or 1:1 to 1:3, or 1:2 to 1:5).

Clause 4. The method of Clause 1, Clause 2, or Clause 3, wherein a molar ratio of aluminum of the aluminum alkyl to fluoride of the fluoride salt is 1:15 to 1:1 (or 1:15 to 1:8, or 1:10 to 1:3, or 1:8 to 1:1).

Clause 5. The method of Clause 1, Clause 2, Clause 3, or Clause 4, wherein reacting occurs for 15 minutes to 36 hours (or 15 minutes to 2 hours, or 1 hour to 8 hours, or 6 hours to 18 hours, or 12 hours to 36 hours) and/or at 15° C. to 50° C. (or 15° C. to 25° C., or 20° C. to 30° C., 25° C. to 40° C., or 35° C. to 50° C.).

Clause 6. The method of Clause 1, Clause 2, Clause 3, Clause 4, or Clause 5, wherein the fluoride salt is selected from the group consisting of NaF, KF, $MgF_2$, $CaF_2$, and any combination thereof.

Clause 7. The method of Clause 1, Clause 2, Clause 3, Clause 4, Clause 5, or Clause 6 further comprising: after reacting, adding additional fluoride salt to precipitate unreacted aluminum alkyl.

Clause 8. The method of Clause 1, Clause 2, Clause 3, Clause 4, Clause 5, Clause 6, or Clause 7, wherein the transition metal coordination catalyst complex have a molar ratio of di-alkylated to mono-alkylated of 100:0 to 70:30 (or 100:0 to 90:10, or 95:5 to 75:25, or 85:15 to 70:30).

Clause 9. The method of Clause 1, Clause 2, Clause 3, Clause 4, Clause 5, Clause 6, Clause 7, or Clause 8, wherein the transition metal coordination catalyst complex is a metallocene and the molar ratio of rac:meso in the alkylated metallocene is 100:0 to 0:100 (or 100:0 to 50:50, or 75:25 to 25:75, or 25:75 to 75:25, or 50:50 to 0:100, or 100:0 to 90:10, or 100:0 to 97:3, or 99.5:0.5 to 100:5, or 99:1 to 90:10).

Clause 10. The method of Clause 1, Clause 2, Clause 3, Clause 4, Clause 5, Clause 6, Clause 7, Clause 8, or Clause 9, wherein the transition metal coordination catalyst complex is (a.i) one or more metallocenes, (a.ii) one or more post-metallocenes, or (a.iii) one or more metallocenes in combination with one or more post-metallocenes.

Clause 11. The method of Clause 1, Clause 2, Clause 3, Clause 4, Clause 5, Clause 6, Clause 7, Clause 8, Clause 9, or Clause 10, wherein the transition metal coordination catalyst complex is an unbridged metallocene compound represented by the formula: $Cp^A Cp^B M'X'_n$, wherein each $Cp^A$ and $Cp^B$ is independently selected from cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups; M' is selected from groups group 3, 4, 5, 6, 7, 8, 9, 10, 11 or 12 atoms and lanthanide group atoms; X' is a leaving group with a non-carbon atom directly linking to the M' center; n is 1 or 2; each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether, where two or more R" groups may form mono- or multi-nuclear cyclic groups.

Clause 12. The method of Clause 1, Clause 2, Clause 3, Clause 4, Clause 5, Clause 6, Clause 7, Clause 8, Clause 9, or Clause 10, wherein the transition metal coordination catalyst complex is represented by the formula: $Cp^A(T) Cp^B M'X'''$, and wherein each $Cp^A$ and $Cp^B$ is bound to M' and (T) and each $Cp^A$ and $Cp^B$ is independently selected from cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups; M' is selected from groups group 3, 4, 5, 6, 7, 8, 9, 10, 11 or 12 atoms and lanthanide group atoms; X' is a leaving group with a non-carbon atom directly linking to the M' center; n is 1 or 2; each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether, where two or more R" groups may form mono- or multi-nuclear cyclic groups; and (T) is a bridging group bound to $Cp^A$ and $Cp^B$.

Clause 13. The method of Clause 1, Clause 2, Clause 3, Clause 4, Clause 5, Clause 6, Clause 7, Clause 8. Clause 9, or Clause 10, wherein the transition metal coordination catalyst complex is represented by represented by Formula (Ia):

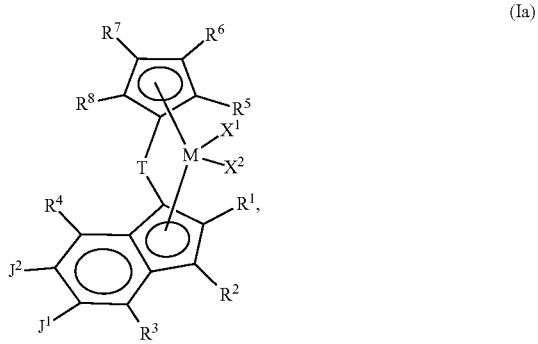

(Ia)

wherein:
M is a Group 4 metal;
T is a bridging group;
each of $X^1$ and $X^2$ is a leaving group with a non-carbon atom directly linking to the M' center;
$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —SR', —OR, —$SiR'_3$, —$OSiR'_3$, —$PR'_2$, or —R"—$SiR'_3$, where R" is $C_1$-$C_{10}$ alkyl and each R' is hydrogen, halogen, $C_1$-$C_{10}$ alkyl, or $C_6$-$C_{10}$ aryl;
$R^3$ is an unsubstituted $C_4$-$C_{62}$ cycloalkyl, a substituted $C_4$-$C_{62}$ cycloalkyl, an unsubstituted $C_4$-$C_{62}$ aryl, a substituted $C_4$-$C_{62}$ aryl, an unsubstituted $C_4$-$C_{62}$ heteroaryl, or a substituted $C_4$-$C_{62}$ heteroaryl;
each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —SR', —OR, —$SiR'_3$, —$OSiR'_3$, —$PR'_2$, or —R"—$SiR'_3$, wherein R" is $C_1$-$C_{10}$ alkyl and each R' is hydrogen, halogen, $C_1$-$C_{10}$ alkyl, or $C_6$-$C_{10}$ aryl;
each of $R^5$, $R^6$, $R^7$, and $R^8$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —SR', —OR, —$SiR'_3$, —$OSiR'_3$, —$PR'_2$, or —R"—$SiR'_3$, wherein R" is $C_1$-$C_{10}$ alkyl and each R' is hydrogen, halogen, $C_1$-$C_{10}$ alkyl, or $C_6$-$C_{10}$ aryl, or one or more of $R^5$ and $R^6$, $R^6$ and $R^7$, or $R^7$ and $R^8$ can be joined to form a substituted or unsubstituted $C_4$-$C_{62}$ saturated or unsaturated cyclic or polycyclic ring structure, or a combination thereof; and $J^1$ and $J^2$ dire joined to form a substituted or unsubstituted $C_4$-$C_{62}$ saturated or unsaturated cyclic or polycyclic ring structure, of as combination thereof.

Clause 14. The method of Clause 1, Clause 2, Clause 3, Clause 4, Clause 5, Clause 6, Clause 7, Clause 8, Clause 9, or Clause 10, wherein the transition metal coordination catalyst complex is represented by one or more of:

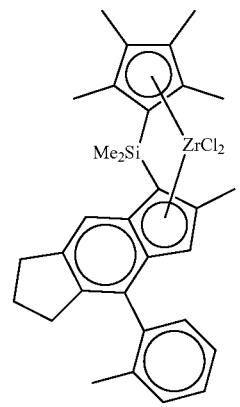

1

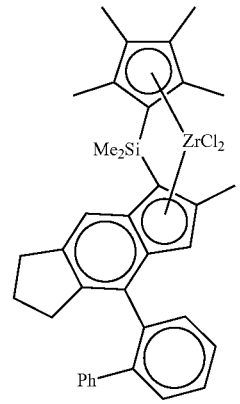

2

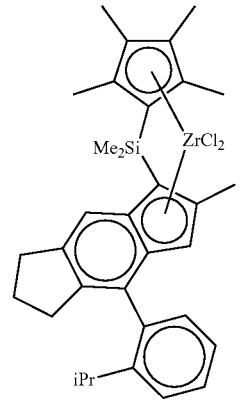

3

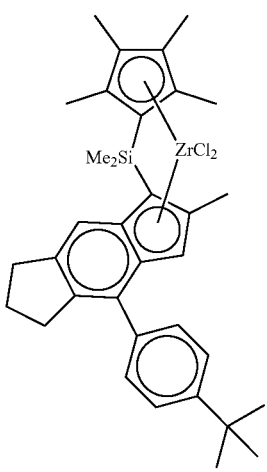
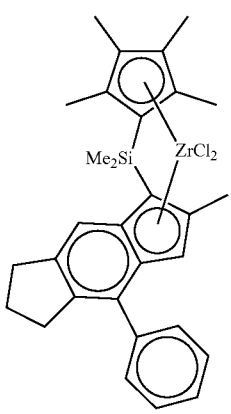
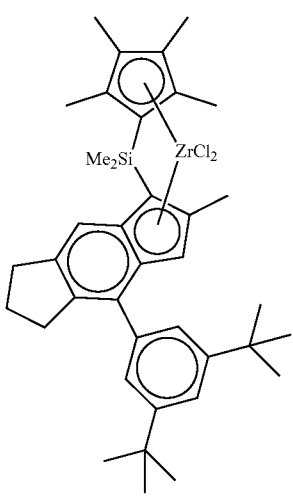
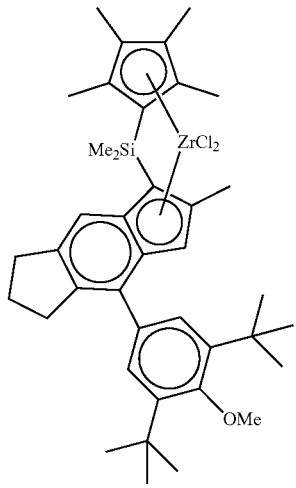
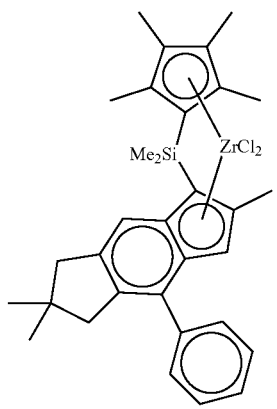
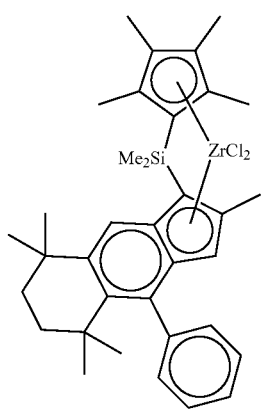

-continued
10
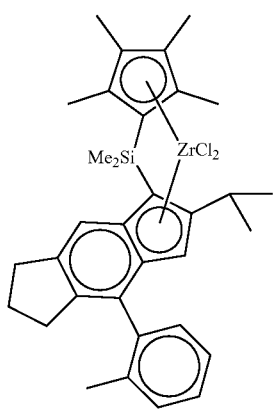
11
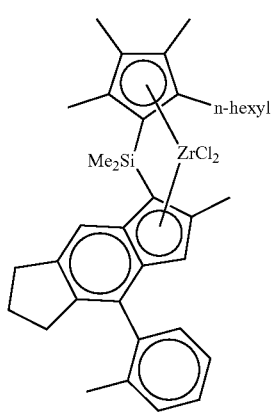
12
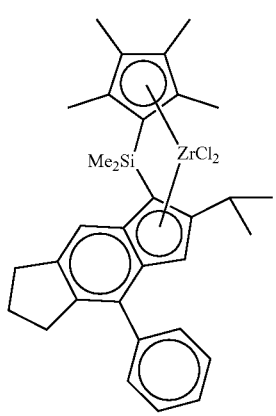
13
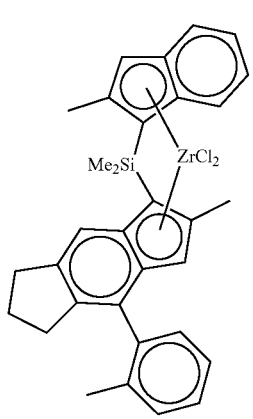
-continued
14
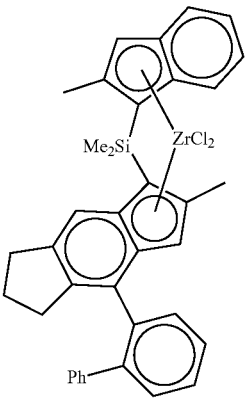
15
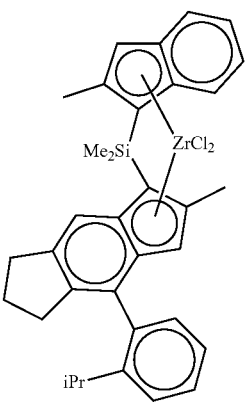
16
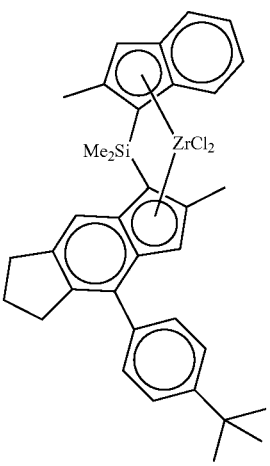

17
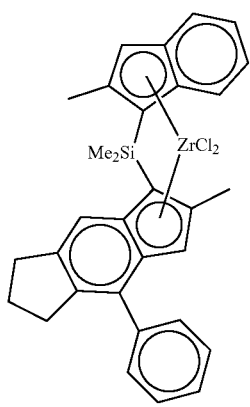
18
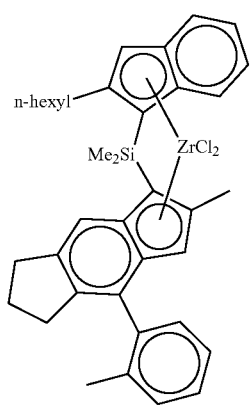
19
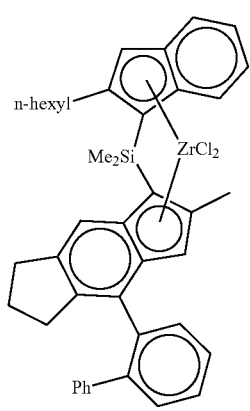
20
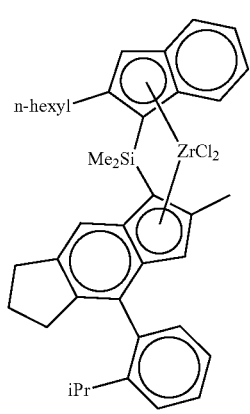
21
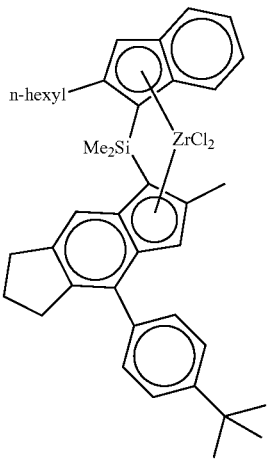
22
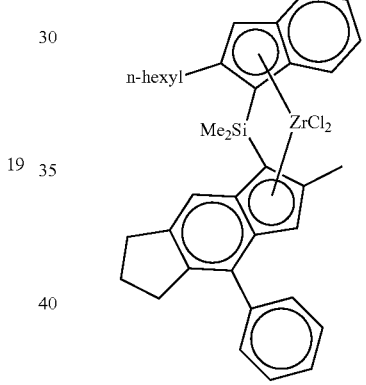
23
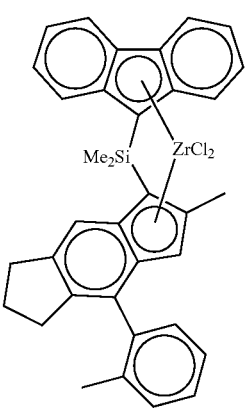

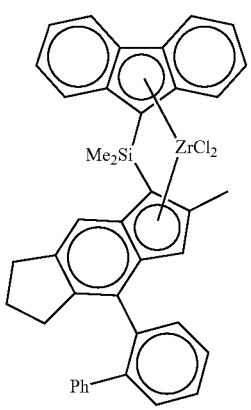

24

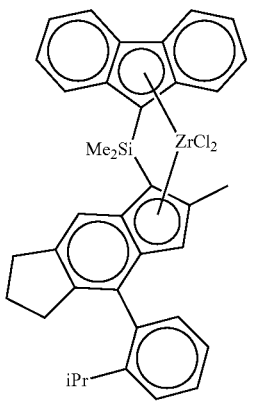

26

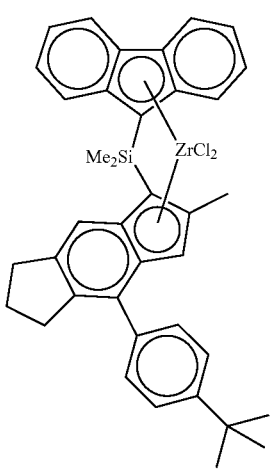

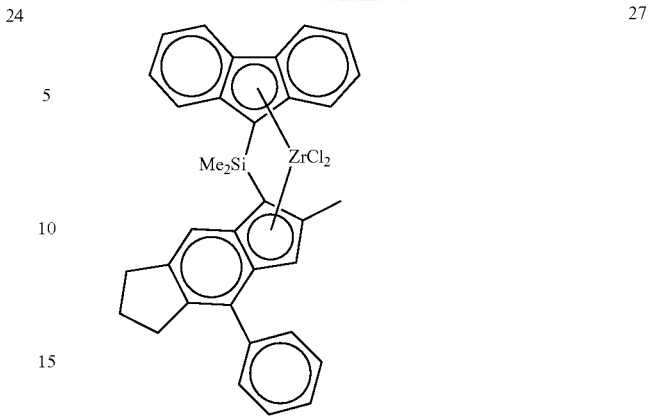

27

Clause 15. The method of Clause 1, Clause 2, Clause 3, Clause 4, Clause 5, Clause 6, Clause 7, Clause 8, Clause 9, Clause 9, or Clause 10, wherein the alkylated transition metal coordination catalyst complex is one or more of:
bis(cyclopentadienyl)$M^cR_n$,
bis(n-butylcyclopentadienyl)$M^cR_n$,
bis(pentamethylcyclopentadienyl)$M^cR_n$,
bis(pentamethylcyclopentadienyl)$M^cR_n$,
bis(1-methyl-3-n-butylcyclopentadienyl)$M^cR_n$,
bis(1-methyl-3-n-butylcyclopentadienyl)$M^cR_n$,
bis(tetrahydro-1-indenyl)$M^cR_n$,
(n-propyl cyclopentadienyl)(pentamethyl cyclopentadienyl) $M^cR_n$,
dimethylsilylbis(tetrahydroindenyl)$M^cR_n$,
dimethylsilyl bis(2-methylindenyl)$M^cR_n$,
dimethylsilyl bis(2-methylfluorenyl)$M^cR_n$,
dimethylsilyl bis(2-methyl-5,7-propylindenyl)$M^cR_n$,
dimethylsilyl bis(2-methyl-4-phenylindenyl)$M^cR_n$,
dimethylsilyl bis(2-ethyl-5-phenylindenyl)$M^cR_n$,
dimethylsilyl bis(2-methyl-4-biphenylindenyl)$M^cR_n$,
dimethylsilylene bis(2-methyl-4-carbazolylindenyl)$M^cR_n$,
rac-dimethylsilyl-bis-(5,6,7,8-tetrahydro-5,5,8,8-tetramethyl-2-methyl-1H-benz(f)indene)$M^cR_n$,
diphenylmethylene (cyclopentadienyl)(fluorenyl)$M^cR_n$,
bis(methylcyclopentadienyl)$M^cR_n$,
rac-dimethylsiylbis(2-methyl,3-propyl indenyl)$M^cR_n$,
dimethylsilylbis(indenyl)$M^cR_n$,
rac-meso-diphenylsilyl-bis(n-propylcyclopentadienyl) $M^cR_n$,
1,1'-bis(4-triethylsilylphenyl)methylene-(cyclopentadienyl)(3,8-di-tertiary-butyl-1-fluorenyl)$M^cR_n$,
bis-trimethylsilylphenyl-methylene(cyclopentadienyl)(di-t-butylfluorenyl)$M^cR_n$,
bis-trimethylsilylphenyl-methylene(cyclopentadienyl)(fluorenyl)$M^cR_n$,
bisphenylmethylene(cyclopentadienyl)(dimethylfluorenyl) $M^cR_n$,
bis(n-propylcyclopentadienyl)$M^cR_n$,
bis(n-butylcyclopentadienyl)$M^cR_n$,
bis(n-pentylcyclopentadienyl)$M^cR_n$,
(n-propyl cyclopentadienyl)(n-butylcyclopentadienyl) $M^cR_n$,
bis[(2-trimethylsilylethyl)cyclopentadienyl]$M^cR_n$,
bis(trimethylsilyl cyclopentadienyl)$M^cR_n$,
dimethylsilylbis(n-propylcyclopentadienyl)$M^cR_n$,
dimethylsilylbis(n-butylcyclopentadienyl)$M^cR_n$,
bis(1-n-propyl-2-methylcyclopentadienyl)$M^cR_n$, (n-propylcyclopentadienyl)(1-n-propyl-3-n-butylcyclopentadienyl)M$^c$R$_n$,
bis(1-methyl, 3-n-butyl cyclopentadienyl)M$^c$R$_n$,
bis(indenyl)M$^c$R$_n$,
dimethylsilyl (tetramethylcyclopentadienyl)(cyclododecylamido)M$^c$R$_n$,
dimethylsilyl (tetramethylcyclopentadienyl)(t-butylamido) M$^c$R$_n$,
1,1'-bis(4-triethylsilylphenyl)(methylene)(cyclopentadienyl)(fluorenyl)M$^c$R$_n$;
μ-(CH$_3$)$_2$Si(cyclopentadienyl)(1-adamantylamido)M$^c$R$_n$,
μ-(CH$_3$)$_2$Si(3-tertbutylcyclopentadienyl)(1-adamantylamido)M$^c$R$_n$,
μ-(CH$_3$)$_2$(tetramethylcyclopentadienyl)(1-adamantylamido)M$^c$R$_n$,
μ-(CH$_3$)$_2$Si(tetramethylcyclopentadienyl)(1-adamantylamido)M$^c$R$_n$,
μ-(CH$_3$)$_2$C(tetramethylcyclopentadienyl)(1-adamantylamido)M$^c$R$_n$,
μ-(CH$_3$)$_2$Si(tetramethylcyclopentadienyl)(1-tertbutylamido) M$^c$R$_n$,
μ-(CH$_3$)$_2$Si(fluorenyl)(1-tertbutylamido)M$^c$R$_n$,
μ-(CH$_3$)$_2$Si(tetramethylcyclopentadienyl)(1-cyclododecylamido)M$^c$R$_n$,
μ-(C$_6$H$_5$)$_2$C(tetramethylcyclopentadienyl)(1-cyclododecylamido)M$^c$R$_n$,
μ-(CH$_3$)$_2$Si(η$^5$-2,6,6-trimethyl-1,5,6,7-tetrahydro-s-indacen-1-yl)(tertbutylamido)M$^c$R$_n$,
where n is 2, M$^c$ is Ti, Zr, or Hf; and each R is independently selected from methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

Clause 16. The method of Clause 1, Clause 2, Clause 3, Clause 4, Clause 5, Clause 6, Clause 7, Clause 8, Clause 9, or Clause 10, wherein the alkylated transition metal coordination catalyst complex is one or more of:
bis(cyclopentadienyl)zirconium dimethyl,
bis(n-butylcyclopentadienyl)zirconium dimethyl,
bis(pentamethylcyclopentadienyl)zirconium dimethyl,
bis(pentamethylcyclopentadienyl)hafnium dimethyl,
bis(1-methyl-3-n-butylcyclopentadienyl)zirconium dimethyl,
bis(1-methyl-3-n-butylcyclopentadienyl)hafnium dimethyl,
bis(tetrahydro-1-indenyl)zirconium dimethyl,
(n-propyl cyclopentadienyl, pentamethyl cyclopentadienyl) zirconium dimethyl,
dimethylsilyl (tetramethylcyclopentadienyl)(cyclododecylamido)titanium dimethyl,
dimethylsilyl (tetramethylcyclopentadienyl)(cyclododecylamido)titanium dimethyl,
dimethylsilyl (tetramethylcyclopentadienyl)(t-butylamido) titanium dimethyl,
dimethylsilyl (tetramethylcyclopentadienyl)(t-butylamido) titanium dimethyl,
μ-(CH$_3$)$_2$Si(cyclopentadienyl)(1-adamantylamido)titanium dimethyl,
μ-(CH$_3$)$_2$Si(3-tertbutylcyclopentadienyl)(1-adamantylamido)titanium dimethyl,
μ-(CH$_3$)$_2$(tetramethylcyclopentadienyl)(1-adamantylamido) titanium dimethyl,
μ-(CH$_3$)$_2$Si(tetramethylcyclopentadienyl)(1-adamantylamido)titanium dimethyl,
μ-(CH$_3$)$_2$C(tetramethylcyclopentadienyl)(1-adamantylamido)titanium dimethyl,
μ-(CH$_3$)$_2$Si(tetramethylcyclopentadienyl)(1-tertbutylamido) titanium dimethyl,
μ-(CH$_3$)$_2$Si(fluorenyl)(1-tertbutylamido)titanium dimethyl,
μ-(CH$_3$)$_2$Si(tetramethylcyclopentadienyl)(1-cyclododecylamido)titanium dimethyl,
μ-(C$_6$H$_5$)$_2$C(tetramethylcyclopentadienyl)(1-cyclododecylamido)titanium dimethyl,
μ-(CH$_3$)$_2$Si(η$^5$-2,6,6-trimethyl-1,5,6,7-tetrahydro-s-indacen-1-yl)(tertbutylamido)titanium dimethyl,
rac-dimethylsilyl-bis(indenyl)hafnium dimethyl,
1,1'-bis(4-triethylsilylphenyl)methylene-(cyclopentadienyl) (3,8-di-tertiary-butyl-1-fluorenyl)hafnium dimethyl,
dimethylsilyl bis(tetrahydroindenyl)zirconium dimethyl,
bis(1-methyl, 3-n-butyl cyclopentadienyl)hafnium dimethyl,
bis(1-methyl, 3-n-butyl cyclopentadienyl)zirconium dimethyl,
dimethylsilyl bis(indenyl)zirconium dimethyl,
dimethylsilyl bis(indenyl)hafnium dimethyl,
bis(indenyl)zirconium dimethyl,
bis(indenyl)hafnium dimethyl,
dimethylsilyl bis(tetrahydroindenyl)zirconium dimethyl,
bis(n-propylcyclopentadienyl)zirconium dimethyl,
dimethylsilylbis(tetrahydroindenyl)hafnium dimethyl,
dimethylsilyl bis(2-methylindenyl)zirconium dimethyl,
dimethylsilyl bis(2-methylfluorenyl)zirconium dimethyl,
dimethylsilyl bis(2-methylindenyl)hafnium dimethyl,
dimethylsilyl bis(2-methylfluorenyl)hafnium dimethyl,
dimethylsilyl bis(2-methyl-5,7-propylindenyl) zirconium dimethyl,
dimethylsilyl bis(2-methyl-4-phenylindenyl) zirconium dimethyl,
dimethylsilyl bis(2-ethyl-5-phenylindenyl) zirconium dimethyl,
dimethylsilyl bis(2-methyl-4-biphenylindenyl) zirconium dimethyl,
dimethylsilylene bis(2-methyl-4-carbazolylindenyl) zirconium dimethyl,
rac-dimethylsilyl-bis-(5,6,7,8-tetrahydro-5,5,8,8-tetramethyl-2-methyl-1H-benz(f)indene)hafnium dimethyl,
diphenylmethylene (cyclopentadienyl)(fluoreneyl)hafnium dimethyl,
bis(methylcyclopentadienyl)zirconium dimethyl,
rac-dimethylsiylbis(2-methyl,3-propyl indenyl)hafnium dimethyl,
dimethylsilylbis(indenyl)hafnium dimethyl,
dimethylsilylbis(indenyl)zirconium dimethyl,
dimethyl rac-dimethylsilyl-bis-(5,6,7,8-tetrahydro-5,5,8,8-tetramethyl-2-methyl-1H-benz(f)indene)hafnium dimethyl,
rac-meso-diphenylsilyl-bis(n-propylcyclopentadienyl)hafnium dimethyl, 1,1'-bis(4-triethylsilylphenyl)methylene-(cyclopentadienyl)(3,8-di-tertiary-butyl-1-fluorenyl)hafnium dimethyl,
1,1'-bis(4-triethylsilylphenyl)methylene-(cyclopentadienyl) (3,8-di-tertiary-butyl-1-fluorenyl)hafnium dimethyl (bridge is considered the 1 position),
bis-trimethylsilylphenyl-methylene(cyclopentadienyl)(di-t-butylfluorenyl)hafnium dimethyl,
bis-trimethylsilylphenyl-methylene(cyclopentadienyl)(fluorenyl)hafnium dimethyl,
bisphenylmethylene(cyclopentadienyl)(dimethylfluorenyl) hafnium dimethyl,
bis(n-propylcyclopentadienyl)hafnium dimethyl,
bis(n-butylcyclopentadienyl)hafnium dimethyl,
bis(n-pentylcyclopentadienyl)hafnium dimethyl,
(n-propyl cyclopentadienyl)(n-butylcyclopentadienyl)hafnium dimethyl,
bis[(2-trimethylsilylethyl)cyclopentadienyl]hafnium dimethyl,
bis(trimethylsilyl cyclopentadienyl)hafnium dimethyl, dimethylsilylbis(n-propylcyclopentadienyl)hafnium dimethyl, dimethylsilylbis(n-butylcyclopentadienyl)hafnium dimethyl, bis(1-n-propyl-2-methylcyclopentadienyl)hafnium dimethyl, (n-propylcyclopentadienyl)(1-n-propyl-3-n-butylcyclopentadienyl)hafnium dimethyl, bis(n-propylcyclopentadienyl)hafnium dimethyl, bis(n-butylcyclopentadienyl)hafnium dimethyl, bis(n-pentylcyclopentadienyl)hafnium dimethyl, (n-propyl cyclopentadienyl)(n-butylcyclopentadienyl)hafnium dimethyl, bis[(2-trimethylsilylethyl)cyclopentadienyl]hafnium dimethyl, bis(trimethylsilyl cyclopentadienyl)hafnium dimethyl, dimethylsilylbis(n-propylcyclopentadienyl)hafnium dimethyl, dimethylsilylbis(n-butylcyclopentadienyl)hafnium dimethyl, bis(1-n-propyl-2-methylcyclopentadienyl)hafnium dimethyl, (n-propylcyclopentadienyl)(1-n-propyl-3-n-butylcyclopentadienyl)hafnium dimethyl, and dimethylsilyl(3-n-propylcyclopentadienyl)(tetramethylcyclopentadienyl)zirconium dimethyl.

Clause 17. The method of Clause 1, Clause 2, Clause 3, Clause 4, Clause 5, Clause 6, Clause 7, Clause 8, Clause 9, or Clause 10, wherein the alkylated transition metal coordination catalyst complex is one or more of:

(III)

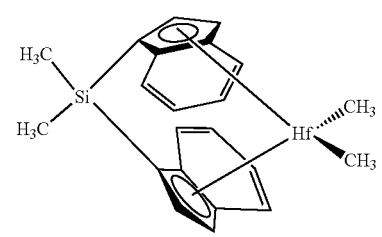

(IV)

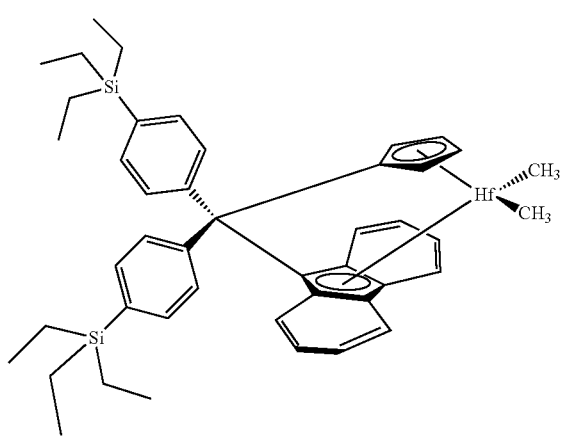

(V)

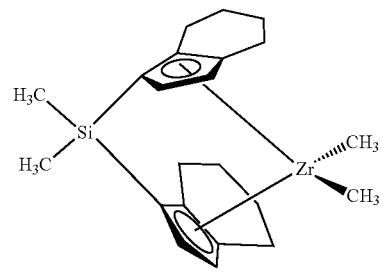

(VI)

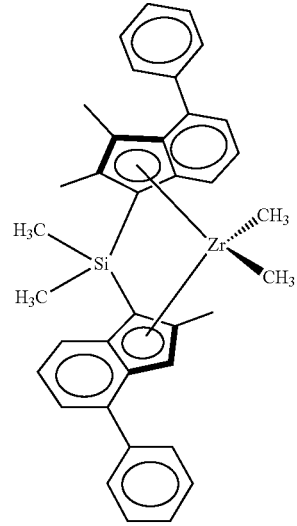

Clause 18. The method of Clause 1, Clause 2, Clause 3, Clause 4, Clause 5, Clause 6, Clause 7, Clause 8, Clause 9, or Clause 10, wherein the transition metal coordination catalyst complex is selected from the group consisting of: bisphenolate complexes; diphenolate complexes; oxadiazolylphenolate complexes; diethylenetriamine complexes; oxybis(ethylamine) complexes; pyridyldiamido complexes; quinolinyldiamido complexes; cyclopentadienyl-amidinate complexes; and iron pyridyl bis(imine) complexes; or any combination thereof, including any combination with metallocene complexes.

Clause 19. The method of Clause 1, Clause 2, Clause 3, Clause 4, Clause 5, Clause 6, Clause 7, Clause 8, Clause 9, Clause 10, Clause 11, Clause 12, Clause 13, Clause 14, or Clause 15 further comprising: contacting the alkylated transition metal coordination catalyst complex (such as alkylated metallocene and/or the alkylated post-metallocene) with an activator to produce a catalyst system, where preferably the activator is selected from.

Clause 20. The method of Clause 19, wherein the activator is one or more of

N,N-dimethylanilinium [tetrakis(perfluorophenyl)borate],

N,N-dimethylanilinium [tetrakis(perfluoronaphthyl)borate],

N,N-di(hydrogenated tallow)methylammonium [tetrakis(perfluorophenyl) borate],

N-methyl-4-nonadecyl-N-octadecylanilinium [tetrakis(perfluorophenyl)borate],

N-methyl-4-hexadecyl-N-octadecylanilinium [tetrakis(perfluorophenyl)borate],

N-methyl-4-tetradecyl-N-octadecylanilinium [tetrakis(perfluorophenyl)borate],

N-methyl-4-dodecyl-N-octadecylanilinium [tetrakis(perfluorophenyl)borate],

N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl)borate],
N-octadecyl-N-hexadecyl-tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate],
N-dodecyl-N-decyl-tolylammonium [tetrakis(perfluorophenyl)borate],
N-methyl-N-octadecylanilinium [tetrakis(perfluorophenyl)borate],
N-methyl-N-hexadecylanilinium [tetrakis(perfluorophenyl)borate],
N-methyl-N-tetradecylanilinium [tetrakis(perfluorophenyl)borate],
N-methyl-N-dodecylanilinium [tetrakis(perfluorophenyl)borate],
N-methyl-N-decylanilinium [tetrakis(perfluorophenyl)borate],
N-methyl-N-octylanilinium [tetrakis(perfluorophenyl)borate],
N-methyl-4-nonadecyl-N-octadecylbenzenaminium tetrakis(pentafluorophenyl)borate,
N-methyl-4-nonadecyl-N-octadecylbenzenaminium tetrakis(perfluoronaphthalenyl)borate,
N,N-dimethylanilinium tetrakis(perfluorobiphenyl)borate,
N,N-dimethylanilinium tetrakis(3,5-bis(trifluoromethyl)phenyl)borate,
triphenylcarbenium tetrakis(perfluoronaphthalenyl)borate,
triphenylcarbenium tetrakis(perfluorobiphenyl)borate,
triphenylcarbenium tetrakis(3,5-bis(trifluoromethyl)phenyl)borate,
triphenylcarbenium tetrakis(perfluorophenyl)borate,
1-(4-(tris(pentafluorophenyl)borate)-2,3,5,6-tetrafluorophenyl)pyrrolidinium;
4-(tris(pentafluorophenyl)borate)-2,3,5,6-tetrafluoropyridine,
triphenylcarbenium tetrakis(pentafluorophenyl)borate, and
triphenylcarbenium tetrakis-(2,3,4,6-tetrafluorophenyl)borate.

Clause 21. The method of Clause 19 or 20 further comprising: contacting at least one olefin with the catalyst system to produce a polyolefin.

Clause 22. The method of Clause 21, wherein the at least one olefin comprises a monomer selected from the group consisting of: ethylene, propylene, butene, pentene, hexene, heptene, octene, nonene, decene, undecene, dodecane, 1,4-pentadiene, 1,5-hexadiene, 1,6-heptadiene, 1,7-octadiene, ethylidene norbonene, and isomers thereof, and any combination thereof.

Clause 23. The method of Clause 21 or 22, wherein the activator comprises alumoxane and or a non-coordinating anion.

The present invention includes methods comprising:
reacting (a) a transition metal coordination catalyst complex (such as metallocene and/or a post-metallocene (e.g., (a.i) one or more metallocenes, (a.ii) one or more post-metallocenes, or (a.iii) one or more metallocenes in combination with one or more post-metallocenes)), (b) an aluminum alkyl, and (c) a fluoride salt (e.g., NaF, KF, $MgF_2$, $CaF_2$, and any combination thereof) at 0° C. to 85° C. (or 0° C. to 25° C., or 15° C. to 50° C., or 15° C. to 25° C., or 20° C. to 30° C., 25° C. to 40° C., or 35° C. to 50° C., or 40° C. to 85° C.) for 15 minutes to 36 hours (or 15 minutes to 2 hours, or 1 hour to 8 hours, or 6 hours to 18 hours, or 12 hours to 36 hours) in a non-polar solvent (e.g., butane, isobutene, pentane, isopentane, hexane, isohexane, heptane, octane, decane, benzene, toluene, xylene, and any combination thereof) to yield an alkylated metallocene and/or an alkylated post-metallocene,
adding additional fluoride salt to precipitate unreacted aluminum alkyl after reacting,
wherein a molar ratio of the metallocene and/or the post-metallocene to the aluminum alkyl is 1:1 to 1:3 (or 1:1 to 1:3, or 1:2 to 1:5),
wherein a molar ratio of aluminum of the aluminum alkyl to fluoride of the fluoride salt is 1:15 to 1:1 (or 1:15 to 1:8, or 1:10 to 1:3, or 1:8 to 1:1),
wherein the transition metal coordination catalyst complex (such as alkylated metallocene and/or the alkylated post-metallocene) have a molar ratio of di-alkylated to mono-alkylated of 100:0 to 70:30 (or 100:0 to 90:10, or 95:5 to 75:25, or 85:15 to 70:30),
wherein the molar ratio of rac:meso in an alkylated metallocene is 100:0 to 0:100 (or 100:0 to 50:50, or 75:25 to 25:75, or 25:75 to 75:25, or 50:50 to 0:100, or 100:0 to 90:10, or 100:0 to 97:3, or 99.5:0.5 to 100:5, or 99:1 to 90:10).

The present invention also includes methods comprising: reacting (a) transition metal coordination catalyst complex (such as a metallocene and/or a post-metallocene (e.g., (a.i) one or more metallocenes, (a.ii) one or more post-metallocenes, or (a.iii) one or more metallocenes in combination with one or more post-metallocenes)), (b) an aluminum alkyl, and (c) a fluoride salt (e.g., NaF, KF, $MgF_2$, $CaF_2$, and any combination thereof) at 0° C. to 85° C. (or 0° C. to 25° C., or 15° C. to 50° C., or 15° C. to 25° C., or 20° C. to 30° C., 25° C. to 40° C., or 35° C. to 50° C., or 40° C. to 85° C.) for 15 minutes to 36 hours (or 15 minutes to 2 hours, or 1 hour to 8 hours, or 6 hours to 18 hours, or 12 hours to 36 hours) in a non-polar solvent (e.g., butane, isobutene, pentane, isopentane, hexane, isohexane, heptane, octane, decane, benzene, toluene, xylene, and any combination thereof) to yield an alkylated transition metal coordination catalyst complexes (such as alkylated metallocene and/or an alkylated post-metallocene), adding additional fluoride salt to precipitate unreacted aluminum alkyl after reacting, contacting the alkylates transition metal coordination catalyst complexes (such as alkylated metallocene and/or the alkylated post-metallocene) with an activator to produce a catalyst system, wherein a molar ratio of the transition metal coordination catalyst complexes to the aluminum alkyl is 1:1 to 1:3 (or 1:1 to 1:3, or 1:2 to 1:5), wherein a molar ratio of aluminum of the aluminum alkyl to fluoride of the fluoride salt is 1:15 to 1:1 (or 1:15 to 1:8, or 1:10 to 1:3, or 1:8 to 1:1), wherein the alkylated transition metal coordination catalyst complexes (such as alkylated metallocene and/or the alkylated post-metallocene) have a molar ratio of di-alkylated to mono-alkylated of 100:0 to 70:30 (or 100:0 to 90:10, or 95:5 to 75:25, or 85:15 to 70:30), wherein the molar ratio of rac:meso in an alkylated metallocene is 100:0 to 0:100 (or 100:0 to 50:50, or 75:25 to 25:75, or 25:75 to 75:25, or 50:50 to 0:100, or 100:0 to 90:10, or 100:0 to 97:3, or 99.5:0.5 to 100:5, or 99:1 to 90:10).

The present invention also includes methods comprising: reacting (a) a transition metal coordination catalyst complexes (such as metallocene and/or a post-metallocene (e.g., (a.i) one or more metallocenes, (a.ii) one or more post-metallocenes, or (a.iii) one or more metallocenes in combination with one or more post-metallocenes)), (b) an aluminum alkyl, and (c) a fluoride salt (e.g., NaF, KF, $MgF_2$, $CaF_2$, and any combination thereof) at 0° C. to 85° C. (or 0° C. to 25° C., or 15° C. to 50° C., or 15° C. to 25° C., or 20° C. to 30° C., 25° C. to 40° C., or 35° C. to 50° C., or 40° C. to 85° C.) for 15 minutes to 36 hours (or 15 minutes to 2 hours, or 1 hour to 8 hours, or 6 hours to 18 hours, or 12 hours to 36 hours) in a non-polar solvent (e.g., butane, isobutene, pentane, isopentane, hexane, isohexane, heptane, octane, decane, benzene, toluene, xylene, and any combination thereof) to yield an alkylated transition metal coordination catalyst complexes (such as alkylated metallocene and/or an alkylated post-metallocene), adding additional fluoride salt to precipitate unreacted aluminum alkyl after reacting, contacting the alkylated transition metal coordination catalyst complexes (such as alkylated metallocene and/or an alkylated post-metallocene) with an activator to produce a catalyst system, contacting at least one olefin (e.g., a monomer selected from the group consisting of: ethylene, propylene, butene, pentene, hexene, heptene, octene, nonene, decene, undecene, dodecane, 1,4-pentadiene, 1,5-hexadiene, 1,6-heptadiene, 1,7-octadiene, ethylidene norbonene, and isomers thereof, and any combination thereof) with the catalyst system to produce a polyolefin, wherein a molar ratio of the alkylated transition metal coordination catalyst complexes (such as alkylated metallocene and/or an alkylated post-metallocene) to the aluminum alkyl is 1:1 to 1:3 (or 1:1 to 1:3, or 1:2 to 1:5), wherein a molar ratio of aluminum of the aluminum alkyl to fluoride of the fluoride salt is 1:15 to 1:1 (or 1:15 to 1:8, or 1:10 to 1:3, or 1:8 to 1:1), wherein the alkylated transition metal coordination catalyst complexes (such as alkylated metallocene and/or an alkylated post-metallocene) have a molar ratio of di-alkylated to mono-alkylated of 100:0 to 70:30 (or 100:0 to 90:10, or 95:5 to 75:25, or 85:15 to 70:30), wherein the molar ratio of rac:meso in analkylated metallocene is 100:0 to 0:100 (or 100:0 to 50:50, or 75:25 to 25:75, or 25:75 to 75:25, or 50:50 to 0:100, or 100:0 to 90:10, or 100:0 to 97:3, or 99.5:0.5 to 100:5, or 99:1 to 90:10).

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

TMA is trimethyl aluminum.
TIBAL is tri-isobutyl aluminum.
Synthesis Procedure for Examples 1-8, 10-13, and 15. In a 20 mL vial, the following reactants were added: (a) 1 equivalent of neat trialkylaluminum ($AlR_3$ per Table 1), (b) 4 equivalents of $MgF_2$ or 8 equivalents of KF, and (c) a given amount of solvent in Table 1. Each of these reactants were from Aldrich and individually heated at 110° C. for overnight under slow $N_2$ purge to remove moisture and oxygen from the reactant.

The vial was shaken on a shaker for 1 hr at room temperature. Then, 1 equivalent of metallocene or post-metallocene dichloride (Formulas (X)—(XIV)) was added to the vial, which was then further shaken. Samples were extracted from the vial periodically for $^1$H-NMR analysis to monitor the progress of the reaction. The results for selected metallocene or post-metallocene dichloride for alkylation are summarized in Table 1. FIG. 1 is the $^1$H-NMR Sample 3.

Synthesis Procedure for Examples 9, 14, 16-18. To a stirring mixture of metal dichlorides and KF (8 equiv.) in benzene or toluene was added neat $AlMe_3$ (3 equiv.). No initial color change is observed. The mixture was allowed to react for 16 hours. After 16 hours, the mixture was concentrated in vacuo and extracted into 10 mL of benzene or heptane (depending on solubility of product). The solution was filtered onto additional KF (8-10 equiv.) and optionally heated to 75° C. for 2 hours. Additional filtration over fresh KF (8-10 equiv.) and solvent removal yielded pure dimethyl-complexes.

(4-([1,1'-biphenyl]-2-yl)-2-methyl-1,5,6,7-tetrahydro-s-indacen-1-yl)dimethyl(2,3,4,5-tetramethylcyclopenta-2,4-dien-1-yl)silane dimethyl zirconium (89% yield)$^1$H NMR (500 MHz, Benzene-$d_6$) δ 8.04 (d, 1H), 7.52 (m, 1H) 7.26-7.21 (overlapping m, 5H), 6.93 (m, 3H), 6.83 (s, 1H), 2.68 (m, 1H) 2.54 (m, 2H), 2.30 (m, 1H), 1.93 (s, 6H), 1.89 (s, 3H), 1.81 (s, 6H) 1.51 (m, 2H), 0.75 (s, 3H), 0.60 (s, 3H), −0.06 (s, 3H), −1.05 (s, 3H).

(4-(4-(tert-butyl)phenyl)-2-methyl-JH-inden-1-yl)dimethyl(2,3,4,5-tetramethylcyclopenta-2,4-dien-1-yl)silane dimethyl zirconium (Yield=89%)$^1$H NMR (500 MHz, Benzene-$d_6$) δ 7.91 (d, 2H), 7.46 (d, 2H), 7.38 (m, 3H), 6.91 (m, 1H), 1.98 (s, 3H), 1.91 (s, 3H), 1.82 (s, 6H), 1.78 (s, 3H), 1.27 (s, 9H), 0.78 (s, 3H), 0.64 (s, 3H), −0.01 (s, 3H), −1.04 (s, 3H).

9-(2-(4-(4-(tert-butyl)phenyl)-2-methyl-JH-inden-1-yl)ethyl)-9H-fluorenyl dimethyl zirconium (Yield=86%)$^1$H NMR (500 MHz, Benzene-$d_6$) δ 7.76 (d, 1H), 7.65 (m, 3H), 7.27 (m, 7H), 7.00 (m, 4H), 6.83 (m, 1H), 6.61 (s, 1H), 3.61 (m, 1H), 3.28 (m, 3H), 1.84 (s, 3H), 1.16 (s, 9H), −0.78 (s, 3H), −1.75 (s, 3H).

9-(2-(2-methyl-1,5,6,7-tetrahydro-s-indacen-1-yl)ethyl)-9H-fluorenyl dimethyl hafnium (Yield=68%)$^1$H NMR (400 MHz, Benzene-$d_6$) δ 7.83 (d, 1H), 7.65 (d, 1H), 7.34 (d, 1H), 7.29 (m, 1H), 7.17 (s, 1H), 7.02 (m, 3H), 6.86 (m, 1H), 5.97 (s, 1H), 3.70 (m, 1H), 3.44 (m, 1H), 3.32 (m, 2H), 2.71 (m, 4H), 1.89 (s, 3H), 1.80 (m, 2H), −1.05 (s, 3H), −2.12 (s, 3H).

Non-Alkylated Structures for Alkylation Studies:

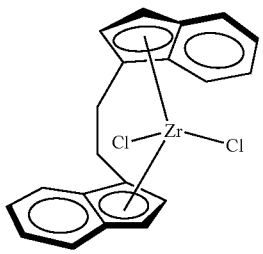

(X)

$C_2$ symmetrical bridged metallocene: rac-ethylene bis(indenyl)zirconium dichloride (contains 0.5 mol % meso-isomer)

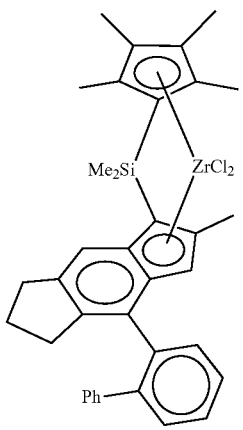

(XI)

C1 symmetrical bridged metallocene: dimethylsilyl(2,3,4,5-tetramethyl cycplopentadienyl)(2-methyl-4-(2-biphenyl)-1,5,6,7-tetrahydro-s-indacenyl)zirconium dichloride

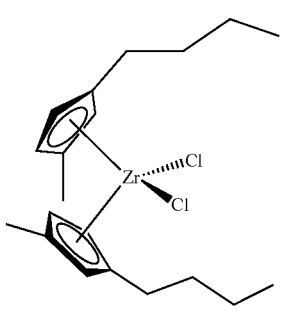

(XII)

non-bridged metallocene: bis(1-methyl-3-butyl-cyclopentadienyl)zirconium dichloride

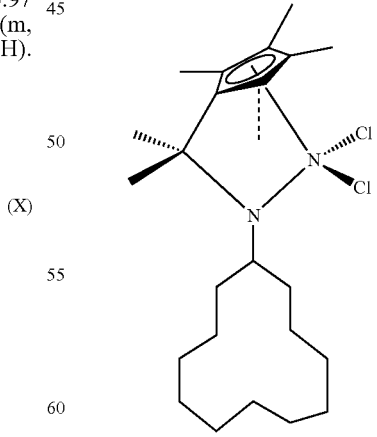

(XIII)

constrained half-metallocene: dimethylsilyl (2,3,4,5-tetramethyl-cyclopentadienyl) (N-cyclododecylamido)titanium dichloride

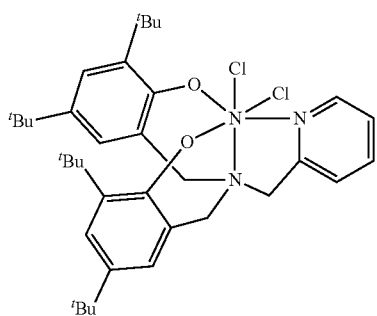

(XIV)

post-metallocene: 6,6'-(((pyridin-2-ylmethyl)azanediyl)bis(methylene))bis(2,4-di-tert-butylphenolate) titanium dichloride

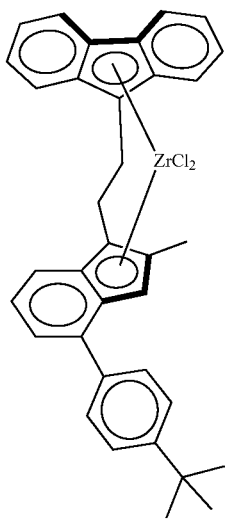

(XVI)

C1-metallocene: 9-(2-(4-(4-(tert-butyl)phenyl)-2-methyl-JH-inden-1-yl)ethyl)-9H-fluorenyl zirconium dichloride

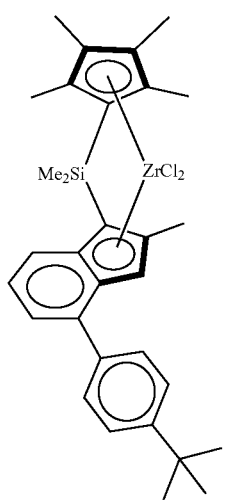

(XV)

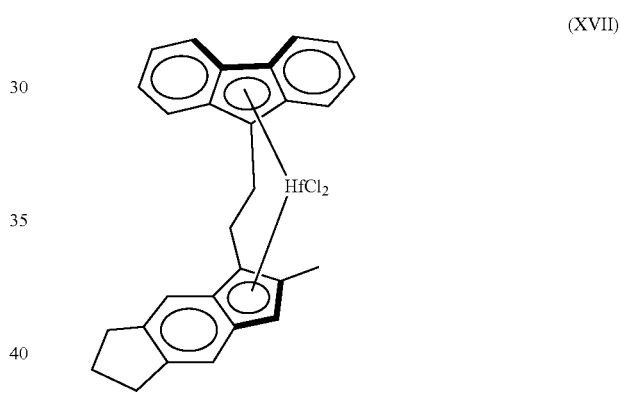

(XVII)

C1-metallocene: (4-(4-(tert-butyl)phenyl)-2-methyl-JH-inden-1-yl)dimethyl(2,3,4,5-tetramethylcyclopenta-2,4-dien-1-yl)silane zirconium dichloride C1-metallocene: 9-(2-(2-methyl-1,5,6,7-tetrahydro-s-indacen-1-yl)ethyl)-9H-fluorenyl hafnium dichloride

TABLE 2

Examples of Alkylation of Representative Metallocenes and Post-Metallocenes with Aluminumalkyls and Metal Fluorides

| Sample | Metallocene or Post-Metallocene | AlR$_3$ | Fluoride | Molar ratio of Cat:Al | Molar ratio of Al:F | Nonpolar Solvent | Reaction Temp. (° C.) | Reaction Time (hr) | Molar ratio of rac:meso | NMR Conv. to Di/mono (%) | Isolated Yield (%) |
|---|---|---|---|---|---|---|---|---|---|---|---|
| 1 | X | TMA | MgF$_2$ | 1:1 | 1:8 | toluene | 21 | 24 | 100:3.6 | 0/6.0 | — |
| 2 | X | TMA | KF | 1:1 | 1:8 | toluene | 21 | 24 | 100:0.5 | 95/5 | 92 |
| 3 | X | TMA | KF | 1:1.3 | 1:8 | toluene | 21 | 24 | 100:0.5 | 100/0.5 | >99 |
| 4 | X | TMA | NaF | 1:1 | 1:8 | toluene | 21 | 24 | 100:0 | 9.3/51.9 | — |
| 5 | X | TEAL | NaF | 1:1 | 1:8 | toluene | 21 | 24 | 3.2:96.8 to 0:100 | 96.8/3.2 | — |
| 6 | X | TIBAL | KF | 1:1 | 1:8 | toluene | 21 | 24 | | — | — |
| 7 | X | TMA | KF | 1:1 | 1:8 | iso-hexane | 21 | 24 | | — | — |
| 8 | X | TIBAL | MgF$_2$ | 1:1 | 1:8 | toluene | 21 | 24 | | — | — |
| 9 | XI | TMA | KF | 1:2 | 1:8 | toluene | 21 | 3 | NA | 100/0 | 89 |
| 10 | XI | TMA | KF | 1:1 | 1:8 | toluene | 21 | 3 | NA | 80/20 | — |
| 11 | XII | TMA | MgF$_2$ | 1:1 | 1:8 | iso-hexane | 21 | 24 | NA | 80 | — |
| 12 | XII | TMA | KF | 1:1 | 1:8 | toluene | 21 | 24 | NA | 100/0 | 99 |
| 13 | XII | TMA | KF | 1:1 | 1:8 | iso-hexane | 21 | 24 | NA | 82/18 | — |
| 14 | XIV | TMA | KF | 1:1 | 1:4 | toluene | 25 | 2.5 | NA | 100/0 | 99 |
| 15 | XIII | TEAL | KF | 1:1 | 1:8 | toluene | 21 | 24 | NA | 90/10* | — |
| 16 | XV | TMA | KF | 1:2 | 1:4 | toluene | 25 | 18 | NA | 100:0 | 89 |

TABLE 2-continued

Examples of Alkylation of Representative Metallocenes and Post-Metallocenes with Aluminumalkyls and Metal Fluorides

| Sample | Metallocene or Post-Metallocene | AlR$_3$ | Fluoride | Molar ratio of Cat:Al | Molar ratio of Al:F | Nonpolar Solvent | Reaction Temp. (° C.) | Reaction Time (hr) | Molar ratio of rac:meso | NMR Conv. to Di/mono (%) | Isolated Yield (%) |
|---|---|---|---|---|---|---|---|---|---|---|---|
| 17 | XVI | TMA | KF | 1:2 | 1:4.5 | toluene | 25 | 18 | NA | 100:0 | 86 |
| 18 | XVII | TMA | KF | 1:3 | 1:3 | benzene | 25 | 18 | NA | 100:0 | 67** |

*NMR estimated based on hexene polymerization vs. XIII dimethyl version set as 100%, both activated with [HNMe$_2$Ph]$^+$[B(C$_6$F$_5$)$_4$]$^-$
**Isolated yield is thought to be lower due to handling.

The tests of TMA with NaCl, KCl, or MgCl$_2$ did not show significant improvement over reactions with TMA alone. However, as illustrated in Table 1, the tests of TMA with MgF$_2$, NaF, or, KF show different degrees of improvement, with KF displaying the best results: full alkylation is observed for examples of non-bridging metallocene, bridging metallocene, mono-Cp constraint geometry catalyst (CGC), and post-metallocene, in a non-polar solvent toluene.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   reacting (a) transition metal coordination catalyst complex comprising a transition metal linked to at least one anionic donor ligand and at least one leaving group having a non-carbon atom directly linked to the transition metal, (b) an aluminum alkyl, and (c) a fluoride salt at 0° C. to 85° C., wherein a molar ratio of aluminum of the aluminum alkyl to fluoride of the fluoride salt is 1:15 to 1:3, in a non-polar solvent to yield an alkylated transition metal coordination catalyst complex.

2. The method of claim 1, wherein the non-polar solvent is selected from the group consisting of: butane, isobutene, pentane, isopentane, hexane, isohexane, heptane, octane, decane, benzene, toluene, xylene, and any combination thereof.

3. The method of claim 1, wherein a molar ratio of the transition metal coordination catalyst complex to the aluminum alkyl is 1:1 to 1:3.

4. The method of claim 1, wherein a molar ratio of aluminum of the aluminum alkyl to fluoride of the fluoride salt is 1:10 to 1:3.

5. The method of claim 1, wherein reacting occurs for 15 minutes to 36 hours.

6. The method of claim 1, wherein the fluoride salt is selected from the group consisting of NaF, KF, MgF$_2$, CaF$_2$, and any combination thereof.

7. The method of claim 1, further comprising:
   after reacting, adding additional fluoride salt to precipitate unreacted aluminum alkyl.

8. The method of claim 1, wherein the alkylated transition metal coordination catalyst complex has a molar ratio of di-alkylated to mono-alkylated of 100:0 to 70:30.

9. The method of claim 1, wherein the molar ratio of rac:meso in the alkylated transition metal coordination catalyst complex is 100:0 to 90:10.

10. The method of claim 1, wherein the transition metal coordination catalyst complex is (a.i) one or more metallocenes, (a.ii) one or more post-metallocenes, or (a.iii) one or more metallocenes in combination with one or more post-metallocenes.

11. The method of claim 1, wherein the transition metal coordination catalyst complex is represented by the formula: Cp$^A$Cp$^B$M'X'$_n$, wherein each Cp$^A$ and Cp$^B$ is independently selected from cyclopentadienyl ligands and ligands isolobal to cyclopentadienyl, one or both Cp$^A$ and Cp$^B$ may contain heteroatoms, and one or both Cp$^A$ and Cp$^B$ may be substituted by one or more R" groups; M' is selected from groups group 3, 4, 5, 6, 7, 8, 9, 10, 11 or 12 atoms and lanthanide group atoms; X' is a leaving group with a non-carbon atom directly linking to the M' center; n is 1 or 2; each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether, where two or more R" groups may form mono- or multi-nuclear cyclic groups.

12. The method of claim 1, wherein the transition metal coordination catalyst complex is represented by the formula: $Cp^A(T)Cp^BM'X'_n$, and wherein each $Cp^A$ and $Cp^B$ is bound to M' and (T) and each $Cp^A$ and $Cp^B$ is independently selected from cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups; M' is selected from groups group 3, 4, 5, 6, 7, 8, 9, 10, 11 or 12 atoms and lanthanide group atoms; X' is a leaving group with a non-carbon atom directly linking to the M' center; n is 1 or 2; each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether, where two or more R" groups may form mono- or multi-nuclear cyclic groups; and (T) is a bridging group bound to $Cp^A$ and $Cp^B$.

13. The method of claim 1, wherein the transition metal coordination catalyst complex is represented by represented by Formula (Ia):

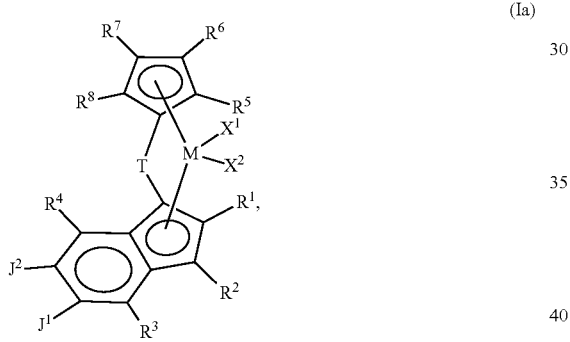

(Ia)

wherein:
M is a Group 4 metal;
T is a bridging group;
each of $X^1$ and $X^2$ is a leaving group with a non-carbon atom directly linking to the M' center;
$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, where R" is $C_1$-$C_{10}$ alkyl and each R' is hydrogen, halogen, $C_1$-$C_{10}$ alkyl, or $C_6$-$C_{10}$ aryl;
$R^3$ is an unsubstituted $C_4$-$C_{62}$ cycloalkyl, a substituted $C_4$-$C_{62}$ cycloalkyl, an unsubstituted $C_4$-$C_{62}$ aryl, a substituted $C_4$-$C_{62}$ aryl, an unsubstituted $C_4$-$C_{62}$ heteroaryl, or a substituted $C_4$-$C_{62}$ heteroaryl;
each of $R^2$ and $R^4$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl;

each of $R^5$, $R^6$, $R^7$, and $R^8$ is independently hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl, or one or more of $R^5$ and $R^6$, $R^6$ and $R^7$, or $R^7$ and $R^8$ can be joined to form a substituted or unsubstituted $C_4$-$C_{62}$ saturated or unsaturated cyclic or polycyclic ring structure, or a combination thereof; and $J^1$ and $J^2$ are joined to form a substituted or unsubstituted $C_4$-$C_{62}$ saturated or unsaturated cyclic or polycyclic ring structure, or a combination thereof.

14. The method of claim 1, wherein the transition metal coordination catalyst complex is represented by one or more of:

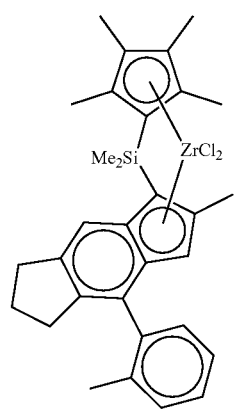

1

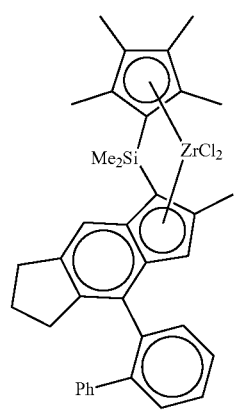

2

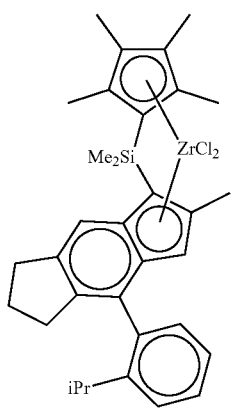
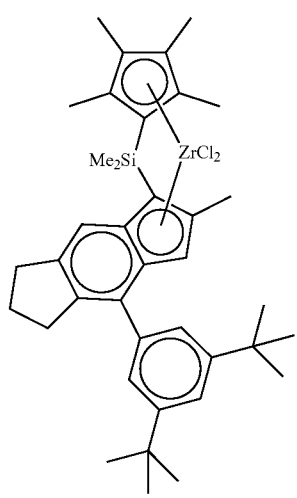
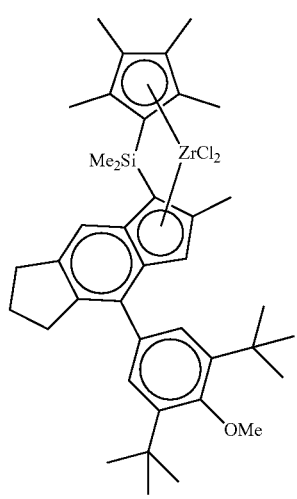
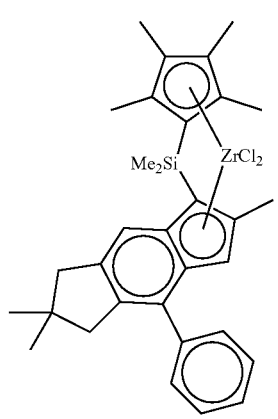

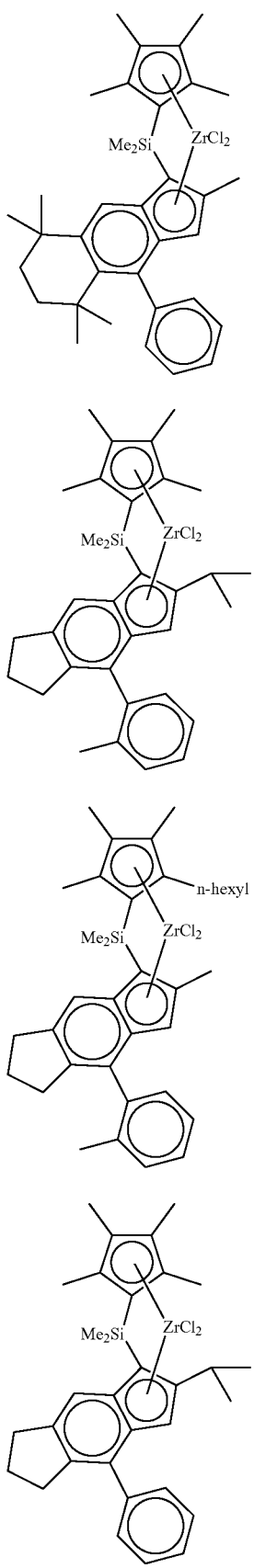
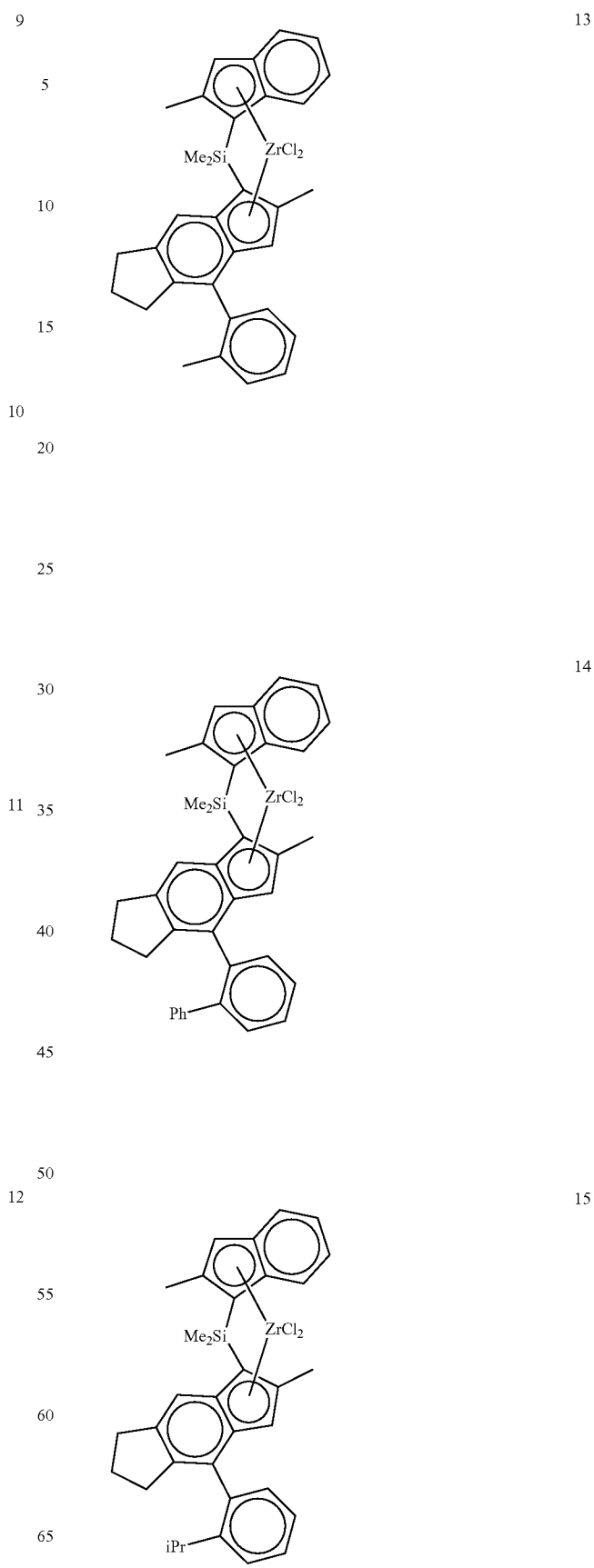

16
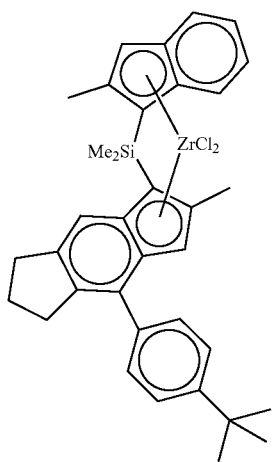
17
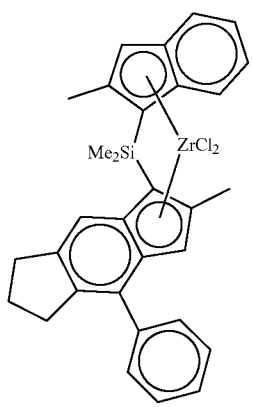
18
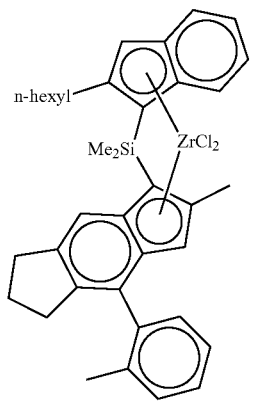
19
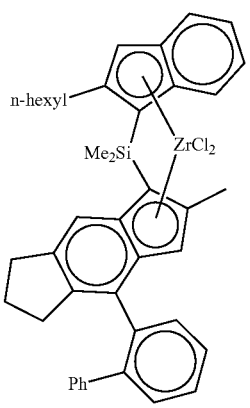
20
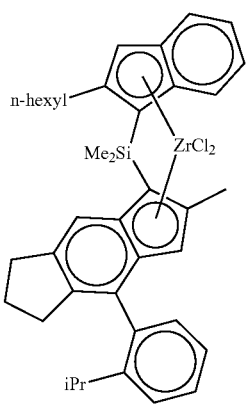
21
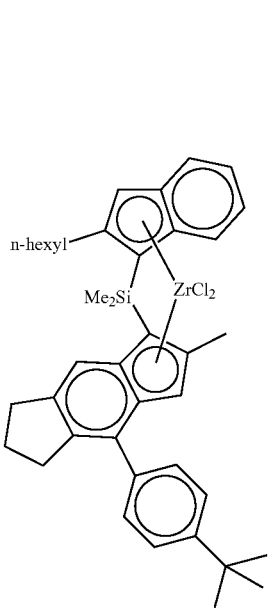

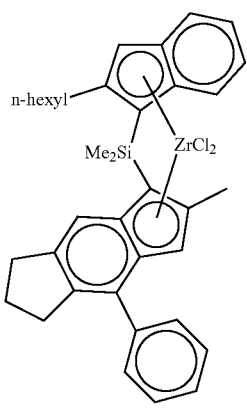

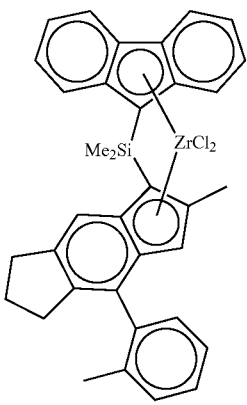

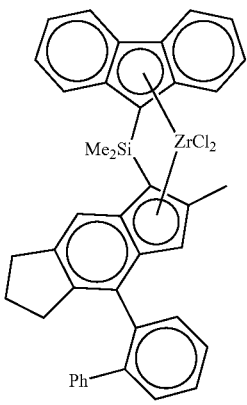

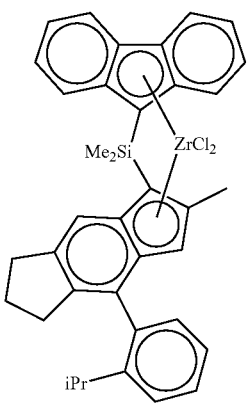

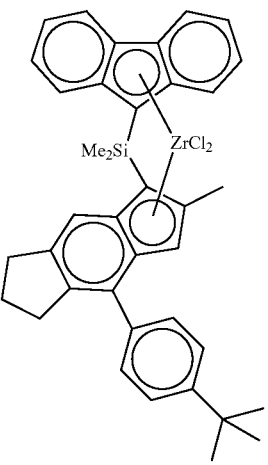

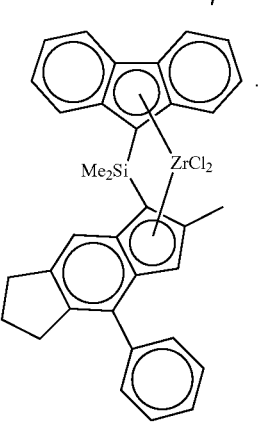

15. The method of claim 1, wherein the alkylated transition metal coordination catalyst complex is one or more of:
bis(cyclopentadienyl)M$^c$R$_n$,
bis(n-butylcyclopentadienyl)M$^c$R$_n$,
bis(pentamethylcyclopentadienyl)M$^c$R$_n$,
bis(1-methyl-3-n-butylcyclopentadienyl)M$^c$R$_n$,
bis(tetrahydro-1-indenyl)M$^c$R$_n$,
(n-propyl cyclopentadienyl)(pentamethyl cyclopentadienyl)M$^c$R$_n$,
dimethylsilylbis(tetrahydroindenyl)M$^c$R$_n$,
dimethylsilyl bis(2-methylindenyl)M$^c$R$_n$,
dimethylsilyl bis(2-methylfluorenyl)M$^c$R$_n$,
dimethylsilyl bis(2-methyl-5,7-propylindenyl)M$^c$R$_n$,
dimethylsilyl bis(2-methyl-4-phenylindenyl)M$^c$R$_n$,
dimethylsilyl bis(2-ethyl-5-phenylindenyl)M$^c$R$_n$,
dimethylsilyl bis(2-methyl-4-biphenylindenyl)M$^c$R$_n$,
dimethylsilylene bis(2-methyl-4-carbazolylindenyl) M$^c$R$_n$,
rac-dimethylsilyl-bis-(5,6,7,8-tetrahydro-5,5,8,8-tetramethyl-2-methyl-1H-benz(f)indene)M$^c$R$_n$,
diphenylmethylene (cyclopentadienyl)(fluoreneyl)M$^c$R$_n$,
bis(methylcyclopentadienyl)M$^c$R$_n$,
rac-dimethylsiylbis(2-methyl,3-propyl indenyl)M$^c$R$_n$,
dimethylsilylbis(indenyl)M$^c$R$_n$,
rac-meso-diphenylsilyl-bis(n-propylcyclopentadienyl) M$^c$R$_n$,
1, 1'-bis(4-triethylsilylphenyl)methylene-(cyclopentadienyl) (3,8-di-tertiary-butyl-1-fluorenyl)M$^c$R$_n$,
bis-trimethylsilylphenyl-methylene(cyclopentadienyl) (di-t-butylfluorenyl)M$^c$R$_n$, bis-trimethylsilylphenyl-methylene(cyclopentadienyl)(fluorenyl)M$^c$R$_n$,
bisphenylmethylene(cyclopentadienyl)(dimethylfluorenyl)M$^c$R$_n$,
bis(n-propylcyclopentadienyl)M$^c$R$_n$,
bis(n-pentylcyclopentadienyl)M$^c$R$_n$,
(n-propyl cyclopentadienyl)(n-butylcyclopentadienyl)M$^c$R$_n$,
bis[(2-trimethylsilylethyl)cyclopentadienyl]M$^c$R$_n$,
bis(trimethylsilyl cyclopentadienyl)M$^c$R$_n$,
dimethylsilylbis(n-propylcyclopentadienyl)M$^c$R$_n$,
dimethylsilylbis(n-butylcyclopentadienyl)M$^c$R$_n$,
bis(1-n-propyl-2-methylcyclopentadienyl)M$^c$R$_n$,
(n-propylcyclopentadienyl)(1-n-propyl-3-n-butylcyclopentadienyl)M$^c$R$_n$,
bis(indenyl)M$^c$R$_n$,
dimethylsilyl (tetramethylcyclopentadienyl)(cyclododecylamido)M$^c$R$_n$,
dimethylsilyl (tetramethylcyclopentadienyl)(t-butylamido)M$^c$R$_n$,
1,1'-bis(4-triethylsilylphenyl)(methylene)(cyclopentadienyl)(fluorenyl)M$^c$R$_n$;
μ-(CH$_3$)$_2$Si(cyclopentadienyl)(1-adamantylamido)M$^c$R$_n$,
μ-(CH$_3$)$_2$Si(3-tertbutylcyclopentadienyl)(1-adamantylamido)M$^c$R$_n$,
μ-(CH$_3$)$_2$Si(tetramethylcyclopentadienyl)(1-adamantylamido)M$^c$R$_n$,
μ-(CH$_3$)$_2$C(tetramethylcyclopentadienyl)(1-adamantylamido)M$^c$R$_n$,
μ-(CH$_3$)$_2$Si(tetramethylcyclopentadienyl)(1-tertbutylamido)M$^c$R$_n$,
μ-(CH$_3$)$_2$Si(fluorenyl)(1-tertbutylamido)M$^c$R$_n$,
μ-(CH$_3$)$_2$Si(tetramethylcyclopentadienyl)(1-cyclododecylamido)M$^c$R$_n$,
μ-(C$_6$H$_5$)$_2$C(tetramethylcyclopentadienyl)(1-cyclododecylamido)M$^c$R$_n$,
μ-(CH$_3$)$_2$Si(η$^5$-2,6,6-trimethyl-1,5,6,7-tetrahydro-s-indacen-1-yl)(tertbutylamido)M$^c$R$_n$,
where n is 2, M$^c$ is Ti, Zr, or Hf, and each R is independently selected from methyl, ethyl, n-propyl, isopropyl, n-butyl, sec-butyl, t-butyl, isobutyl, n-pentyl, cyclopentyl, n-hexyl, 4-methylpentyl, 3-methylpentyl, and cyclohexyl.

16. The method of claim 1, wherein the alkylated transition metal coordination catalyst complex is one or more of:
bis(cyclopentadienyl)zirconium dimethyl,
bis(n-butylcyclopentadienyl)zirconium dimethyl,
bis(pentamethylcyclopentadienyl)zirconium dimethyl,
bis(pentamethylcyclopentadienyl)hafnium dimethyl,
bis(1-methyl-3-n-butylcyclopentadienyl)zirconium dimethyl,
bis(1-methyl-3-n-butylcyclopentadienyl)hafnium dimethyl,
bis(tetrahydro-1-indenyl)zirconium dimethyl,
(n-propyl cyclopentadienyl, pentamethyl cyclopentadienyl)zirconium dimethyl,
dimethylsilyl (tetramethylcyclopentadienyl)(cyclododecylamido)titanium dimethyl,
dimethylsilyl (tetramethylcyclopentadienyl)(t-butylamido)titanium dimethyl,
μ-(CH$_3$)$_2$Si(cyclopentadienyl)(1-adamantylamido)titanium dimethyl,
μ-(CH$_3$)$_2$Si(3-tertbutylcyclopentadienyl)(1-adamantylamido) titanium dimethyl,
μ-(CH$_3$)$_2$Si(tetramethylcyclopentadienyl)(1-adamantylamido) titanium dimethyl,
μ-(CH$_3$)$_2$C(tetramethylcyclopentadienyl)(1-adamantylamido) titanium dimethyl,
μ-(CH$_3$)$_2$Si(tetramethylcyclopentadienyl)(1-tertbutylamido) titanium dimethyl,
μ-(CH$_3$)$_2$Si(fluorenyl)(1-tertbutylamido)titanium dimethyl,
μ-(CH$_3$)$_2$Si(tetramethylcyclopentadienyl)(1-cyclododecylamido)titanium dimethyl,
μ-(C$_6$H$_5$)$_2$C(tetramethylcyclopentadienyl)(1-cyclododecylamido)titanium dimethyl,
μ-(CH$_3$)$_2$Si(η$^5$-2,6,6-trimethyl-1,5,6,7-tetrahydro-s-indacen-1-yl)(tertbutylamido)titanium dimethyl,
rac-dimethylsilyl-bis(indenyl)hafnium dimethyl,
1,1'-bis(4-triethylsilylphenyl)methylene-(cyclopentadienyl) (3,8-di-tertiary-butyl-1-fluorenyl)hafnium dimethyl,
dimethylsilyl bis(tetrahydroindenyl)zirconium dimethyl,
dimethylsilyl bis(indenyl)zirconium dimethyl,
dimethylsilyl bis(indenyl)hafnium dimethyl,
bis(indenyl)zirconium dimethyl,
bis(indenyl)hafnium dimethyl,
dimethylsilyl bis(tetrahydroindenyl)zirconium dimethyl,
bis(n-propylcyclopentadienyl)zirconium dimethyl,
dimethylsilylbis(tetrahydroindenyl)hafnium dimethyl,
dimethylsilyl bis(2-methylindenyl)zirconium dimethyl,
dimethylsilyl bis(2-methylfluorenyl)zirconium dimethyl,
dimethylsilyl bis(2-methylindenyl)hafnium dimethyl,
dimethylsilyl bis(2-methylfluorenyl)hafnium dimethyl,
dimethylsilyl bis(2-methyl-5,7-propylindenyl)zirconium dimethyl,
dimethylsilyl bis(2-methyl-4-phenylindenyl)zirconium dimethyl,
dimethylsilyl bis(2-ethyl-5-phenylindenyl)zirconium dimethyl,
dimethylsilyl bis(2-methyl-4-biphenylindenyl)zirconium dimethyl,
dimethylsilylene bis(2-methyl-4-carbazolylindenyl)zirconium dimethyl,
rac-dimethylsilyl-bis-(5,6,7,8-tetrahydro-5,5,8,8-tetramethyl-2-methyl-1H-benz(f)indene)hafnium dimethyl,
diphenylmethylene (cyclopentadienyl)(fluoreneyl)hafnium dimethyl,
bis(methylcyclopentadienyl)zirconium dimethyl,
rac-dimethylsiylbis(2-methyl,3-propyl indenyl)hafnium dimethyl,
dimethylsilylbis(indenyl)hafnium dimethyl,
dimethyl rac-dimethylsilyl-bis-(5,6,7,8-tetrahydro-5,5,8,8-tetramethyl-2-methyl-1H-benz(f)indene)hafnium dimethyl,
rac-meso-diphenylsilyl-bis(n-propylcyclopentadienyl) hafnium dimethyl,
1,1'-bis(4-triethylsilylphenyl)methylene-(cyclopentadienyl)(3,8-di-tertiary-butyl-1-fluorenyl)hafnium dimethyl (bridge is considered the 1 position),
bis-trimethylsilylphenyl-methylene(cyclopentadienyl) (di-t-butylfluorenyl)hafnium dimethyl,
bis-trimethylsilylphenyl-methylene(cyclopentadienyl) (fluorenyl)hafnium dimethyl,
bisphenylmethylene(cyclopentadienyl)(dimethylfluorenyl)hafnium dimethyl,
bis(n-propylcyclopentadienyl)hafnium dimethyl,
bis(n-butylcyclopentadienyl)hafnium dimethyl,
bis(n-pentylcyclopentadienyl)hafnium dimethyl,
(n-propyl cyclopentadienyl)(n-butylcyclopentadienyl) hafnium dimethyl,
bis[(2-trimethylsilylethyl)cyclopentadienyl]hafnium dimethyl, bis(trimethylsilyl cyclopentadienyl)hafnium dimethyl, dimethylsilylbis(n-propylcyclopentadienyl)hafnium dimethyl, dimethylsilylbis(n-butylcyclopentadienyl)hafnium dimethyl, bis(1-n-propyl-2-methylcyclopentadienyl)hafnium dimethyl, (n-propylcyclopentadienyl)(1-n-propyl-3-n-butylcyclopentadienyl)hafnium dimethyl, bis(n-propylcyclopentadienyl)hafnium dimethyl, bis(n-butylcyclopentadienyl)hafnium dimethyl, bis(n-pentylcyclopentadienyl)hafnium dimethyl, (n-propyl cyclopentadienyl)(n-butylcyclopentadienyl)hafnium dimethyl, bis[(2-trimethylsilylethyl)cyclopentadienyl]hafnium dimethyl, bis(trimethylsilyl cyclopentadienyl)hafnium dimethyl, dimethylsilylbis(n-propylcyclopentadienyl)hafnium dimethyl, dimethylsilylbis(n-butylcyclopentadienyl)hafnium dimethyl, bis(1-n-propyl-2-methylcyclopentadienyl)hafnium dimethyl, (n-propylcyclopentadienyl)(1-n-propyl-3-n-butylcyclopentadienyl)hafnium dimethyl, and dimethylsilyl(3-n-propylcyclopentadienyl)(tetramethylcyclopentadienyl)zirconium dimethyl.

17. The method of claim 1, wherein the alkylated transition metal coordination catalyst complex is one or more of:

(III)

(IV)

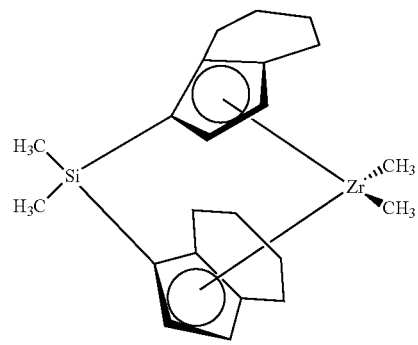

(V)

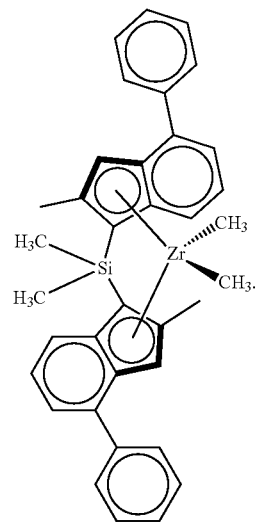

(VI)

18. The method of claim 1, wherein the transition metal coordination catalyst complex is selected from the group consisting of: bisphenolate complexes; diphenolate complexes; oxadiazolylphenolate complexes; diethylenetriamine complexes; oxybis(ethylamine) complexes; pyridyldiamido complexes; quinolinyldiamido complexes; cyclopentadienyl-amidinate complexes; and iron pyridyl bis(imine) complexes; or any combination thereof, including any combination with metallocene complexes.

19. A method comprising:
reacting (a) transition metal coordination catalyst complex comprising a transition metal linked to at least one anionic donor ligand and at least one leaving group having a non-carbon atom directly linked to the transition metal, wherein the transition metal coordination catalyst complex is selected from the group consisting of: bisphenolate complexes; diphenolate complexes; oxadiazolylphenolate complexes; diethylenetriamine complexes; oxybis(ethylamine) complexes; pyridyldiamido complexes; quinolinyldiamido complexes; cyclopentadienyl-amidinate complexes; and iron pyridyl bis(imine) complexes; or any combination thereof, including any combination with metallocene complexes; (b) an aluminum alkyl, and (c) a fluoride salt at 0° C. to 85° C. in a non-polar solvent to yield an alkylated transition metal coordination catalyst complex.

20. The method of claim 19, wherein a molar ratio of aluminum of the aluminum alkyl to fluoride of the fluoride salt is 1:10 to 1:3.

* * * * *